US006926632B2

(12) United States Patent
Brown

(10) Patent No.: US 6,926,632 B2
(45) Date of Patent: *Aug. 9, 2005

(54) DUAL DRIVE CONTINUOUSLY VARIABLE TRANSMISSION

(76) Inventor: Albert W. Brown, 1207 Pembroke La., Newport Beach, CA (US) 92660

( * ) Notice: Subject to any disclaimer, the term of this patent is extended or adjusted under 35 U.S.C. 154(b) by 138 days.

This patent is subject to a terminal disclaimer.

(21) Appl. No.: 10/281,895

(22) Filed: Oct. 25, 2002

(65) Prior Publication Data

US 2003/0153426 A1 Aug. 14, 2003

Related U.S. Application Data

(63) Continuation-in-part of application No. 10/119,530, filed on Apr. 9, 2002, now abandoned, which is a continuation-in-part of application No. 09/395,467, filed on Sep. 14, 1999, now Pat. No. 6,398,679, said application No. 10/119,530, is a continuation-in-part of application No. 09/453,354, filed on Dec. 1, 1999, now Pat. No. 6,421,903.
(60) Provisional application No. 60/343,955, filed on Oct. 25, 2001, provisional application No. 60/343,395, filed on Dec. 20, 2001, and provisional application No. 60/100,220, filed on Sep. 14, 1998.

(51) Int. Cl.$^7$ ................................................. F16H 9/20
(52) U.S. Cl. ............................................. 474/35; 474/8
(58) Field of Search ............................... 474/8, 14, 18, 474/28, 33, 34, 35, 36, 46, 69, 70

(56) References Cited

U.S. PATENT DOCUMENTS

| | | |
|---|---|---|
| 917,684 A | 4/1909 | Van Nort |
| 1,727,232 A | 9/1929 | Farrell |
| 1,819,227 A | 8/1931 | Chorlton |
| 2,158,047 A | 5/1939 | Weston |
| 2,183,267 A | 12/1939 | Rieser |
| 2,218,712 A | 10/1940 | Johnson |

(Continued)

FOREIGN PATENT DOCUMENTS

| | | |
|---|---|---|
| DE | 906 395 | 3/1954 |
| DE | 43 05 102 | 8/1994 |
| FR | 1.130.289 | 9/1956 |
| FR | 2 327 456 | 5/1977 |
| GB | 1 434 717 | 5/1976 |

OTHER PUBLICATIONS

1996 CVT Service Manual Supplement, pp. 14–2 through 14–31.

Primary Examiner—David A. Bucci
Assistant Examiner—Vicky A. Johnson
(74) Attorney, Agent, or Firm—Knobbe, Martens, Olson & Bear, LLP

(57) ABSTRACT

A continuously variable transmission has a first shaft supporting two first pulleys. The two first pulleys each comprise a fixed disk portion and a moveable disk portion whereby axial movement of the moveable disk portions along the first shaft relative to the fixed disk portions changes an effective diameter of the two first pulleys. An articulating mechanism connects the moveable disk portions. The articulating mechanism has a body that is connected to the moveable disk portions. A second shaft extends generally parallel to the first shaft. Two second pulleys are journaled about the second shaft. The two second pulleys each has a fixed disk portion and a moveable disk portion. The two fixed disk portions are rotationally connected to the second shaft through a differential. A pair of belts connect the two second pulleys to the two first pulleys

30 Claims, 41 Drawing Sheets

LOW GEAR

U.S. PATENT DOCUMENTS

| | | |
|---|---|---|
| 2,221,166 A | 11/1940 | Heinrich et al. |
| 2,256,114 A | 9/1941 | Heyer |
| 2,258,970 A | 10/1941 | Buettell |
| 2,293,638 A | 8/1942 | Clarkson |
| 2,410,915 A | 11/1946 | Willmott |
| 2,522,353 A | 9/1950 | Eserkaln |
| 2,648,987 A * | 8/1953 | Curtis .......................... 474/29 |
| 2,770,978 A | 11/1956 | Troemel |
| 2,831,358 A | 4/1958 | Michie |
| 2,927,470 A | 3/1960 | Heyer |
| 3,280,649 A | 10/1966 | Bruet |
| 3,380,315 A | 4/1968 | Emerson |
| 3,638,744 A | 2/1972 | Washizawa |
| 3,672,166 A | 6/1972 | Isaac |
| 3,699,827 A | 10/1972 | Vogel |
| 3,715,928 A | 2/1973 | Case et al. |
| 3,762,231 A | 10/1973 | Pettigrew |
| 3,828,555 A | 8/1974 | Capdevielle |
| 3,903,652 A | 9/1975 | Baughman et al. |
| 4,026,161 A | 5/1977 | Vogel |
| 4,056,987 A | 11/1977 | Hoffmann |
| 4,125,037 A | 11/1978 | Palmer et al. |
| 4,165,795 A | 8/1979 | Lynch et al. |
| 4,194,608 A | 3/1980 | Usui et al. |
| 4,324,156 A | 4/1982 | Iwanaga et al. |
| 4,354,547 A | 10/1982 | Sugiura |
| 4,378,221 A | 3/1983 | Huff et al. |
| 4,449,423 A | 5/1984 | Carriere |
| 4,452,494 A | 6/1984 | Kadota |
| 4,464,144 A | 8/1984 | Kobayashi |
| 4,474,079 A | 10/1984 | Crockett |
| 4,484,901 A * | 11/1984 | Toti et al. .................... 474/28 |
| 4,539,867 A | 9/1985 | Ishimi |
| 4,548,099 A | 10/1985 | Wayman et al. |
| 4,679,396 A | 7/1987 | Heggie |
| 4,691,592 A | 9/1987 | de Brie Perry |
| 4,705,492 A | 11/1987 | Hattori et al. |
| 4,713,041 A | 12/1987 | Stockton |
| 4,772,247 A | 9/1988 | Stockton |
| 4,857,034 A | 8/1989 | Kouno et al. |
| 4,872,371 A | 10/1989 | Fellows |
| 4,875,893 A | 10/1989 | Giacosa |
| 4,901,597 A | 2/1990 | Hattori et al. |
| 4,947,700 A | 8/1990 | Kern et al. |
| 4,967,621 A | 11/1990 | Soga et al. |
| 4,987,967 A * | 1/1991 | Kouno ....................... 180/233 |
| 5,006,092 A | 4/1991 | Neuman et al. |
| 5,006,093 A | 4/1991 | Itoh et al. |
| 5,090,527 A | 2/1992 | Imamura et al. |
| 5,121,936 A | 6/1992 | Cowan |
| 5,167,591 A | 12/1992 | Cowan |
| 5,176,579 A | 1/1993 | Ohsono et al. |
| 5,186,692 A | 2/1993 | Gleasman et al. |
| 5,215,323 A | 6/1993 | Cowan |
| 5,274,736 A | 12/1993 | Rohr, Jr. |
| 5,314,037 A | 5/1994 | Shaw et al. |
| 5,323,737 A | 6/1994 | Farrell |
| 5,358,450 A | 10/1994 | Robert |
| 5,368,529 A | 11/1994 | Machida |
| 5,529,138 A | 6/1996 | Shaw et al. |
| 5,562,555 A | 10/1996 | Peterson |
| 5,645,507 A | 7/1997 | Hathaway |
| 5,647,802 A | 7/1997 | Gleasman et al. |
| 5,647,810 A | 7/1997 | Huddleston |
| 5,662,547 A | 9/1997 | Moroto et al. |
| 5,692,983 A | 12/1997 | Bostelmann |

* cited by examiner

DUAL DRIVE CONTINUOUSLY VARIABLE TRANSMISSION

RELATED APPLICATIONS

Pursuant to 35 U.S.C. § 119(e), the present application claims the priority of U.S. Provisional Patent Application No. 60/343,955, filed Oct. 25, 2001 and U.S. Provisional Patent Application No. 60/343,395, filed Dec. 20, 2001. Each of these applications is hereby incorporated by reference in its entirety.

The present application is a continuation-in-part of U.S. patent application Ser. No. 10/119,530 (the '530 application), which was filed on Apr. 9, 2002, now abandoned. The '530 application was a continuation-in-part of U.S. patent application Ser. No. 09/395,467 (the '467 application), filed Sep. 14, 1999 and issued on Jun. 4, 2002 as U.S. Pat. No. 6,398,679, which claimed the priority benefit of U.S. Provisional Patent Application No. 60/100,220, filed Sep. 14, 1998. The '530 application also was a continuation-in-part of U.S. patent application Ser. No. 09/453,354 (the '354 application), filed Dec. 1, 1999 and issued on Jul. 23, 2002 as U.S. Pat. No. 6,421,903, which claimed the priority benefit of U.S. Provisional Patent Application No. 60/100,220, filed Sep. 14, 1998. The '354 application was a continuation-in-part of the '467 application. Each of these applications is hereby incorporated by reference in its entirety.

BACKGROUND OF THE INVENTION

1. Field of the Invention

The present invention relates to continuously variable transmissions. More specifically, the present invention relates to dual drive continuously variable transmissions having dual drives slaved together for transfer of torque from input shafts to output shafts.

2. Description of the Related Art

Continuously variable transmissions ("CVTs") are a type of transmission capable of transferring torque from an input shaft to an output shaft. The CVT is a transmission that is capable of converting input speeds into output speeds that are steplessly variable within a given range. Recently, the automotive industry has used these transmissions for transferring torque between an input shaft and an output shaft of a vehicle employing a low horsepower engine.

The most common of such CVT drives for automobiles has used a steel segmented V-belt operating with axially moveable steel pulleys that force belt radial movement along the conical pulley surfaces to change the speed ratio between the driven and the output shaft, usually by a combination of springs and hydraulic generated force. Such belts operate the drive by transferring the torque from an input shaft, through a single input pulley, to a single output pulley and, ultimately, to an output shaft. Drives of this type have been successful and, as mentioned above, are currently being commercially produced in the lower horsepower range of passenger automobiles.

Operational qualities of CVT drives are well known in the automotive industry, including their shortcomings. Continuous research and development effort is being expended in the automobile industry to extend the capabilities of the belt and pulley basic concept because of the perceived advantages to be realized over more traditional transmissions now in production.

SUMMARY OF THE INVENTION

One of the shortcomings of some current CVT drives includes limitations on operation in the higher horsepower range, the solving of which is the genesis of this invention. Thus, the present invention was designed to handle increased horsepower over single belt CVT systems. Specifically, a dual belt CVT system was created.

The creation of a dual belt CVT system, however, revealed other drawbacks. Included among these drawbacks where the complication of system construction and increased size and cost, as well as loss of the prime mover energy due to what is termed bucking of the belts against each other. The bucking of the belts occurs, for instance, when the operation of a dual drive system is not synchronous. The difficulty is further magnified when such a system must be continuously variable and automatically controlled as is required in an automotive application.

Thus, the present invention involves coupling two CVT belt systems operating in parallel. Thus, each of the CVT belt systems absorbs half the input torque of the input shaft and delivers it to the output shaft. The torque transfer occurs in the present invention with very low power loss due to an advantageously coupling of components and synchronous driving of the belt systems. Similar to some single belt systems in use, the present invention changes the pulley ratios using selective pressurization of the pulleys. Specifically, each pulley includes a biased portion that, when pressurized, alters the effective diameter of the pulley.

Because two parallel continuously variable drives, which are positioned on common shafts, may not naturally operate synchronously in the serial production world, three additional elements can be employed singularly or together to accomplish the necessary compatibility without excessive energy loss or undue complication. One such element is a device, hydraulic or mechanical, to precisely and synchronously, control the moveable halves of the drive pulleys positions to maintain an even operating radius or effective diameter of the belts on the pulleys during hydraulic pressure application for ratio changing or holding in between travel extremes. Another element is precise pulley groove width control employing accurate parts dimensions axially where the pulleys meet stops at the extremes of travel to essentially position each belt at like operating radii, or effective diameters, in both the high gear or cruise position and the low gear position, which are the positions at which the CVT will operate most of the time. The third element incorporates a differential gear set with very low friction performance. This third element accommodates differences in output rotational speed of the output pulleys regardless of the implementation of the above-two elements. The differential therefore will accept the torque of each pulley separately although there is a speed disparity and apply this torque to the output gear or sprocket, through the so-called spider gears of the differential, with minimal energy loss.

Accordingly, an improved CVT system is desired. The CVT system preferably is constructed in a compact configuration. The system should be capable of handling increased horsepower and should be mechanically producible using conventional materials and processes at reasonable cost. However, it is envisioned that the present invention will have particular utility in the automotive industry, for example.

Accordingly, one aspect of the present invention involves A continuously variable transmission has a first shaft supporting two first pulleys. The two first pulleys each comprise a fixed disk portion and a moveable disk portion whereby axial movement of the moveable disk portions along the first shaft relative to the fixed disk portions changes an effective diameter of the two first pulleys. An articulating mechanism connects the moveable disk portions. The articulating mechanism has a body that is connected to the moveable disk portions. A second shaft extends generally parallel to the first shaft. Two second pulleys are journaled about the second shaft. The two second pulleys each has a fixed disk portion and a moveable disk portion. The two fixed disk portions are rotationally connected to the second shaft through a differential. A pair of belts connect the two second pulleys to the two first pulleys.

Another aspect of the present invention involves a continuously variable transmission. The transmission comprises a first shaft supporting two first pulleys. The two first pulleys each comprise a fixed disk portion and a moveable disk portion whereby axial movement of the moveable disk portions along the first shaft relative to the fixed disk portions changes an effective diameter of the two first pulleys. An articulating mechanism connects the moveable disk portions such that the effective diameters of the two first pulleys are maintained substantially equal by the articulating mechanism. A second shaft extends generally parallel to the first shaft. Two second pulleys are journaled on the second shaft, with the two second pulleys each comprising a fixed disk portion and a moveable disk portion whereby axial movement of the moveable disk portions along the second shaft relative to the fixed disk portions changes an effective diameter of the two second pulleys. The two fixed disk portions are rotationally connected to the second shaft by a differential. A pair of belts connect the two second pulleys to the two first pulleys and the two first pulleys and the two second pulleys are hydraulically actuated.

BRIEF DESCRIPTION OF THE DRAWINGS

These and other features, aspects, objects and advantages of the present invention will now be described with reference to drawings of several preferred embodiments of the present invention. The illustrated embodiments are intended to illustrate various aspects of the present invention and are not intended to limit the scope of the present invention. The drawings comprise *** figures.

FIG. 15 is a sectioned side elevation view of a further continuously variable transmission arranged and configured in accordance with certain features, aspects and advantages of the present invention, which transmission is shown in a low gear ratio.

DETAILED DESCRIPTION OF THE PREFERRED EMBODIMENT

The following description sets forth a number of arrangements of belt and pulley type continuously variable transmissions. The transmissions described will be in an elemental form (i.e., without controls, pumps, and the like) and can be used with any suitable components. The transmissions described below are believed to be suited for use in vehicles with engines that produce up to about 600 Nm of torque. In one preferred arrangement, the transmissions provide a continuously variable transmission capable of use with an engine that produces between about 450 Nm and about 600 Nm of torque. Furthermore, while the illustrated arrangements are of the compression type configuration, the concepts involved in the illustrated arrangement can be used with either compression type or tension type configurations.

Figure 1A:
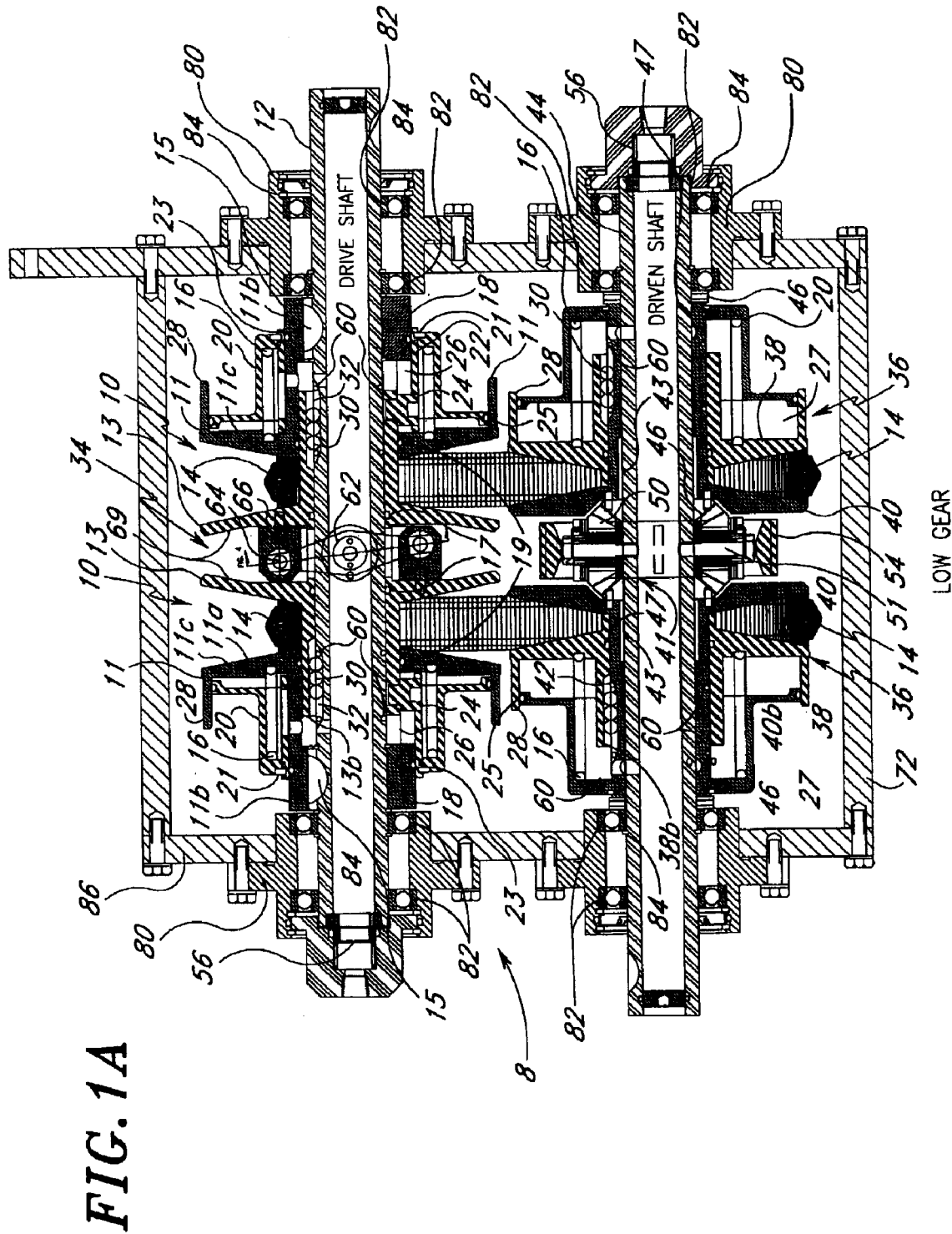
FIG. 1 is a cross-sectional view of a continuously variable transmission taken through a centerline of an input shaft and an output shaft, with the transmission positioned in a start or low gear position.

With reference initially to FIG. 1, a continuously variable transmission configured and arranged in accordance with certain features, aspects and advantages of the present invention is illustrated therein. The transmission, indicated generally by the reference numeral 8, has particular utility in the automotive industry. More specifically, the present transmission 8 has particular utility in transferring torque from an output shaft of an engine to a propulsion shaft in applications having engines operating within higher power bands of horsepower. Of course, the present transmission may also find utility in a wide range of other applications including, but not limited, agricultural vehicles, heavy industrial applications and the like.

The present transmission preferably includes parallel belts that operate in a generally synchronous manner between a drive shaft and a driven shaft. Where used in the following discussion, the terms "drive" or "input" and "driven" or "output" are solely used for convenience and clarity and do not necessitate that the "drive" or "input" member cannot be driven or vice-versa. For instance, a drive or input pulley can function as a driven or output pulley in some arrangements while a driven or output pulley can function as a drive input pulley is such arrangements. In other words, these terms are used solely for convenience and either shaft can, in actuality, function in either manner as determined to be desirable or advantageous.

With continued reference to FIG. 1, the illustrated transmission generally comprises a pair of drive pulleys 10. The drive pulleys 10 are mounted to a drive shaft 12 and are configured with a stationary portion 11 and a moveable portion 13. Each of the drive pulleys 10 drives a belt 14. Each belt 14, in turn, drives a corresponding driven pulley 36. Thus, the torque from the drive pulleys 10 is transferred to an output shaft or drive shaft 44 by the driven pulleys 36 through the belts 14. Both the drive shaft 12 and the driven shaft 44 are illustrated as hollow and may accept co-axial drive assemblies, if desired. The belts preferably are any suitable type. In one arrangement, the belts are a commercially available, steel segmented type such as those supplied by VDT or those supplied to Subaru.

Figure 6:
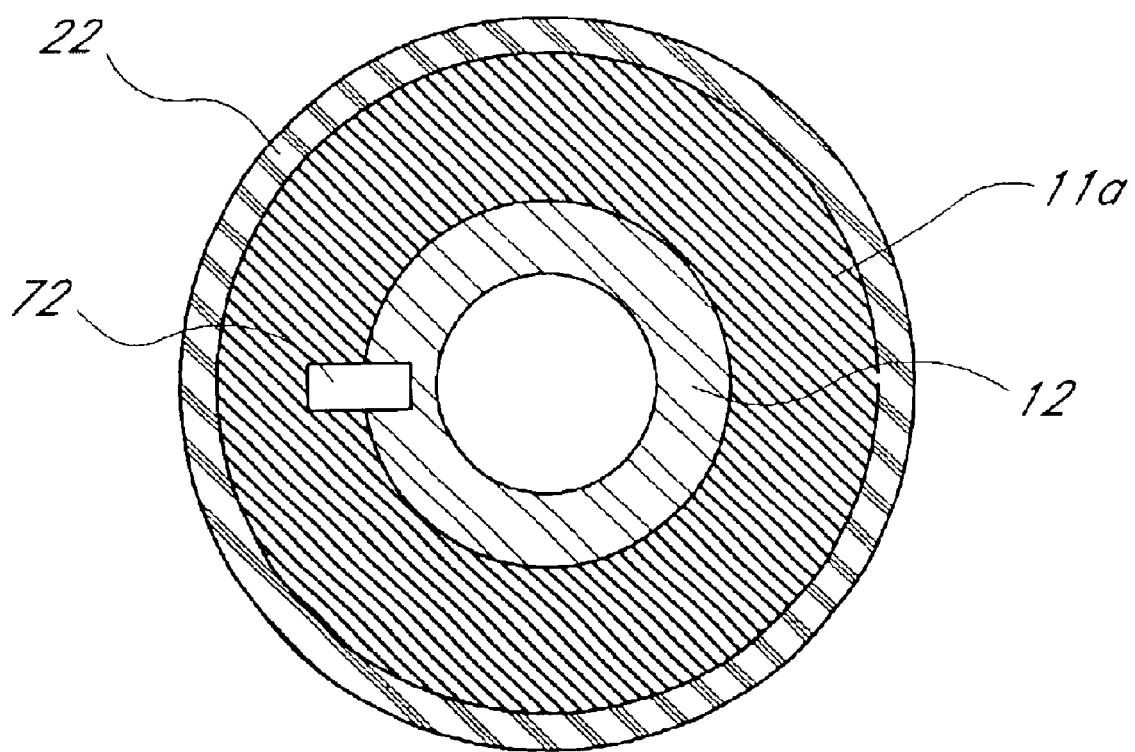
FIG. 6 is a cross-sectional view of the transmission of FIG. 1 taken along the line 6—6 in FIG. 2 and showing a method of clamping a stationary drive pulley half that is keyed to the drive shaft.

With continued reference to FIG. 1, the stationary pulley halves 11 of the drive pulleys 10 are preferably positioned to the outsides of the transmission 8 such that the moveable pulley halves 13 are interposed between the two stationary pulley halves 11. Moreover, the stationary pulley halves 11 are preferably rotationally keyed to the shaft 12 in addition to being interference fit to the shaft. Such a mounting arrangement advantageously secures the stationary pulley halves 11 to the shaft 12 for coupled rotational movement while the mounting arrangement limits the axial moveability of the pulley halves 11 relative to the shaft 12. In the illustrated transmission 8, the stationary pulley halves 11 are preferably heated and interference fit to the shaft 12. Moreover, with reference now to FIG. 6, a woodruff key 15 is preferably used to reinforce the coupling between the shaft 12 and the hub 11a of the stationary pulley halves 11. Of course, other mounting arrangements may become apparent to those of ordinary skill in the art.

With continued reference to FIG. 1, each moveable pulley half 13 is preferably slidably keyed to the shaft 12 such that the moveable pulley half 13 is generally rotationally fixed to the shaft while maintaining axial moveability. In one arrangement, the moveable pulley half 13 is keyed to the shaft by a set of key balls 30 that are disposed within in a corresponding set of elongated axial ball races 32 formed along the shaft 12, the interaction of which will be described in detail below.

The moveable pulley halves 13 have hubs 13b which are generally configured to slide along the shaft 12 into a pocket formed inside of a portion of the stationary pulley halves 11 (i.e., within the pulley hub 11b). Preferably, the moveable pulley hub 13b is sized to contact a face of a pocket formed inside the stationary pulley hub 11b (see FIG. 2). In this manner, the face of the pocket and the end of the moveable pulley hub 13b form a positive stop that limits movement of the moveable pulley 13 toward the stationary pulley 11.

With reference again to FIG. 1, a seal 17 is positioned proximate a disk portion of each moveable pulley half 13. The seals 17 advantageously substantially seal the interface between the shaft 12 and each moveable pulley half 13. A seal 19 is also positioned proximate a disk portion of each stationary pulley half 11. These seals 19 advantageously substantially seal the sliding interface between the two pulley halves 11, 13. As such, the seals 17, 19 can reduce leakage of fluid used to generate hydraulic pressure, which is used to at least partially control relative positioning between the pulley halves 11, 13, and to maintain a film of fluid to ease the relative movement of the moveable pulley halves 13.

With continued reference to FIG. 1, a piston 20 and a sleeve 22 is slidably connected to each illustrated stationary pulley half 11. While the pistons 20 and sleeves 22 are formed independently of one another in the illustrated transmission 8, it is anticipated that the two components may be formed of a single member. The illustrated pistons 20 and sleeves 22 are preferably connected to the moveable pulley halves for axial movement relative to the drive shaft 12. In some arrangements, the sleeves 22 may form positive stops with the back face 11c of the stationary pulley halves 11 such that movement of the moveable pulley halves 13 in a direction away from the stationary pulley halves 11 may be limited.

As mentioned above, the pistons 20 and sleeves 22 preferably are fixed to the moveable pulley halves 13. The illustrated pistons 20, in turn, are connected to the sleeves 22 with snap rings 21. A spring 16, which is in contact with an inner face of the piston 20, in cooperation with the snap rings 21, can fix a preset relative positioning of the pistons 20 and sleeves 22. In the illustrated arrangement, the spring load bears against the back faces 11c of the stationary pulley halves 11 and pushes the pistons 20 away from the back faces 11c. A seal 23 also preferably is positioned between each sleeve 22 and each stationary hub 11b. In addition, the hydraulically-actuated pistons 20 are preferably sealed with o-rings 25 at the cylinder walls 28, which are integrally formed with the stationary pulleys 11 in the illustrated transmission. Thus, the interface between both the sleeves 22 and the stationary hubs 11b and the pistons 20 and the stationary pulley 11 are substantially sealed.

Figure 9:
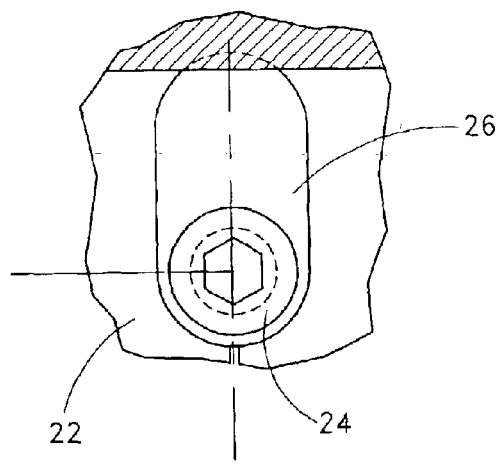
FIG. 9 is a sectional view of the transmission of FIG. 1 taken along the line 9—9 in FIG. 2 showing the set of bolts that attach the spring loaded sleeve to the moveable half of the drive pulley and the position of the bolts in the set of slots formed in the stationary pulley half that allow axial movement.
Figure 7:
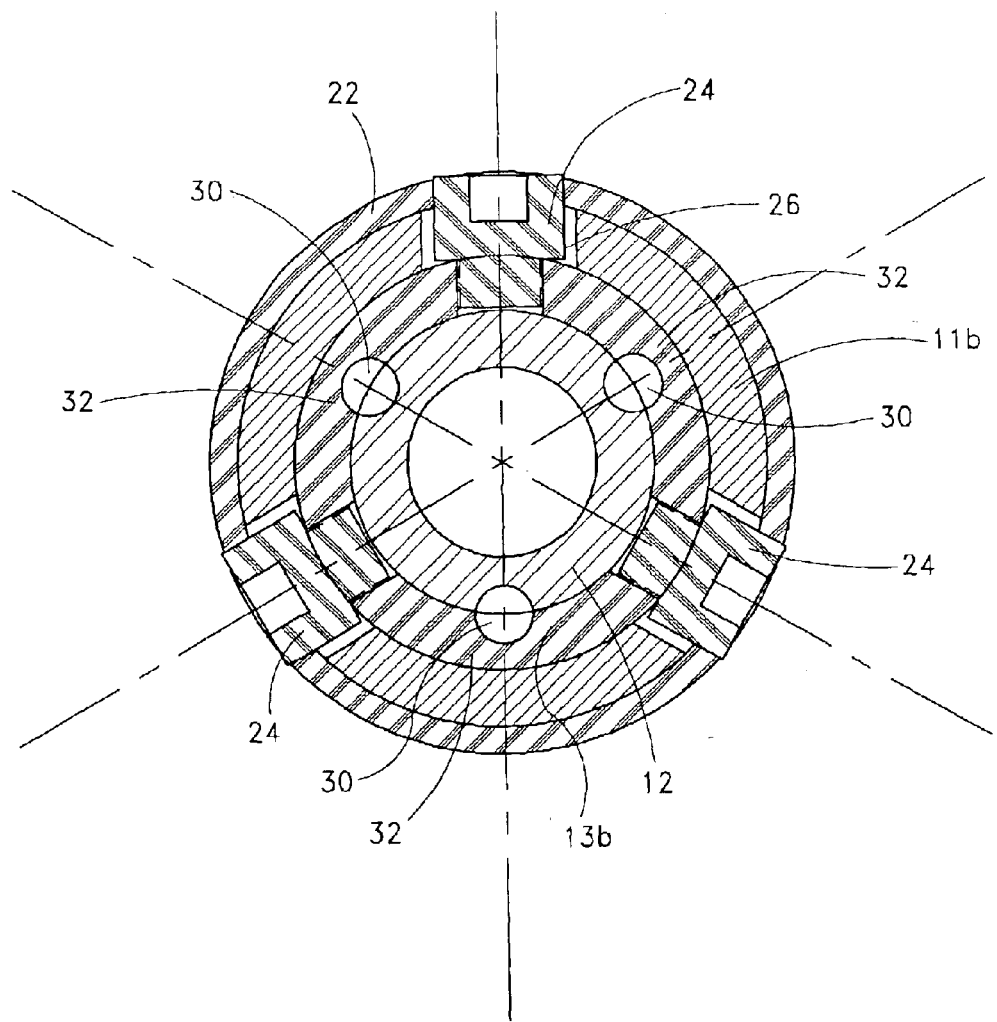
FIG. 7 is a cross-sectional view showing a position relationship of a set of ball keyway races relative to one another and relative to a set of bolts that attach a spring loaded sleeve to a moveable half of the drive pulley.

With reference now to FIGS. 1, 7 and 9, the sleeves 22 are attached to the moveable pulley half hubs 13b by a set of pins, lugs or bolts 24 that extend at least partially through a set of corresponding slots 26 in the stationary pulley half hubs 11b. The bolts 24 in the illustrated arrangement preferably are recessed or countersunk to reduce the likelihood of interference between the bolts 24 and the spring 16. In one preferred arrangement, which is illustrated, the moveable pulley halves and the sleeves 22 are attached together in three locations, which are approximately 120 degrees apart about the circumference of the hubs 11b. As illustrated, this arrangement results in the pistons 20, sleeves 22 and the moveable pulley halves 13 being fixed together for axial movement relative to the stationary pulley halves 11, which are generally angularly fixed relative to the shaft 12.

In some arrangements, the slots 26 may be sized and configured to form positive stops that limit the allowable relative axial travel. With reference to FIG. 9, one of the bolts 24 that connects the sleeve 22 to the moveable pulley halves of the drive pulleys is illustrated in a high gear position (i.e., that shown in FIG. 2). In transition to a low gear position (i.e., that shown in FIG. 1), the bolt 24 will move to the opposite end of the slot 26, which is formed in the stationary pulley half 11. The illustrated arrangement also causes the moveable pulley half 13 to be coupled for rotation with the stationary pulley half 11 relative to an axis of rotation of the drive shaft 12.

Figure 2:
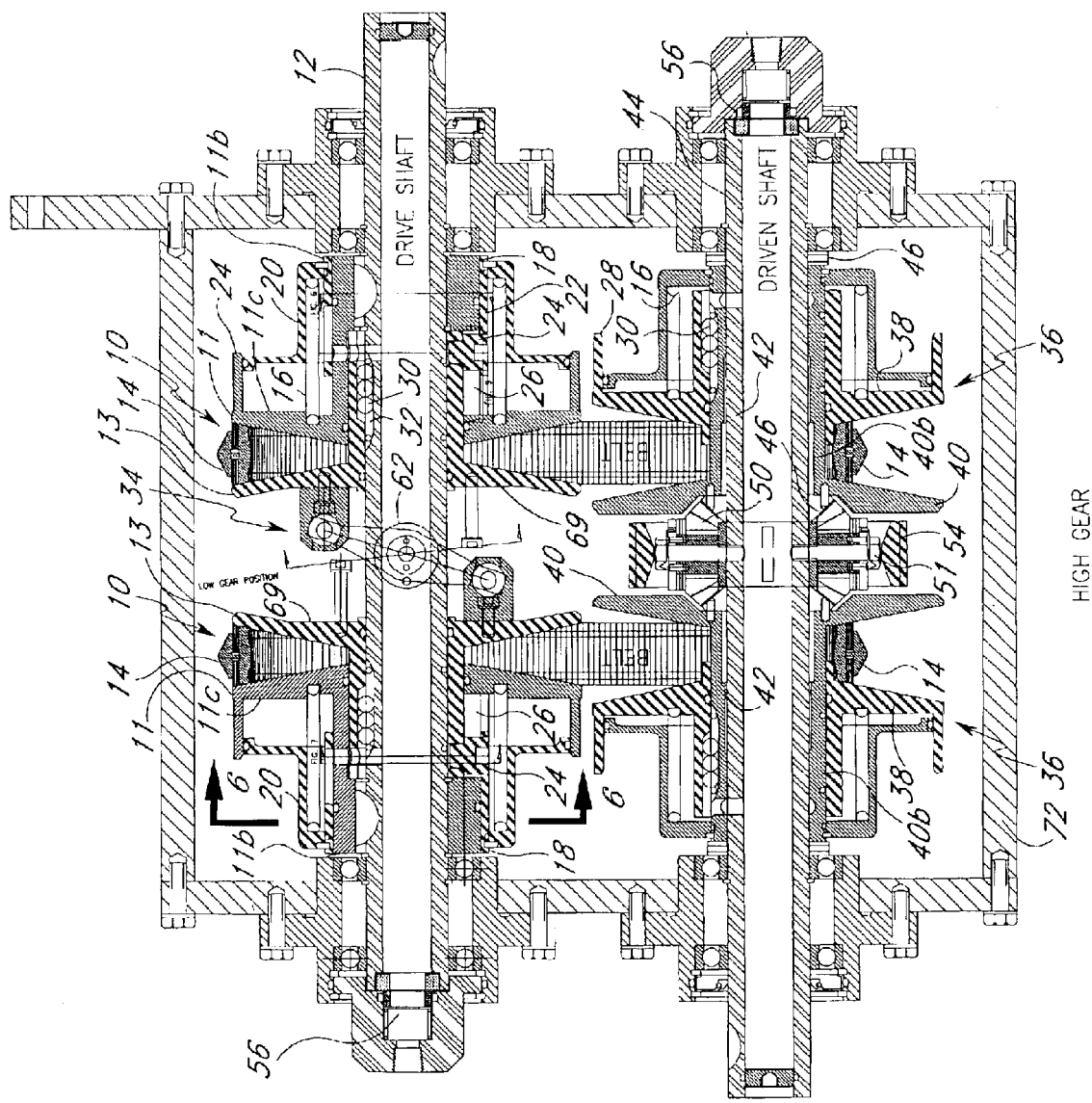
FIG. 2 is a cross-sectional view of the continuously variable transmission similar to that of FIG. 1, with the transmission positioned in a cruise or high gear position.

The two drive pulleys 10 illustrated in FIG. 1 are positioned with belts 14 at the smallest working diameter where the moveable pulley halves 13, which are axially moveable on the shaft 12, have been forced apart against the loadings of the springs 16. Comparing FIG. 1 to FIG. 2, the two drive pulleys in FIG. 2 are illustrated in a position in which the moveable pulley halves 13 and the stationary pulley halves 11 have been driven together under hydraulic forces exerted within the piston chambers 27 (see FIG. 2), which are defined by the pistons 20, the sleeves 22, and the stationary pulley halves 13. Specifically, as the pressure within the piston chamber 27 increases, the volume of the piston chamber is forced to increase. Because the stationary pulley halves 13 are fixed relative to the shaft 12, the slidable piston 20 moves outward (i.e., away from the stationary pulley half). The outward motion of the piston 20 is transmitted to the moveable pulley half 13 through the sleeve 22 and the set of bolts 24. The outward motion therefore draws the two pulley halves 11, 13 together.

As mentioned above, the moveable pulley halves 13 are preferably dynamically keyed to the drive shaft 12. In the illustrated arrangement, the dynamic key comprises the ball and elongated axial ball race arrangement. Specifically, the generally cylindrical elongated axial ball races are formed partially along an outer surface of the shaft 12 and partially along an inner surface of the hub 13b. Thus, when the outer surface of the shaft 12 and the inner surface of the hub 13b are brought together and properly aligned, the generally cylindrical elongated axial ball races 32 are defined.

With reference to FIG. 7, one preferred circumferential relationship of the ball grooves or races 32 and the bolts 24 that connect the spring loaded sleeves 22 to the moveable pulley shafts 13b is illustrated therein. Preferably, for rotational balance and other inertial reasons, the races are positioned equally about the circumference of the shaft 12 and hub 13b. More preferably, three races 32 are used and the three fasteners 24 and slots 26 interpose the three races 32.

With reference to FIG. 1, the races 32 may have a tapered configuration in transmissions formed with circular cutting tools (i.e., horizontal mills, etc.) Due to the tapered configuration, circular wire rings 60 are preferably installed in grooves around both shafts as shown. The wire rings 60 advantageously function as ball stops to prevent the balls 30 from jamming in the tapered groove extremities. As illustrated, at least three balls are preferably used; however, depending upon the radial and torsional loading of the shaft, more or less balls may also be used. Preferably, the length of the races 32 or the positioning of the wire rings 60 may be adjusted accordingly.

Figure 3:
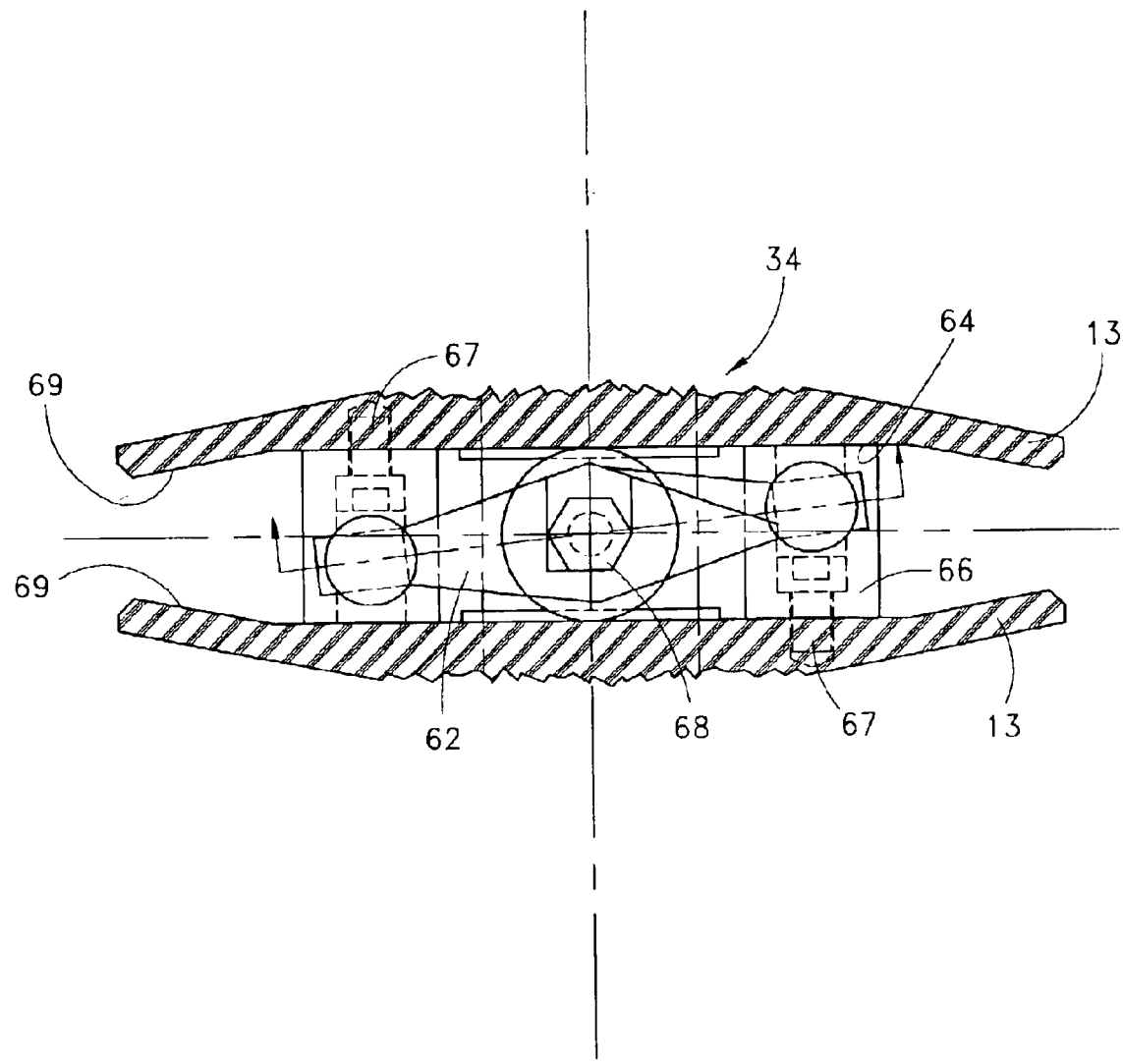
FIG. 3 is an enlarged view of a mechanical linkage configured and arranged to control a stroke of moveable halves of a pair of drive pulleys as illustrated in FIG. 1.
Figure 4:
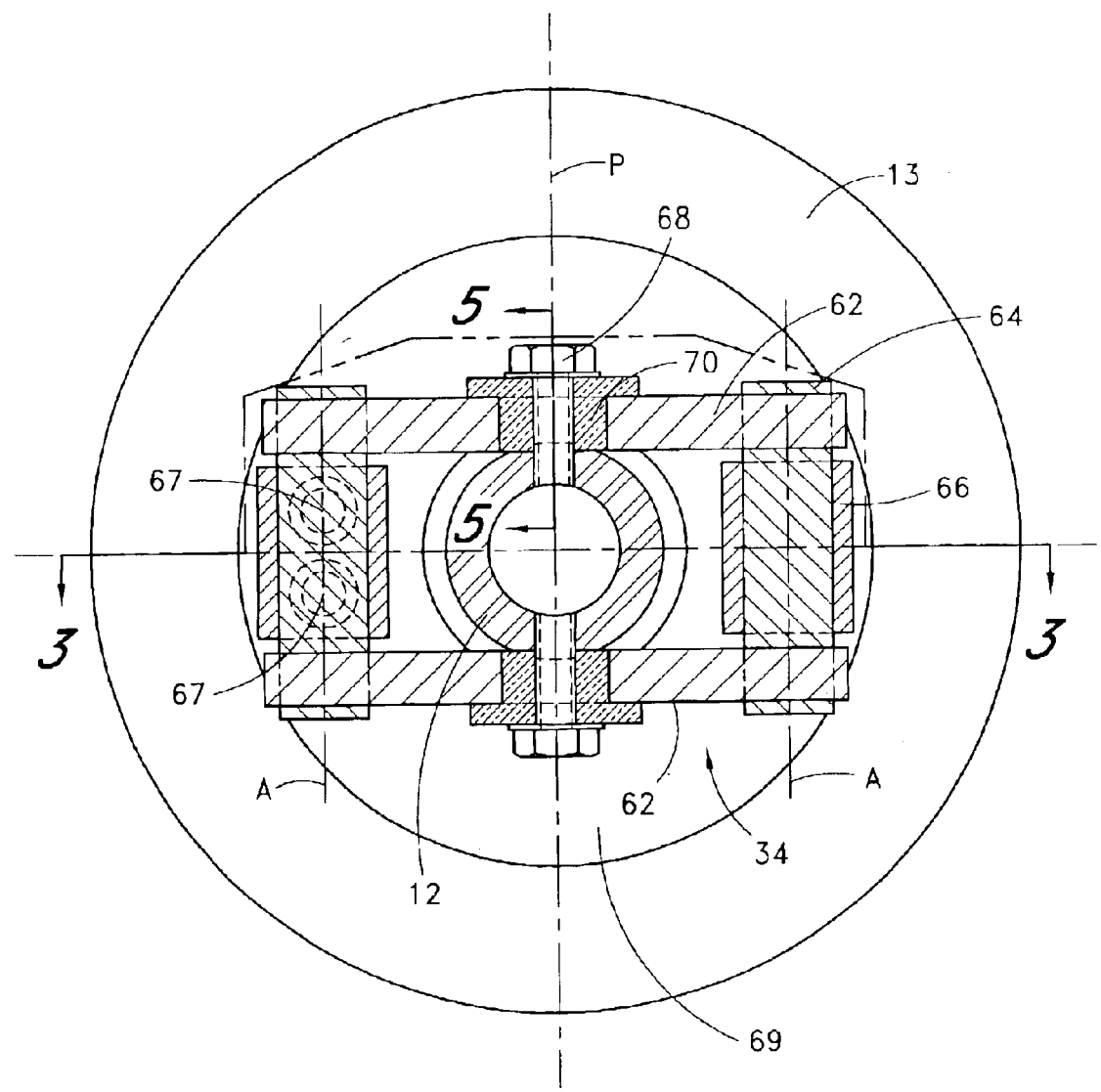
FIG. 4 is a cross-sectional view of the mechanical linkage of FIG. 3 taken through the line 4—4.
Figure 5:
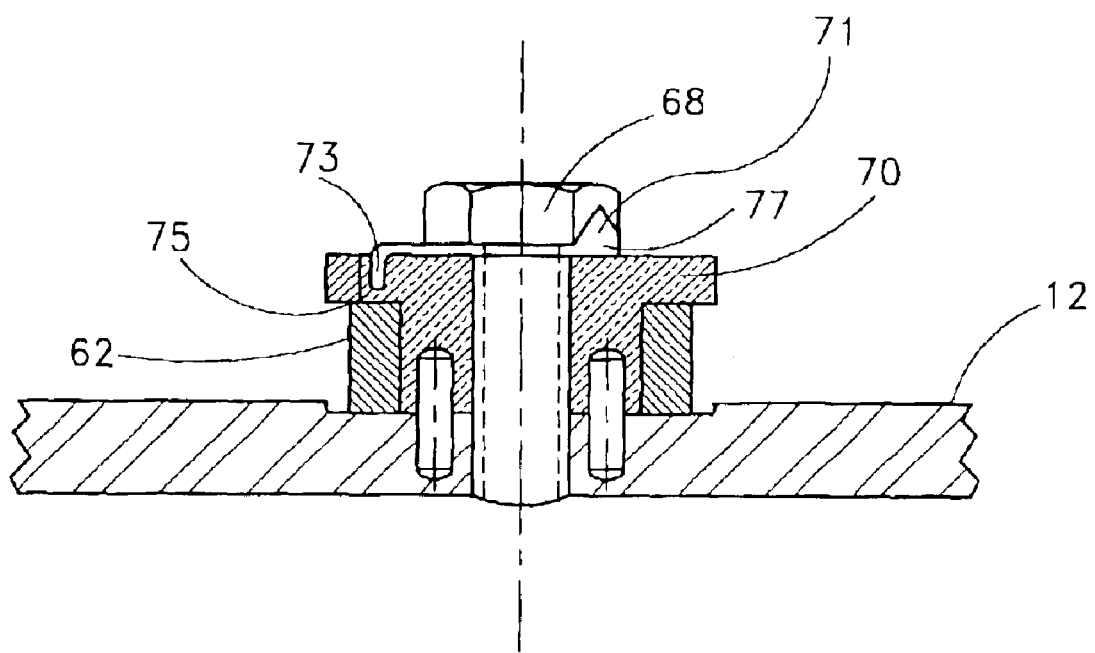
FIG. 5 is a cross-sectional view of a side of the mechanical linkage taken through the line 5—5 in FIG. 4 showing the attachment of the mechanical linkage to the drive shaft viewed at 90E from the drive shaft axis.

The present transmission preferably includes an articulating member that generally slaves movement of two adjustable pulleys together. In this manner, movement of one of the pulleys to change the belt operating diameter acts to move the other of the pulleys through the articulating member such that the sizing of the two pulleys is maintained substantially the same. With reference now to FIGS. 1 and 3, the articulating mechanism or member 34 preferably extends between the two moveable pulley halves 13 and advantageously enforces substantially equal and generally synchronous relative movement of the pulley faces 11, 13 between the extremes of travel. With reference to FIGS. 3 and 5, the illustrated articulating member 34 generally comprises a pair of beams 62, which are slidably inserted into a corresponding pair of crossbars 64. The crossbars 64 preferably are inserted through rectangular anchor pieces 66 that are bolted by bolts 67 to inner faces 69 of the moveable pulley halves 13. The crossbars 64 are capable of rotation about a rotational axis A such that the beams 62 can pivot about a pivot axis P defined through a center bolt 68.

The illustrated center bolt is threaded securely to the drive shaft 12 and positions a bearing 70 around which the beams pivot when there is movement of the pulley halves 13 axially along the drive shaft 12. The bearing is preferably a roller bearing; however, any bearing configuration, including, taper, ball, and needle, may also be used. Moreover, the bearing 70 may be replaced by a bushing. The bushing should be a generally non-galling material such as brass or plastic.

With reference to FIG. 5, the bearing 70 preferably secures the articulating beam 62 in position with a shoulder. In the illustrated arrangement, a locking tab 71 preferably secures the bearing 70. The locking tab 71 can include a short dogleg 73, which is inserted into a shallow slot 75. After the bolt 68 is tightened into position, a corner 77 of the locking tab 71 can be bent upwards against the bolt 68 to the lock the bolt against undesirable rotation. Other suitable mounting arrangements for the articulating beam and the bearing assembly may also be used.

With reference again to FIGS. 1 and 2, as the moveable pulley halves 13 move to a substantially closed position, such as that depicted in FIG. 2, the beams 62 generally allow only substantially equal movement of each pulley half relative to the pivot axis P. As the moveable pulley halves 13 move to a substantially open position, such as that depicted in FIG. 1, the beams 62 again only allow substantially equal movement of each pulley half 13 relative to the pivot axis P. Moreover, in the illustrated arrangement, because the beams 62 are connected to both the shaft 12 and the inner faces 69 of the pulley halves 13, the two pulley halves are further coupled for substantially synchronous rotational movement about an axis of drive shaft rotation.

With continued reference to FIG. 1, an output shaft 44 carries the pair of driven pulleys 36. As discussed above, the driven pulleys 36 receive torque from the drive pulleys 10 through the drive belt 14. Similar to the drive pulleys 10, the driven pulleys generally comprise moveable pulley halves 38 and stationary pulley halves 40. In the illustrated arrangement, the stationary pulley halves 40 of the illustrated driven pulleys 36 are advantageously positioned inside the moveable pulley halves 38. This relative positioning is advantageous because it allows the belt 14 to better track between the two pulleys 10, 36. Moreover, in the illustrated arrangement, because the moveable portions 13 of the drive pulley 10 are positioned to the inside for efficient slaving together, the stationary pulley halves 40 are better arranged to the inside on the driven pulley 36.

With continued reference to FIG. 1, the stationary pulley halves 40 are supported by the output shaft 44; however, the stationary pulley halves 40 are preferably not keyed, splined or otherwise affixed to the shaft 44 such that the pulley halves 40 rotate with the shaft without the use of an outside connection. While the pulley halves 40 may be fixed for rotation with the shaft in some applications, the present transmission 8 uses a differential 41, which will be described below, to transfer the rotation of the pulleys 36 to the driven shaft 44. The stationary pulley halves 40 and hubs 40b preferably are not axially moveable on the output shaft 44 and are restrained from movement at the outer extremities by needle type thrust bearings 46 in the illustrated arrangement. The thrust bearings desirably absorb or counter axial thrusts along the shaft 44, which may be set up by components of the differential 41.

The moveable pulley halves 38 and the stationary pulley halves 40 of each driven pulley 36 preferably are slidably keyed together. As discussed above, in one arrangement, the balls 30 which are positioned in axial ball races 42 accomplish this dynamic torsion coupling or dynamic keying. In the driven pulleys 36, the balls 30 and races 42 are preferably defined by an outside surface of the extended hubs 40b of the stationary pulley halves 40 and an inside surface of the hubs 38b of the moveable pulley halves 38. Also, a needle bearing 43 preferably is interposed between the shaft 44 and the hub 40b of each stationary pulley half 40. More preferably, the needle bearing 43 is positioned proximate the loading position along the shaft, which loading position is the point at which the belt 14 pulls on the shaft 44 in a direction generally normal to the axis of shaft rotation. In addition, as with the drive pulleys 10, seals 47 preferably are positioned between components that are axially moveable relative to one another (i.e., moveable pulley half 38 and stationary pulley half 40).

With reference now to FIGS. 1 and 2, the piston 20 of the driven pulley 36 in the illustrated arrangement advantageously forms the piston chamber 27 without the need for a piston sleeve 22. This is because the piston 20 of the driven pulley 36 generally does not translate relative to a hub. Instead, the moveable pulley halves 38 are moved by pressure changes within the piston chambers 27. Also, as discussed above, the springs 16 are also positioned within the piston chambers 27 of the driven pulleys 36.

With reference to FIG. 2, at the driven or output shaft 44 in the illustrated arrangement, the driven pulleys 36 are illustrated with the belts 14 at an enlarged working diameter. The enlarged diameter is formed when the moveable pulley halves 38, which are axially movable on the shaft 44, have been forced inwardly by the springs 16 and the decreased hydraulic pressure within the piston chambers 27. The driven pulley piston chamber pressure and the drive pulley piston chamber pressure control the movement of the pulleys together because the belt ideally will not stretch any substantial amount; however, this unbalanced force is typically effective to change the belt position (i.e., along the relative diameters) while the shafts are rotating.

At the illustrated driven pulleys 38, each stationary pulley half 40 advantageously incorporates a bevel gear 48 on its hub 40b. The bevel gears 48 preferably are centrally located around the output shaft 44 and form a portion of the differential 41. Thus, the bevel gears 48 preferably face each other and mesh with additional bevel gears 50, sometimes called spider gears. The spider gears 50 can rotate on corresponding stub shafts 51 that preferably are an integral part of a gear hub or sprocket connector that is coupled to the output or driven shaft 44. During operation of the transmission 8, the output shaft 44 is driven by the two pulley assembly bevel gears 48 bearing against the spider gears 50. If there is a difference in the speeds of the driven pulley assemblies, the spider gears 50 will rotate on the stub shafts 51 to accept the different speeds while the differential 41 continues transferring the output torque of each to the output shaft 44. If desired, an output can be taken from the alternate gear or chain drive 54, which is partially shown attached to the driven shaft in the same plane as the spider gears. To keep power losses to a minimum during the torque transfer with uneven pulley speeds, thrust and radial needle bearings, such as those shown, may be incorporated into the differential at loading points.

In the illustrated arrangement, the pistons, cylinders and springs shown on both shaft assemblies are essentially the same in size and operation. The springs bias the moveable pulley halves to close the belt gap and the hydraulically operated pistons add to the spring force when selectively pressurized. For example, FIG. 1 shows the unit in the low gear, or start mode, and, as rotation takes place, at some point the hydraulic control system, which can have any suitable configuration, will sense the need to change the position of the belt 14 on the pulleys to an intermediate ratio as the vehicle accelerates from a stop. A higher hydraulic pressure will then be introduced to the piston chambers 27 at the drive shaft 12 relative to that at the piston chambers 27 of the driven shaft 44 (porting not shown). Given a sufficient pressure differential, the belt gap on the drive side will start to close and the belts will climb the faces to a larger radius of operation. Since the belts cannot stretch, they will pull deeper into the gaps of the driven pulleys 36 thereby forcing the gaps to widen and compress the springs 16. If the higher pressure continues at the drive shaft 12 end the drive ratio will reach its highest point for cruise operation, as is shown in FIG. 2. To move the ratio back to the low gear or start position, the higher pressure is applied to the cylinders 18 at the driven shaft 44 to reverse the procedure, or it can be modulated somewhere in between by selectively changing the hydraulic pressure to the cylinders. In addition, while the illustrated transmission uses two separate hydraulic chambers (i.e., piston chambers), it is anticipated that movement of a single moveable pulley half may be used to cause the movement in the other moveable pulley half.

Hydraulic control pressure preferably enters each shaft interior through the fittings and mechanical shaft seals shown on each shaft from a source not shown and enters and exits the cylinders through ports provided. Advantageously, in the illustrated arrangement, some hydraulic leakage can occur through the joints and along the shafts, which leakage is intended to keep the bearings and sliding fits fully lubricated. It is anticipated, however, that further partial sealing can be accomplished given the need or desire.

Figure 8:
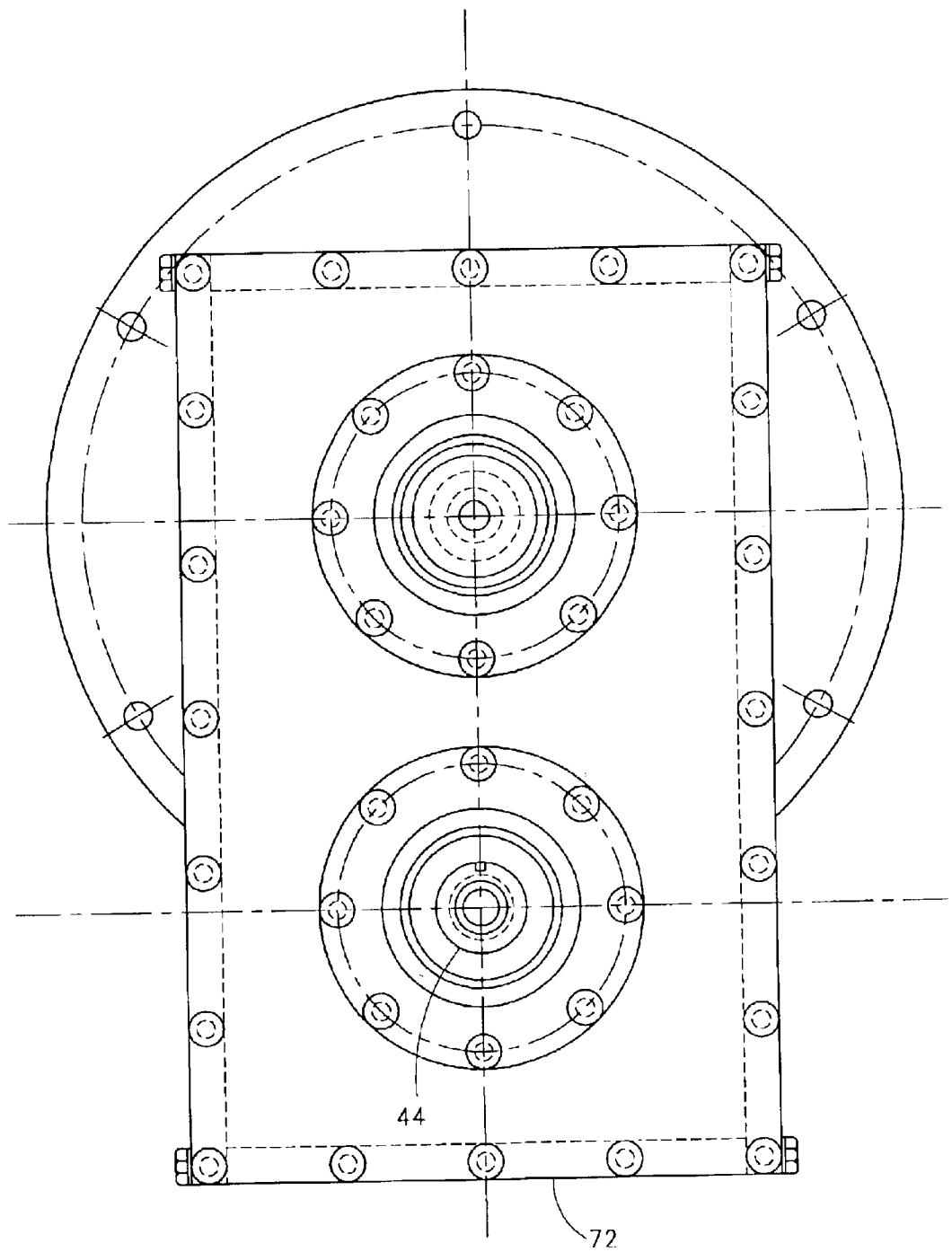
FIG. 8 is an end view of an exemplary transmission casing.

With reference now to FIG. 8, the transmission 8 is illustrated after being installed in the case or housing 22 as viewed from the output shaft 44. The case 22 as shown forms a suitable enclosure for the illustrated transmission 8. The illustrated case 22 features a bolt circle attachment geometry at the drive end. The bolt circle attachment preferably would support the attachment of the case 22 and the transmission 8 to a power source. Moreover, the output shaft 44 position and the hydraulic fitting port for control hydraulics the driving shaft are illustrated. Of course, many other case 22 structures may also occur to one of ordinary skill in the art.

Figure 10:
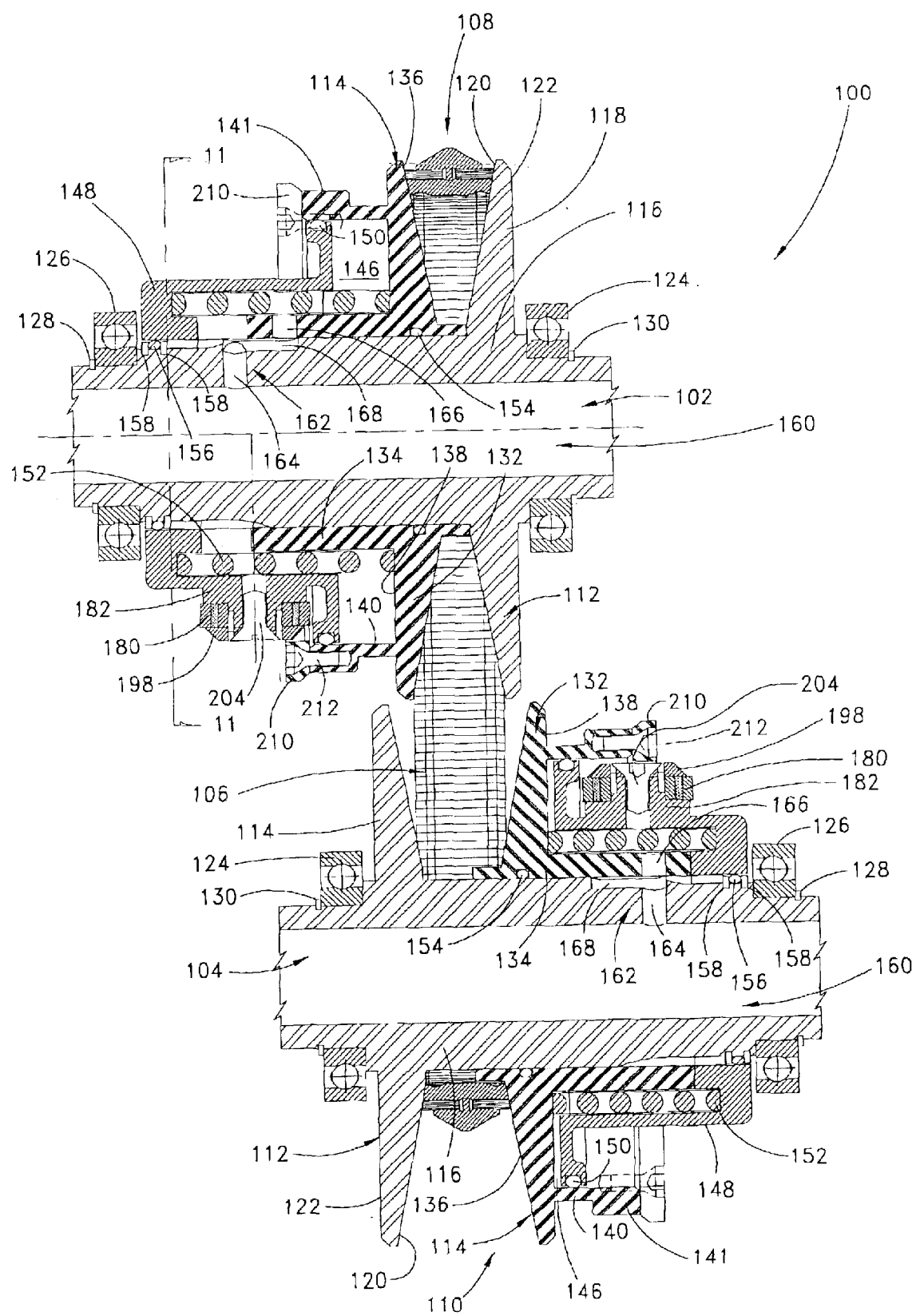
FIG. 10 is a sectioned side elevation view of another continuously variable transmission arranged and configured in accordance with certain features, aspects and advantages of the present invention and having a torque transfer bearing arrangement.

With reference to FIG. 10, a continuously variable transmission, which is advantageously arranged and configured in accordance with certain features, aspects and advantages of the present invention, is illustrated therein. The transmission illustrated in FIG. 10, which is indicated generally by the reference numeral 100, transfers rotational motion between a first shaft 102 and a second shaft 104. Preferably, the two shafts 102, 104 extend in directions generally parallel to one another. The rotational motion of one shaft is transferred to the other shaft using a drive belt 106 that extends between a first adjustable or moveable pulley 108 and a second adjustable or moveable pulley 110.

With continued reference to FIG. 10, the pulleys 108, 110 are connected to and carried by the shafts 102, 104. As used herein, the term "connected" does not necessarily require a direct connection of two components but can mean that at least one intermediate component is positioned between the two components and forms a link between the components. The shaft 102, which is an input shaft in the illustrated transmission 100, carries the first adjustable pulley 108 while the shaft 104, which is an output shaft in the illustrated transmission 100, carries the second adjustable pulley 110. Both pulleys 108, 110 preferably are configured to selectively change in effective diameter in a manner that will be described below. By changing in effective diameter, the pulley ratio may be varied, and the speeds of the shafts 102, 104 can be varied relative to one another.

The first adjustable pulley 108 is generally comprised of a stationary or fixed sheave half 112 and a moveable sheave half 114. These sheave halves are fixed or moveable in an axial direction of the shaft 102. As illustrated in FIG. 10, the stationary sheave half 114 can be integrally formed with the shaft 102 or the stationary half 112 can be formed separate from the shaft 102 while being bound thereto for rotation and axial movement. For example, the fixed sheave half 112 may be splined, keyed, interference fit, set screwed, welded or secured to the shaft 102 in any other suitable manner. Preferably, the fixed sheave half 112 is at least substantially restrained from both longitudinal movement along the shaft 102 and rotational movement relative to the shaft 102. More preferably, the fixed sheave half 112 is secured in a fixed location along the shaft 102 such that it rotates with the shaft and cannot translate axially along the shaft 102.

The fixed sheave half 112 generally comprises a hub 116 and a wheel 118. The illustrated wheel 118 further comprises a load face 120 and a back face 122. The load face 120 preferably receives and transmits axial forces between the wheel 118 and the belt 106 and preferably slopes between an inner diameter and an outer diameter of the wheel 118. The back face 122 of the illustrated wheel 118 extends in a direction generally normal to the axis of rotation of the wheel. The back face 122 can also incline relative to a plane that extends generally normal to the axis of rotation in some applications.

The wheel 118 and the hub 116 are preferably integrally formed as a single component but can be made from two components if desired. Thus, it is envisioned that the wheel 118 may be formed separate of the hub 116 and affixed thereto using any suitable manufacturing technique. In one application, the fixed sheave half 112 is manufactured from a material such as aluminum, stainless steel, steel, iron, or other suitable metal. Preferably, the fixed sheave half 112 is machined from a single piece of steel round stock. Additionally, in some transmissions 100, the fixed sheave half 112 may be forged, cast or otherwise suitably formed.

With continued reference to FIG. 10, the illustrated shaft 102 and the fixed sheave half 112 are journaled for rotation by bearings 124, 126. The bearings 124, 126 are preferably ball bearings. Of course, other types and combinations of bearings can also be used to journal the shaft 102 and the fixed sheave half 112 for rotation.

The illustrated bearings 124, 126 are positioned against a shoulder of the shaft and fixed drive sheave half combination. Moreover, retaining snap rings 128, 130 are advantageously positioned along the shaft 102 such that the bearings 124, 126 and the stationary sheave half 114 are generally interposed between the snap rings 128, 130. The snap rings 128, 130 desirably secure the bearings 124, 126 in position along the shaft. Advantageously, the snap rings 128, 130 ease the assembly of the present transmission 100.

The snap rings 128, 130 often are prone to radial expansion under high speeds. The radial expansion, in some embodiments, may allow the snap rings 128, 130 to work free from the location at which they are fixed along the shaft 102. Accordingly, a clip (see FIG. 15B) can be positioned over at least one of the snap rings 128, 130. The clip secures the snap rings 128, 130 in position under higher radial forces generated by high speed operation of the transmission 100 by opposing the expanding radial forces. Snap rings positioned outside of the clip can be provided with a tab to counter the centrifugal forces. Also, as will be discussed below, the snap rings 128, 130 can be positioned within a lumen of a casing or other housing such that radial expansion of the snap rings 128, 130 is substantially limited.

With continued reference to FIG. 10, the moveable sheave half 114 generally comprises a wheel 132 and a hub 134, such as those described above. As such, the illustrated wheel 118 includes a load face 136 and a back face 138. Preferably, the load face 136 and the back face 138 of the wheel 132 of the movable sheave half are arranged and configured as described above.

The movable sheave half 114 advantageously is configured to allow relative axial movement between the moveable sheave half 114 and the fixed sheave half 112. As such, the hub 134 of the moveable sheave half 114 preferably has an inner diameter which is slightly larger than the outer diameter of the hub 116 of the fixed sheave half 112. The clearance provided between the two sheave halves 112, 114 can facilitate relative axial movement. More preferably, the clearance allows rotational movement between the two sheave halves 112, 114 as well as relative axial movement.

With continued reference to FIG. 10, the illustrated moveable sheave half 114 also includes a circumferential cylinder 140. As illustrated, the cylinder 140 extends away from the back face 138 of the wheel 132 to form a flange 141 that is substantially concentric with the hub 134. The flange 141 preferably has at least a portion of sufficient breadth to allow three channel race blocks 210 to be attached to the moveable sheave half 114.

The channel race blocks 210 define a central aperture through which a piston 148 extends. In the illustrated arrangement, several threaded fasteners 212 are used to attach the channel race blocks 210 to the cylinder 140. As will be appreciated by those of ordinary skill in the art, the channel race blocks 210 and the cylinder 140 can also be joined in any suitable manner. Moreover, the channel race blocks 210 and the cylinder 140 can be integrally formed and secured to the wheel 132 in any suitable manner.

A piston chamber 146 is preferably at least partially defined by the race blocks 210, the cylinder 140, the back face 138 and the hub 134. Other piston chamber 146 configurations are also possible; however, the illustrated piston chamber makes efficient use of structural components and space, which results in a particularly compact arrangement for the illustrated transmission 100.

The piston 148 preferably is positioned at least partially within the piston chamber 146. In the illustrated transmission 100, the piston 148 has a portion that extends outside of the piston chamber 146 and a portion that is contained within the piston chamber 146. The portion contained within the piston chamber 146 preferably has a sliding fit with an inner surface of the cylinder 140. More preferably, a seal 150 is interposed between the piston 148 and the inner surface of the cylinder 140.

As the cylinder 140 and the moveable sheave half 114 axially translate along the shaft 102, or the hub 116 of the fixed sheave half 112, the location of the piston 148 within the piston chamber 146 varies. Thus, the volume defined between the cylinder 140, the back face 138 and the hub 134, and a face of the piston 148 that faces the back face 138 varies. As will be explained, this volumetric variation advantageously can be used to alter the positioning of the moveable sheave half 114 relative to the fixed sheave half 112.

A spring or other biasing member 152 preferably is positioned between the piston 148 and the moveable sheave half 114. The biasing member exerts a force between the piston and the moveable sheave half. The force aids movement of the moveable pulley half 114, relative to the fixed pulley half. Preferably, the biasing member 152 extends along a portion of the piston 148 such that the biasing member 152 is restrained from transverse displacement relative to the axis of the shaft 102 by the portion of the piston 148 as well as by a portion of the movable sheave half 114. Such a configuration increases the stability of the biasing member 152 in a direction that is transverse to the axis of the shaft 102.

As discussed above, the illustrated piston 148 also includes a portion positioned outside of the piston chamber 146. This portion preferably is fixed to the shaft 102 or hub 116. In the illustrated transmission 100, the piston 148 is splined and fit to the shaft/hub combination. The piston 148 desirably is fixed in an axial location along the shaft 102 by the snap ring 158. By fixing the piston 148 along the shaft 102, the moveable sheave half 114 moves relative to both the piston 148 and the fixed sheave half 112. As explained above, this movement is caused by a variation of the volume, controlled by hydraulic pressure and spring force, defined within the piston chamber 146 in combination with opposing forces being exerted by the drive belt 106 on the load faces 120, 136.

With continued reference to FIG. 10, a set of seals 154, 156 preferably are positioned along the stationary sheave half and shaft combination such that the seals are positioned to either end of the piston chamber 146. Specifically, in the illustrated arrangement, the first seal 154 is positioned within a seal groove formed on an inner surface of the hub 134 of the moveable sheave half 114. The seal 154 therefore is interposed between a portion of the movable sheave half 114 and a portion of the stationary sheave half 112. The seal 154 advantageously seals the interface between the moveable sheave half 114 and the stationary sheave half 112. Moreover, the seal 156 also is desirably positioned along the stationary sheave half 112 or the first shaft 102 such that the interface between the piston 148 and the stationary sheave half 112 or shaft 102 is also substantially sealed. As illustrated, the second seal 156 preferably is held in position by the snap rings 158. The inner snap ring 158 abuts the set of splines that secures the piston to the shaft for rotation in the illustrated embodiment. Thus, the inner snap ring 158 also reacts the full load of the hydraulic pressure within the piston chamber 146.

The snap rings 158 can also be replaced by a set of split rings. As discussed above, the snap rings 158 preferably are positioned within a lumen defined by a portion of the piston 148 such that outward radial expansion of the snap rings 158 is substantially limited. In this manner, the high rotational velocity of the shaft 102 and the pulley 108 is less likely to expand the snap rings such that the snap rings 158 can work free of their location along the shaft 102 or the pulley 108.

The shaft 102 in the illustrated transmission 100 defines an inner lumen 160. The inner lumen 160 communicates with the piston chamber 146 through a conduit 162, which generally comprises a first passage 164 through the shaft 102. The conduit also includes a passage 166 that extends through the moveable hub 134. A longitudinal passage 168 advantageously allows the piston chamber 146 to communicate with the inner lumen 160 through the two passages 164, 166 regardless of the relative longitudinal positioning of the two passages 164, 166. The inner lumen 160 may communicate with the piston chamber 146 through any other suitable arrangement of passages. For instance, a plurality of holes may be arranged such that at least two are in alignment at any given position to allow lubricant to flow through between the lumen 160 and the piston chamber 146. In addition, the passages may be connected or interrupted at various positions between the fixed and moveable hubs.

With reference now to FIGS. 1 through 5, one arrangement of the present invention also includes an advantageously arranged torque transfer mechanism. This torque transfer mechanism allows the moveable sheave half 114 to move along the shaft 102 while still being coupled to the shaft 102 for rotational movement. More specifically, while the moveable sheave half 114 is capable of longitudinal movement relative to the shaft 102, the adjustable sheave half 114 is also coupled to the shaft 102 for rotational movement with the shaft 102.

Figure 11:
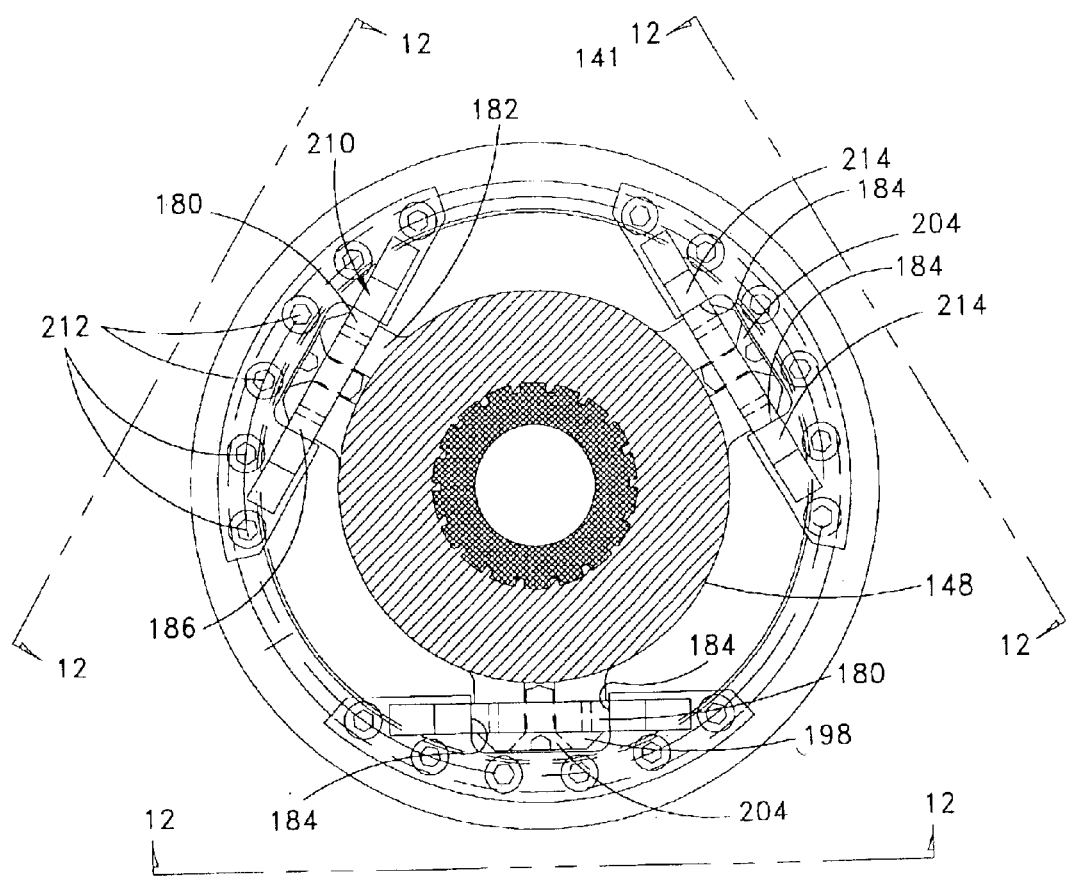
FIG. 11 is a sectioned end view of the transmission of FIG. 10 showing the torque transfer bearing mounting arrangement, which view is taken along the line 11—11 in FIG. 10.

With continued reference to FIGS. 1 through 5, a set of roller bearings 180 are mounted to corresponding bosses 182, which extend from a portion of the illustrated piston 148. With reference to FIG. 11, the present transmission 100 employs three substantially equally spaced roller bearings 180 that cooperate with corresponding channel races 184 to couple the moveable sheave half 114 to the piston 148. It is anticipated that two, or more than three, bearing/race pairings may also be used; however, the use of three pairings is presently preferred as the stability of the connection is markedly improved over the use of two pairings and four pairings may result in unnecessary alignment difficulties. Moreover, the roller bearing 180 preferably is a cylindrical or needle type roller bearing. While the present transmission employs a needle type roller bearing 180, it is anticipated that, in some applications, a transmission may also employ a type of thrust bearing, a type of ball bearing, or the like.

Figure 13:
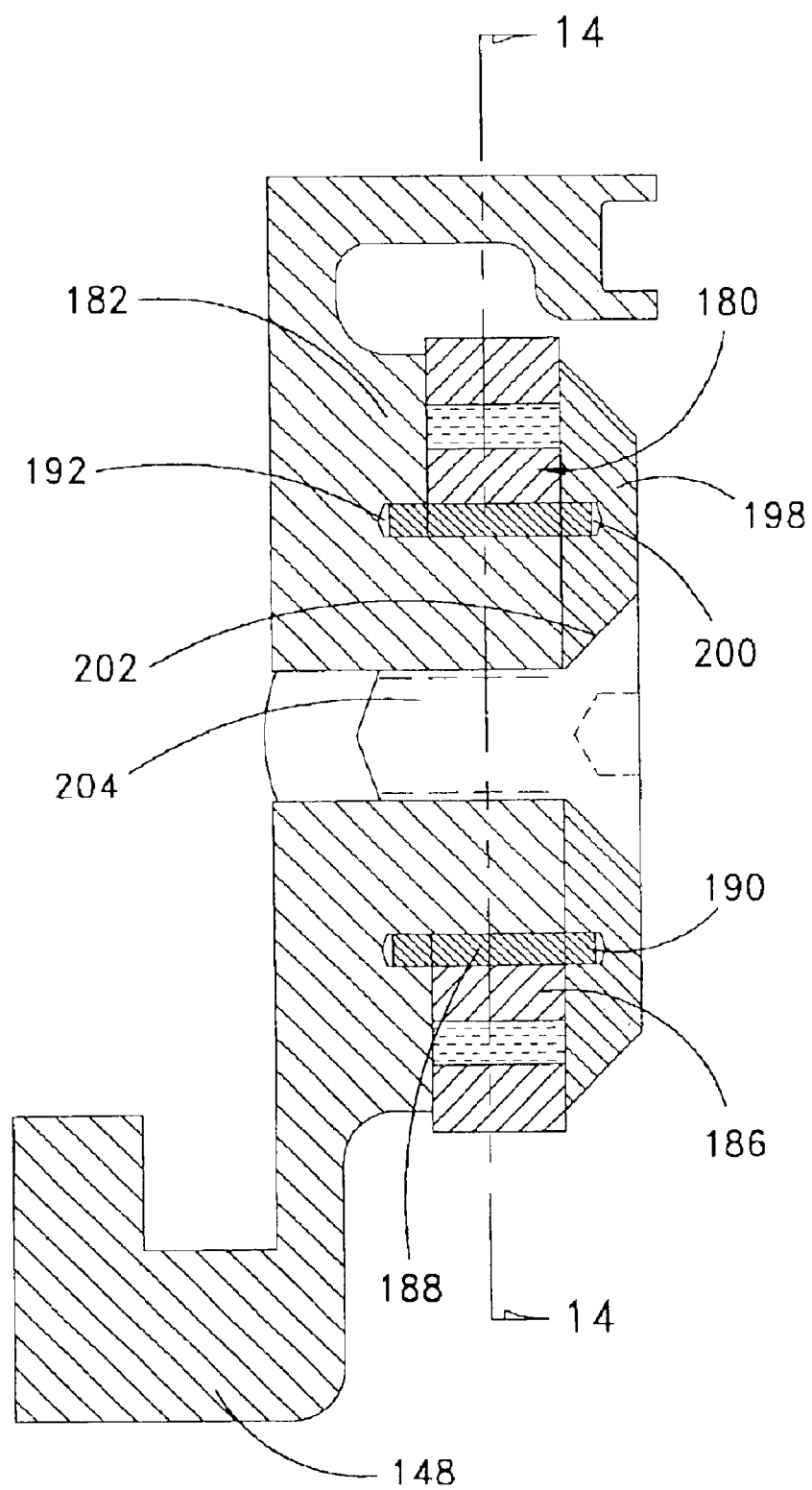
FIG. 13 is an enlarged view of the torque transfer bearing mounting arrangement of FIG. 10 taken along the line 13—13 in FIG. 12.
Figure 14:
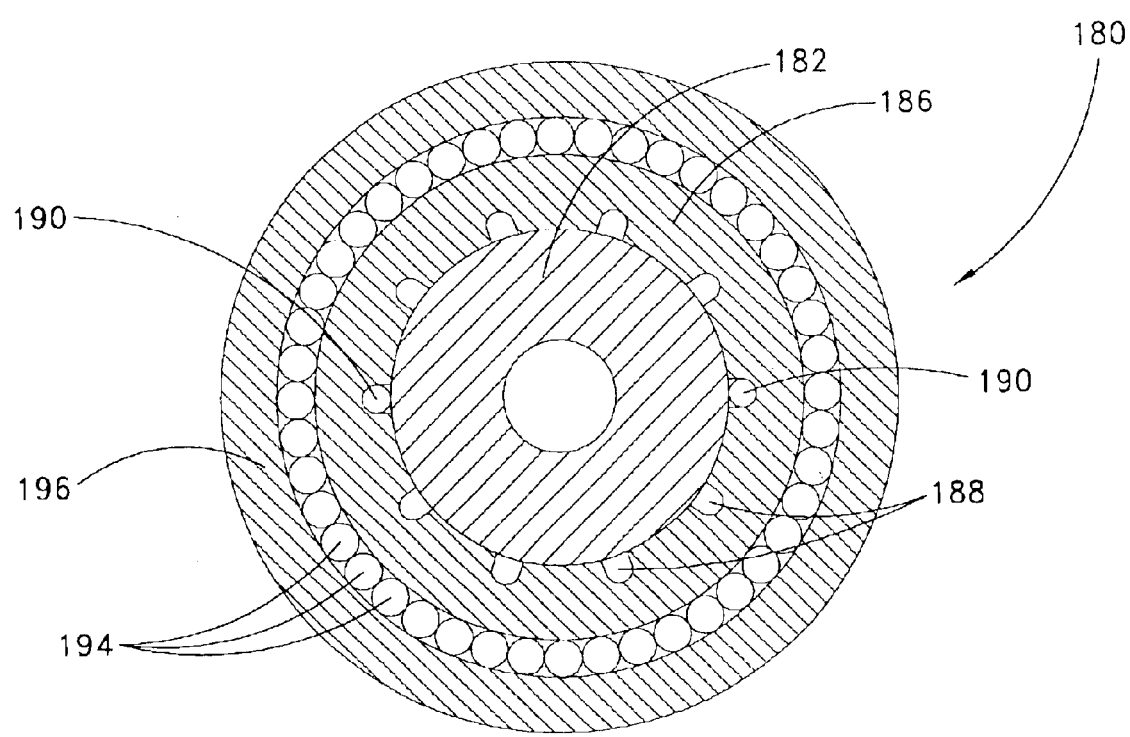
FIG. 14 is a sectioned view of the bearing mounting arrangement taken along the line 14—14 in FIG. 13.

With reference now to FIG. 14, the roller bearing 180 generally comprises an inner eccentric race or sleeve 186 that may be selectively positioned and secured to the boss 182. Specifically, the illustrated inner sleeve 186 has a plurality of slots 188 that substantially parallel a rotational axis of the roller bearing 180. Preferably, the slots 188 accommodate indexable pins 190 that may be used to secure the inner sleeve 186 in a rotational position on the boss 182 such that the sleeve 186 is substantially restrained from rotational movement relative to the boss 182. In particular, the boss 182 preferably includes blind holes 192 (see FIG. 13) such that at least one pin 190, but preferably two pins, can connect the slots 188 to the holes 192. Such pins 190 allow the roller bearing 180 to be adjusted and aligned within the channel race 184 as shown on FIGS. 11 and 12.

Once properly aligned, the bearing 180 can be secured in position within the channel race 184 by the pins 190 such that allowable manufacturing tolerance limits may be expanded over a non-adjustable variation. More specifically, the inner race 186 can be secured in rotational position relative to the boss 182 by inserting the pins 190 through the slots 188 into the blind holes 192. Because the illustrated roller bearing 180, and specifically the inner race 186, is slightly eccentric, inner race 186 may be rotated about the boss 182 to compensate for variations in the radial position of a particular channel race 184, as will likely result from serial manufacturing of transmissions.

With continued reference to FIG. 14, the roller bearing 180 preferably includes a plurality of needles 194 that are positioned between the inner race 186 and an outer race or sleeve 196. As described above, the outer sleeve 196 preferably is assembled in a close fitting relationship (i.e., substantially sliding fit) relative to the sides of the channel race 184. The outer sleeve 196 rolls on the cylinders 194 and, thereby, rolls on the inner sleeve 186.

A bearing cap 198 preferably holds in place the pins holding the illustrated roller bearing 180 in position relative to the boss 182. In the illustrated transmission 100, the bearing cap includes two holes 200, which advantageously align with the slots 188 and which accommodate the pins 190. Moreover, the bearing cap 198 preferably includes a countersunk hole 202 that accommodates a threaded fastener 204, which is used to connect the bearing cap 198, roller bearing 180 and boss 182 together. Of course, the bearing cap 198 could be a washer or could be integrally formed with the threaded fastener or other mounting assembly. Moreover, the boss 182 could include a partially threaded stud on which the roller bearing 180 could be mounted and on which a nut may be positioned to secure the roller bearing 180 in place. In some arrangements, the pins could form an integral part of the bearing cap 198.

As illustrated in FIG. 10, the illustrated mounting assembly (i.e. the boss 182, the bearing cap 198 and the fastener 204) is arranged such that it fits within the cylinder 140. In this manner, the mounting assembly does not obstruct movement of the moveable sheave half 114 relative to the piston 148 while maintaining a compact construction. It is anticipated, however, that the mounting assembly also can be positioned to remain outside of the piston 148 during the full range of movement in certain applications.

Thus, one aspect of the present transmission preferably comprises a unique bearing arrangement for transferring torque between a shaft and an adjustable pulley. Advantageously, the bearing is positioned to the outside of an interface between the moveable sheave half of the adjustable pulley and the fixed pulley sheave half. Moreover, the bearing preferably is configured to be adjustable such that manufacturing imperfections can be accommodated. In this manner, among others, the present transmission provides an adjustable assembly that advantageously accommodates manufacturing imperfections and allows a plurality of bearing assemblies to transfer substantially equal loads.

Figure 12:
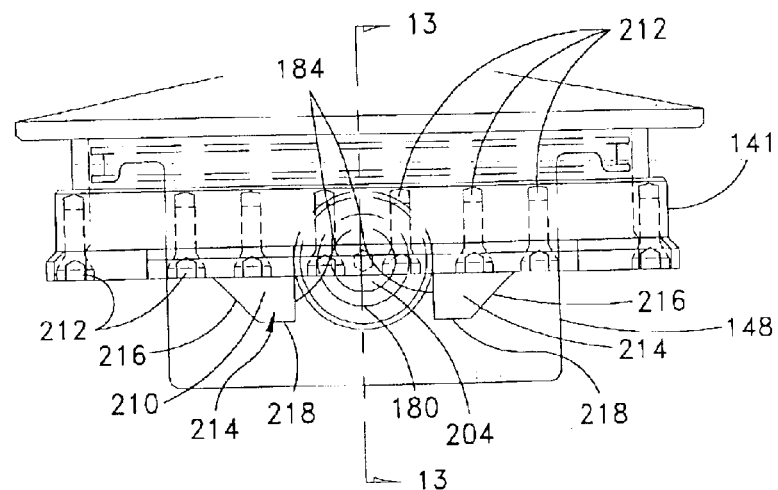
FIG. 12 is an external view of the bearing mounting arrangement of FIG. 11 taken along the line 12—12 in FIG. 11.

With reference now to FIGS. 11 and 12, three roller bearings 180 are illustrated in position about the circumference of the piston 148. The illustrated roller bearings 180, as described above, are capable of rolling movement along a side of the corresponding channel races 184, which preferably extend in the same general direction as the axis of rotation of shaft 102 and hub 134 (i.e., in and out of the paper in FIG. 11). Each channel race 184 is generally defined within a race block 210. With reference to FIGS. 11 and 12, the race blocks 210 preferably form chords of the circumference defined by the cylinder flange 141.

In the illustrated transmission 100, the race blocks 210 are secured to the cylinder flange 141 of the moveable sheave half 114 using the threaded fasteners 212. The race blocks 210 each generally include a pair of extended flanges 214. As illustrated, to reduce unneeded mass and, accordingly, weight, the flanges 214 have a sloping face 216 that extends inwardly and that terminates with a flat face 218. The flat face 218 provides a portion of adequate thickness for carrying the applied loads encountered during use of the transmission while the sloping face 216 adds reinforcement without unduly increasing the weight of the race blocks 210.

Having described the components of the first moveable pulley 108, the second moveable pulley 110 of the transmission 100 illustrated in FIG. 10 is generally a mirror image of the first movable pulley 108. Accordingly, like reference numerals are used to refer to like components. The illustrated transmission 100 advantageously uses the roller bearings 180, with cooperating with the channel races 184, to transfer torque between the pulleys 108, 110 and the respective shafts 102, 104. Thus, the torque transfer components are positioned outside of the sliding fit between the hubs 116, 134 of the stationary sheave 112 and the movable sheave 114. Moreover, the torque transfer components generally are connected to the piston 148. The piston 148, however, is splined to the shaft 102. In this manner, the torque may be transferred between the movable sheave 114 and the shaft 102, through the piston 148, while the movable sheave 114 is translating relative to the shaft 102. Similar movements preferably are found in the second pulley 110 and in its connection to the shaft 104.

An advantage of the present embodiment of the present transmission 100 is that the assembly of the transmission 100 allows adjustment of the torque transfer components. Specifically, the roller bearings can be adjusted to ascertain that each bearing is making contact with the respective channel race 184 substantially simultaneously with the other bearings. Thus, side loading of the adjacent elements may be reduced or, optimally, eliminated. This feature also enables each bearing to carry its own load without distributing a portion of its load to another bearing. Moreover, this feature relaxes the need for high tolerance restraints during manufacturing.

As described above, a simple rotation of the inner race 186 about the boss 182 accomplishes the adjustment of the bearing fit. If the centerlines of the piston housing bosses and the channel race centerlines do not substantially coincide, the bearing outer sleeve can be shifted radially either way to achieve a substantially perfect alignment. Once aligned, the pins can be installed through the slots and the pins can be secured in place with the bearing cap such that the inner sleeve cannot rotate relative to the boss.

With reference now to FIG. 15, another transmission, indicated generally by the reference numeral 300, having certain features, aspects and advantages in accordance with the present invention is illustrated therein. The transmission 300 advantageously uses a pair of variable speed drives, indicated generally by the reference numerals 302a, 302b, to transfer a rotational motion between a first shaft 304 and a second shaft 306. The variable speed drives 302 are preferably housed within a transmission casing, which is indicated generally by the reference numeral 308.

With continued reference to FIG. 15, the illustrated casing 308 desirably is formed from two substantially identical portions 310a, 310b. In some arrangements, the casing 308 can be formed in four quarter portions while in other arrangements, the casing can be split in a plane generally transverse to that shown. Preferably, each of the casing portions 310a, 310b includes a raised flange 312a, 312b. The flange is arranged and configured to accept a plurality of threaded fasteners 314. The fasteners 314 hold the flanges 312a, 312b together when assembled. Moreover, a seal 316 desirably is positioned between the two halves 310a, 310b such that the connection between the two portions 310a, 310b is substantially sealed when fastened together by the threaded fasteners 314.

Figure 17:
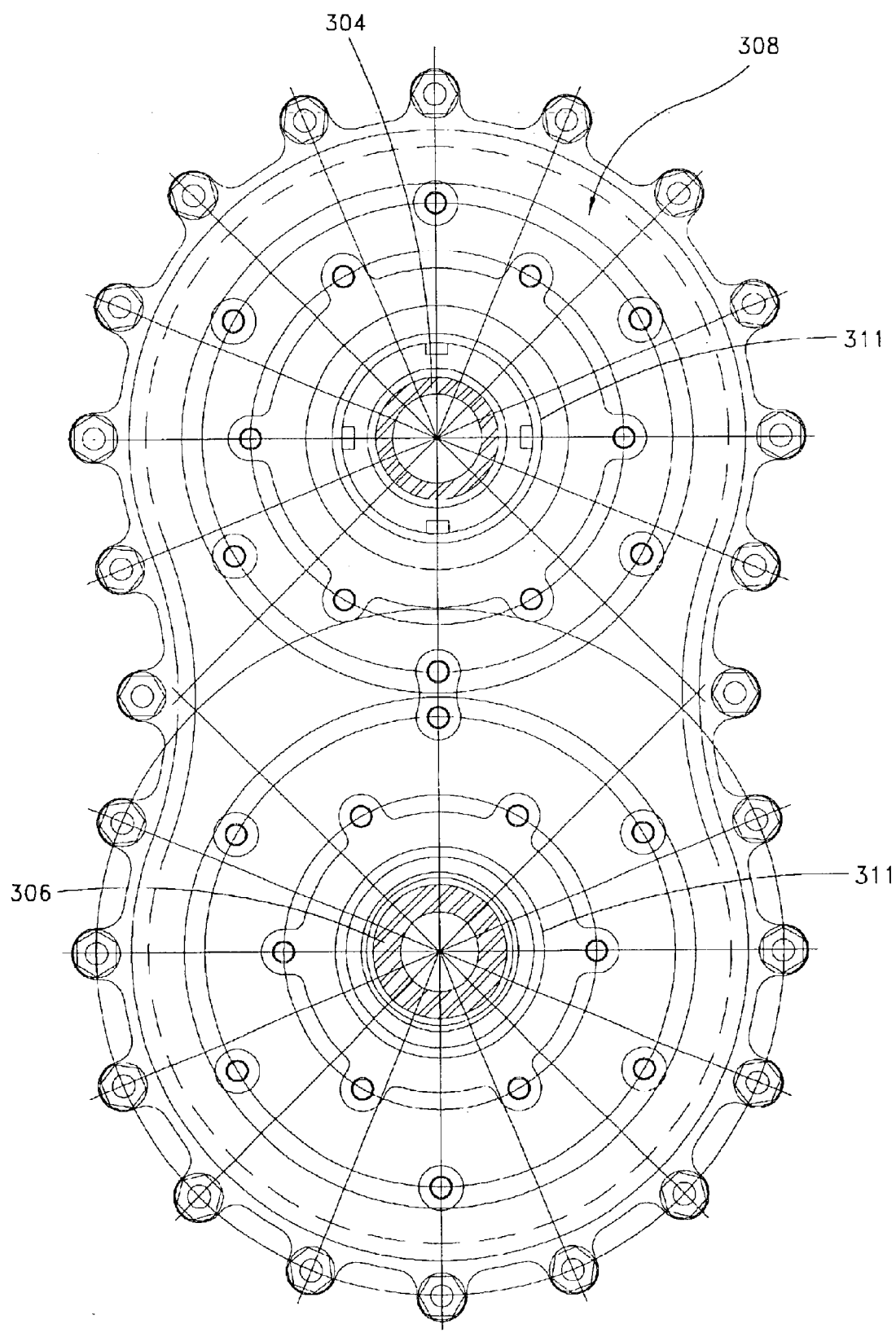
FIG. 17 is an end view of the transmission case shown in FIG. 15.
Figure 20:
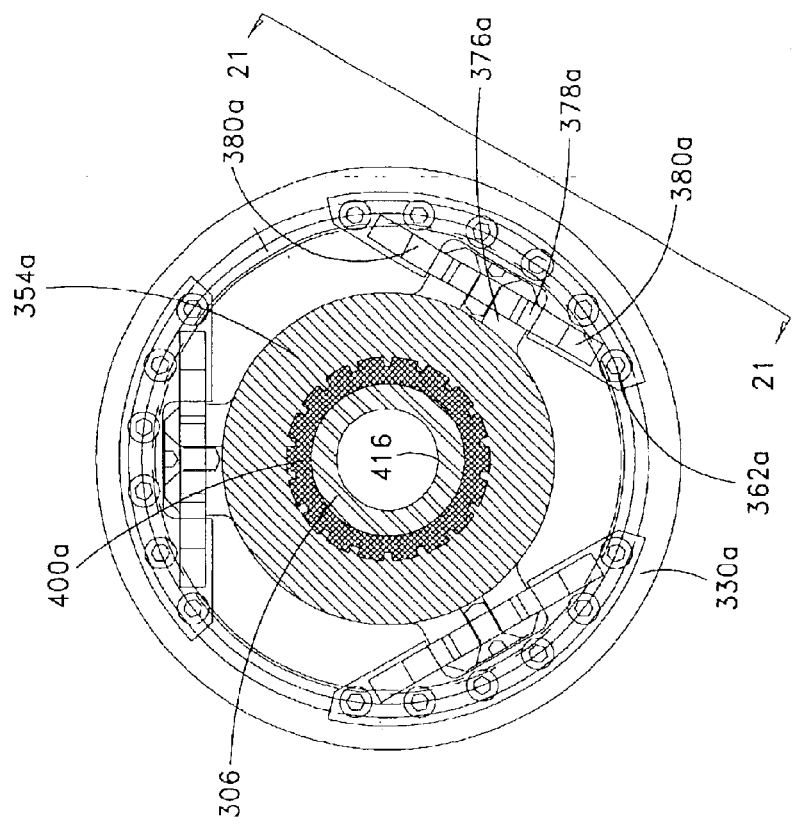
FIG. 20 is a sectioned end view of a torque transfer spline and bearing mounting arrangement for an adjustable pulley of the continuously variable transmission taken along the line 20—20 in FIG. 15A.

With reference to FIG. 17, the casing 308 preferably includes a plurality of apertures 311 which allow the shafts 304, 306 to extend outward from the transmission casing 308 in a manner illustrated in FIG. 15. While not shown, various maintenance ports can also be provided. Preferably, the casing portions 310a, 310b are cast of an aluminum alloy and preferably both portions 310a, 310b are substantially identical such that a single mold may be used for both portions. Any of a number of suitable transmission housing configurations may also be used.

With continued reference to FIG. 15, each of the two variable speed drives 302a, 302b, generally comprises a drive pulley 318a, 318b and a driven pulley 320a, 320b. The drive pulley 318a drives the driven pulley 320a using a belt 322a. Similarly, the drive pulley 318a is connected to the driven pulley 320a using a belt 322b. Thus, the drive pulleys 318a, 318b drive the driven pulleys 320a, 320b using a belt 322a, 322b. As illustrated in FIG. 15, both the drive pulleys 318a, 318b and the driven pulleys 320a, 320b are configured to selectively change in effective diameter in a manner that will be described below. By changing in effective diameter, a pulley ratio (i.e., the effective diameter ratio between a drive pulley and a driven pulley) can be varied and, consequently, the speeds of the shafts 304, 306 can be varied relative to one another.

In general, two different mechanisms that transfer torque between pulleys and shafts are illustrated in the transmission 300. However, it should become readily apparent to one of ordinary skill in the art that any of the torque transmitting mechanisms described herein can be used together with or exclusive of any of the other torque transmitting mechanisms disclosed herein. Moreover, while each torque transmitting mechanism is illustrated on both pulleys of a single variable speed drive, it is also anticipated that the torque transmitting mechanism can be varied between the two pulleys on any single variable speed drive. It is understood that "torque transmitting mechanism" as used herein shall mean a mechanism used to transfer torque between a shaft and a pulley such that the two must rotate together at the same speed.

Figure 15A:
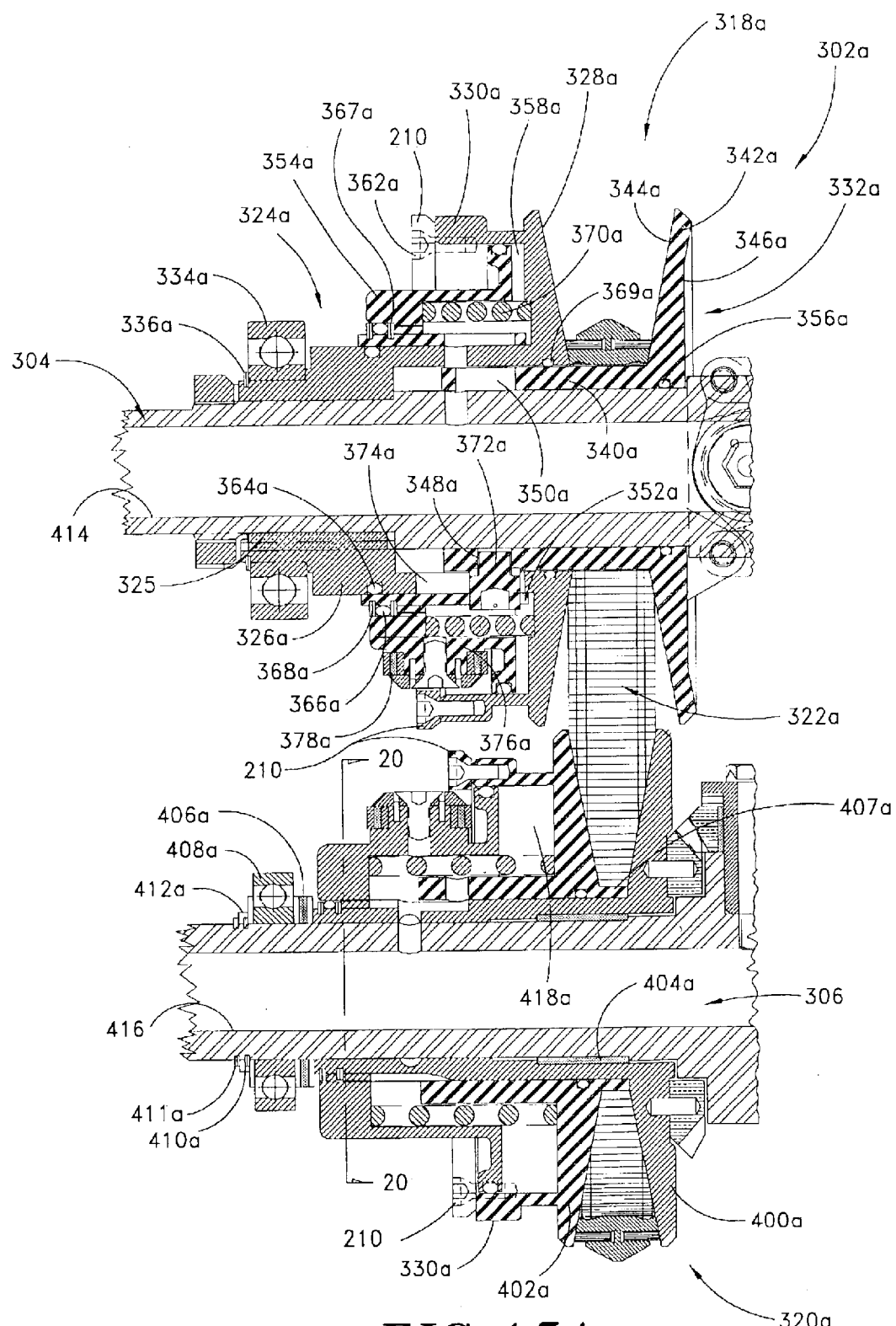
FIGS. 15A and 15B are enlarged views of FIG. 15 shown without the illustrated transmission case.

With reference to FIG. 15A, the variable speed drive 302a will be described in detail. As mentioned above, the variable speed drive 302a generally comprises the drive pulley 318a, the driven pulley 320a and a drive belt 322a that extends between the drive pulley 318a and the driven pulley 322a. The drive pulley 318a generally comprises a fixed sheave half 324a and a moveable sheave half 332a. As explained above, the moveable sheave half 332a desirably is capable of axial movement (i.e., along the axis of the shaft 304) relative to the fixed sheave half 324a. In some transmissions, the moveable sheave half 332a also is substantially free for rotational movement relative to the shaft 304.

With continued reference to FIG. 15A, the fixed pulley sheave half 324a is desirably interference fit and keyed to the shaft 304 or otherwise suitably affixed to the shaft such that it rotates with the shaft and such that it is substantially restrained from translation along the shaft. In the presently preferred transmission 300, the fixed sheave half 324a is slid into place along the shaft 304 such that the fixed sheave half 324a is interference fit on the shaft 304. Moreover, the shaft 304 and the fixed sheave half 324a are joined together along a keyway 325 in the illustrated arrangement.

Similar to the movable pulley sheave half 114 described above, the fixed sheave half 324a in the present transmission 300 features a hub 326a, a wheel 328a and a cylinder 330a. With continued reference to FIG. 15A, the illustrated hub 326a features a step configuration. The hub 326a cantilevers the wheel 328a and the cylinder 330a such that the wheel 328a and the cylinder 330a are advantageously suspended away from the shaft 304. Thus, the step configuration allows the hub 326a to accommodate a hub of a movable pulley sheave half 332a, which will be described below. Moreover, the step configuration allows the fixed sheave half 324a to be carried by a bearing 334a. The bearing 334a is secured in position using a snap ring 336a such as that discussed above in the transmission 100. This arrangement increases the rigidity of the construction.

As with the wheel described in the above transmission 100, the wheel 328a further comprises a load face and back face. The load face preferably receives and transmits axial forces between the wheel and the belt and preferably slopes between an inner diameter and an outer diameter of the wheel 328a. The back face of the illustrated wheel 328a extends in a direction generally normal to the axis of rotation of the wheel 328a. The back face can also incline relative to a plane that extends generally normal to the axis of rotation in some transmissions.

As discussed above, the wheel 328a and the hub 326a are preferably integrally formed in a single component in one arrangement having certain features, aspects and advantages of the present invention. The fixed sheave half 318a preferably is manufactured from materials such as aluminum, stainless steel, steel, iron, or other suitable metal. More preferably, the fixed sheave half 318a is machined from a steel casting. It is also envisioned that the wheel 328a or cylinder 140 can be formed separate of hub 326a and affixed thereto using any suitable manufacturing technique. Additionally, in some transmissions, the fixed sheave half 318a can be forged or otherwise suitably formed.

The moveable sheave half 332a is greatly simplified in structure in the transmission 300 of FIG. 15. With reference to FIG. 15A, the moveable sheave half 332a is generally comprised of a hub 340a and a wheel 342a. As described above, the moveable sheave half 332a preferably includes a load face 344a and a back face 346a. Preferably, the load face 344a and the back face 346a of the wheel 342a are arranged and configured as described above with respect to the wheel 328a of the fixed sheave half 324a. In addition, the wheel 342a is preferably substantially matched to the wheel 328a of the stationary sheave half 324a. Of course, other configurations of the movable sheave half hub and wheel are also possible.

The hub 340a of the moveable drive sheave half 332a includes a plurality of threaded apertures 348a and at least one slot 350a. The threaded apertures 348a, as will be described below, are used to secure the hub 340a of the moveable sheave half 332a to a sleeve 352a that is splined to a piston 354a, which will also be described below. The illustrated hub 340a also features an internal ring groove that receives a seal 356a, which seal 356a is similar to the seal 154 discussed above. Clearance preferably is provided between the hub 340a and the hub 326a and the shaft 304. This clearance stack up facilitates the relative axial movement of the pulley. As used herein, the term "clearance stack up" means the sum of the clearances provided between both the shaft and the moveable hub, and the moveable hub and the stationary hub. Notably, the clearance stack up preferably allows both rotational movement between the two sheave halves as well as axial movement between the two sheave halves.

The hub 340a slides along the shaft 304 and preferably is axially and rotatably moveable relative to the shaft 304 and the hub 326a of the fixed sheave half 324a. Preferably, at its extreme of travel toward the fixed sheave half 324a, the hub 340a will stop at the shoulder of the step of the hub 326a such that the relative axial motion between the fixed drive sheave half 324a and the moveable drive sheave half 332a is limited by the halves 324a, 332a. As will be discussed below, an adjustable stop arrangement can also be used to synchronize rotational speeds of the pulleys of the two drives. The adjustable stop can enable the two pulleys to be adjusted to have substantially the same working diameter at one extreme of travel.

Close tolerance dimensions of both parts can be used to accurately control the belt working radii for near synchronous operation of the driven pulleys at the extreme of travel (i.e., high gear or cruise position). Shims can also be used. The same goal of dimensional accuracy applies to positive stops for the driven pulley halves at the low gear extreme of travel. It is practical using this method of groove width control, to keep the driven pulleys in the high gear position as speeds within 2% of each other. For example, at cruise rpm of the output shaft of about 5,000 rpm the driven pulley speeds would differ within about 100 rpm. The drive shaft pulleys, of course, always operate at the same rpm because they are fixed for rotation with the shaft. In consideration of the above, it is easy to understand that the work of the differential only deals with about 2% of the total power passing through the dual belt system while eliminating virtually any possibility of the belts bucking each other.

With continued reference to the arrangement of FIG. 15A, the piston 354a is connected to the sleeve 352a. The piston 354a slides relative to the wheel 328a and the cylinder 330a such that a volume defined between the piston 354a, the wheel 328a and the cylinder 330a (i.e., a piston chamber 358a) is variable. As illustrated, a set of channel blocks 210 enclose the opposite side of the piston 354a. The channel blocks 210 are attached to the cylinder 330a through a plurality of threaded fasteners 362a, although any suitable manner of connecting the channel blocks 210 and the cylinder 330a may be used.

A seal 364a preferably is positioned between the sleeve 352a and the hub 326a of the fixed drive sheave half 324a.

Also, a seal 366a preferably is secured by a set of snap rings 368a between the piston 354a and the sleeve 352a. Moreover, a seal 369a preferably is positioned between the hubs 326a and 340a. In addition, a seal 356a can be positioned between the shaft 304 and the bore of the movable pulley half 332a. Thus, the piston chamber 358a is substantially liquid tight and generally sealed from outside dirt, dust, grime and debris even as the two hubs 326a, 340a are moved relative to one another. The seals 356a, 364a, 366a, 369a also can serve as wipers to remove dirt and debris during movement.

A biasing member, such as a spring 370a, preferably is captured within the piston chamber 358a. The biasing member can exert a biasing force between a portion of the piston 354a and a portion of the wheel 328a of the fixed sheave half 324a. The biasing force helps move the pulley 318a to a closed position by urging the two pulley halves 324a, 332a toward one another while the pulley 318a closes under hydraulic forces. A snap ring 367a carries the load of the piston 354a and transfers it to the sleeve 352a.

The piston 354a is connected by the snap ring 367a and splined to the sleeve 352a. The sleeve 352a slides over the hub 326a and is connected to the hub 340a for rotation and axial loads by a set of lugs 372a. As illustrated, the lugs 372a are threaded into the hub 340a but clearance preferably is maintained between the holes in the sleeve through which the lugs extend and the lugs themselves. The fixed hub 326a preferably includes a set of slots 374a in which the lugs 372a freely slide without substantial touching. The slots 374a allow the lugs 372a to couple the hub 340a to the sleeve and piston combination for axial motion although the fixed hub 326a is interposed between the moveable hub 340a and the sleeve and piston combination.

The piston 354a is coupled against relative rotational motion to the fixed pulley using a roller bearing and channel race arrangement such as that described above. As described above, the piston 354a includes a set of bosses 376a. A corresponding set of roller bearings 378a is journaled for rotation on the bosses 376a. As explained above, the inner races of the roller bearings 378a are desirably slightly eccentric such that the roller bearings may be indexed to closely fit within a set of channel races 184, similar to those that are described in detail above. As the fixed sheave half 324a rotates, the channel races 184 exert a force on the roller bearings 378a. This transfers the force to the piston 354a. Thus, the roller bearings 378a and the channel races 184 form a torsion coupling. As also explained above, the roller bearings 378a are substantially freely translatable within the channel races 184 such that the roller bearings allow relative axial movement between the fixed sheave half 324a and the piston 354a. Thus, a dynamic key is formed by this combination of components.

With continued reference to FIG. 15A, the drive pulley 318a drives the driven pulley 320a with the drive belt 320a. The driven pulley 320a, similar to the drive pulley, is generally comprised of a fixed sheave half 400a and a moveable sheave half 402a.

Structurally, the driven pulley 320a is generally configured in the same manner as the drive pulley 112 and the driven pulley 114 of the transmission 100 illustrated in FIG. 10. Thus, further description of those elements described and illustrated above is deemed unnecessary; however, the pulley 320a is generally free to rotate relative to the shaft 306. Accordingly, to reduce frictional losses, certain components, which will now be described in detail, have been slightly modified. For instance, a needle bearing 404a has been positioned between the shaft 306 and the fixed driven sheave half 400a. Additionally, more clearance has been provided between the two components. Both of these features advantageously decrease frictional losses encountered in the transmission 300.

Moreover, as illustrated in FIG. 15A, a set of needle bearings 406a have been positioned between the end of the hub of the fixed driven sheave half 400a and the bearing 408a. The bearing 408a journals the shaft 306 for rotation while the needle bearings 406a absorb thrust forces exerted along the axis of the shaft 306 by the differential gears which react against the stationary pulley half 400a. Again, this construction further reduces friction losses caused by the system and results in a more efficient transmission. It will be recognized by those of ordinary skill in the art, however, that a less efficient transmission may be suitable for some applications.

As illustrated, the hubs of the moveable pulley halves 402a of the driven pulleys 320a include an inner stopping member 407a. The stopping member 407a extends forward into the area between the two sheave half wheels to form a stopping surface such that the relative movement of the pulleys toward one another can be controlled at a minimum spacing. Thus, the largest effective diameter of the driven pulley may be controlled using the stopping surface. As illustrated in FIG. 15A, the stopping surface desirably contacts part of the load face of the fixed wheel when the belt reaches its largest working diameter.

In accordance with the description of the snap rings 128 above, a snap ring 410a is encased by a cap 412a in the driven pulley 320a of the illustrated arrangement. As illustrated in FIG. 15A, the cap 412a secures the snap ring 410a against excessive radial expansion at high rotational speeds and thrust loads, preferably, all snap rings used under thrust loads are so encased in this design so that it is difficult to dislodge them. All other snap rings preferably incorporate a special locking tab to prevent expansion at high rotational speeds. As illustrated, one of the snap rings 410a is positioned under the cap 412a while the cap is secured in position by a second of the snap rings 411a. This arrangement enhances the structural integrity of the transmission 300 at higher rotational speeds and thrust loads.

In addition, as described in connection with the transmission 100 above, the transmission 300 of FIG. 15 advantageously uses hydraulic pressurization and depressurization to effect movement of the moveable pulleys 318a, 320a. Fluid flows within lumens 414, 416 of the shafts 304, 306 respectively. The fluid may comprise a lubricant or other suitable hydraulic fluid. In transmissions using a liquid lubricant, the lubricant may be allowed to slowly seep in desired locations to lubricate at least some of the moving components of the transmission.

As also described above, the lubricant flows from the lumens 414, 416 into the piston chambers 358a, 418a of each of the pulleys 318a, 320a through passages formed in the shafts 304, 306, the hubs 326a, 340a of the sheave halves and the sleeves 352a of the pistons. Because the alignment and configuration of the passages in the transmission 300 is similar to that of the transmission 100 described above, further description is unnecessary.

Figure 15B:
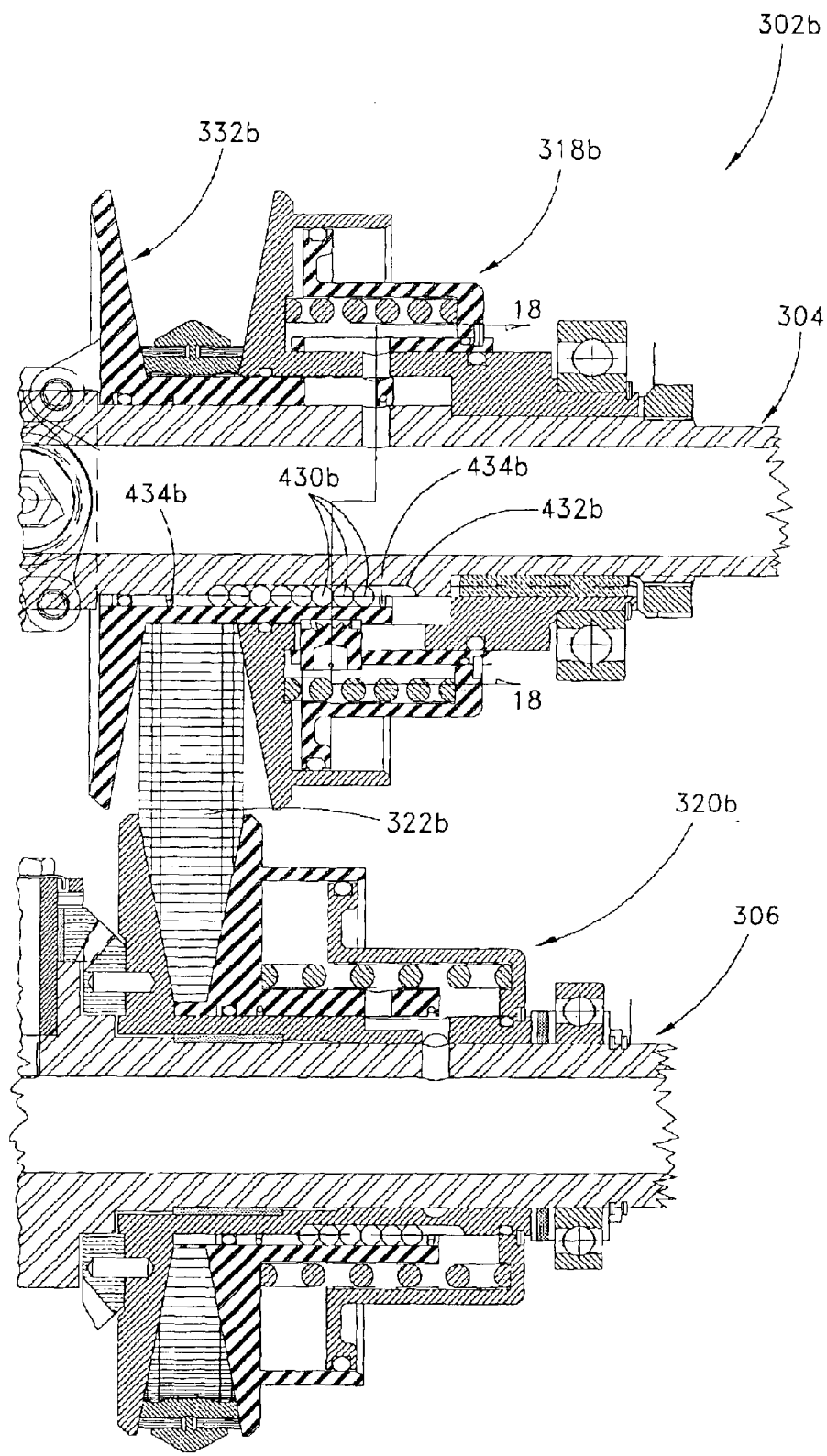

With reference to FIG. 15B, a further drive configuration 302b will be described. As discussed above, the present transmission 300 features two drives 302a, 302b, which each feature different torque transmission mechanisms. While the drive 302a uses the roller bearing and channel race mechanism described in the transmission 100, the drive 302b uses a ball and race mechanism, similar to that described in the first arrangement discussed above. By comparing FIG. 15A to FIG. 15B, one of ordinary skill in the art will note that many of the features of the drive 302b are similar in construction and configuration to those of drive 302a. Accordingly, the features that vary from the description of FIG. 15A will be described while the balance of the structures are considered adequately described above. Moreover, like features will be referred to with like reference numerals ending in the suffix "b" rather than "a".

As discussed directly above, the primary distinction between the drive 302a of FIG. 15A and the drive 302b of FIG. 15B is the torque transfer mechanism. Moreover, the torque transfer mechanisms in both the drive pulley 318b and the driven pulley 320b are the same in the illustrated drive 302b. Accordingly, the torque transfer mechanism will be described with reference to the drive pulley 318b; however, the description of the torque transfer mechanism applies equally to the driven pulley 320b.

Figure 18:
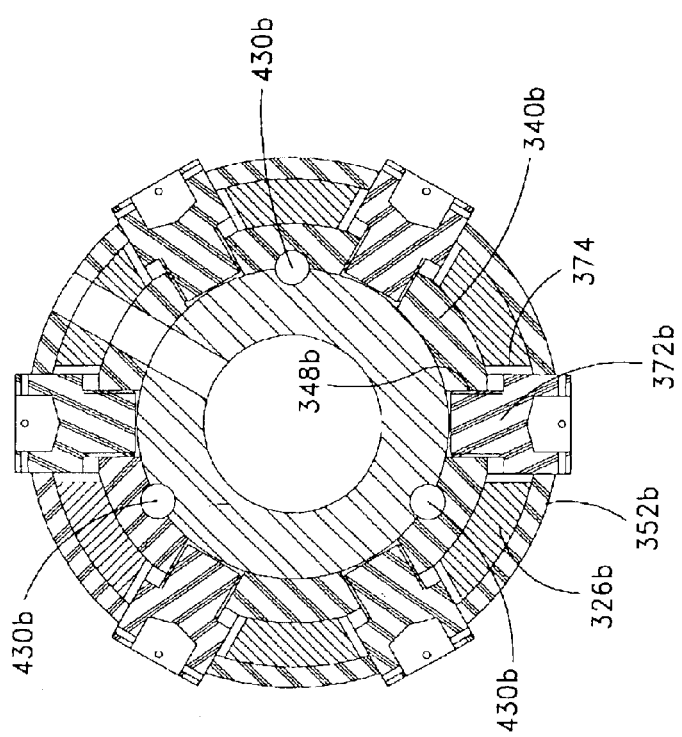
FIG. 18 is sectioned end view of the continuously variable transmission of FIG. 15 taken along the line 18—18 in FIG. 15B and showing an adjustable pulley hub connected to an actuating sleeve by lugs.
Figure 19:
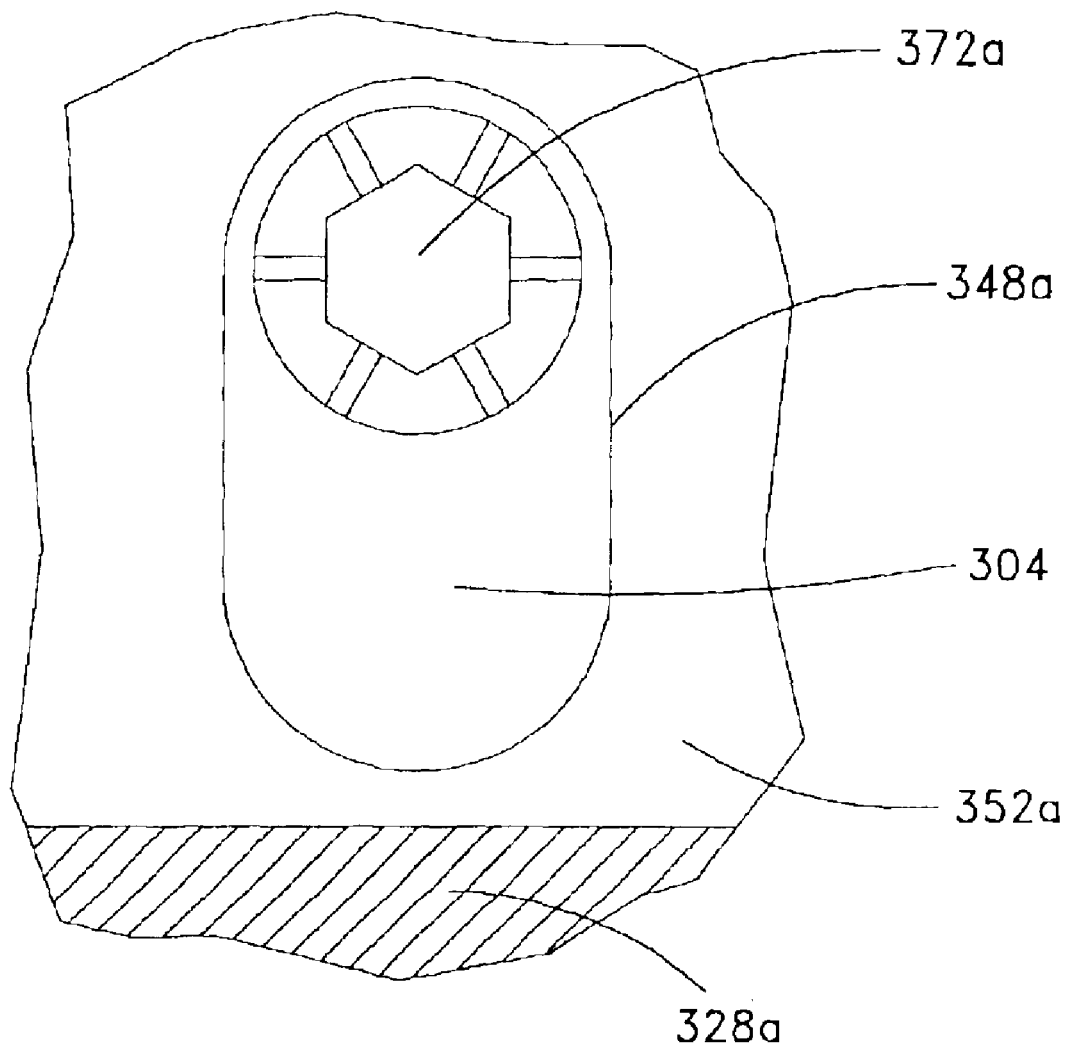
FIG. 19 is a partially sectioned external view of a lug in a slotted mounting arrangement used to secure the adjustable pulley to the actuating sleeve in the arrangement of FIG. 18.
Figure 21:
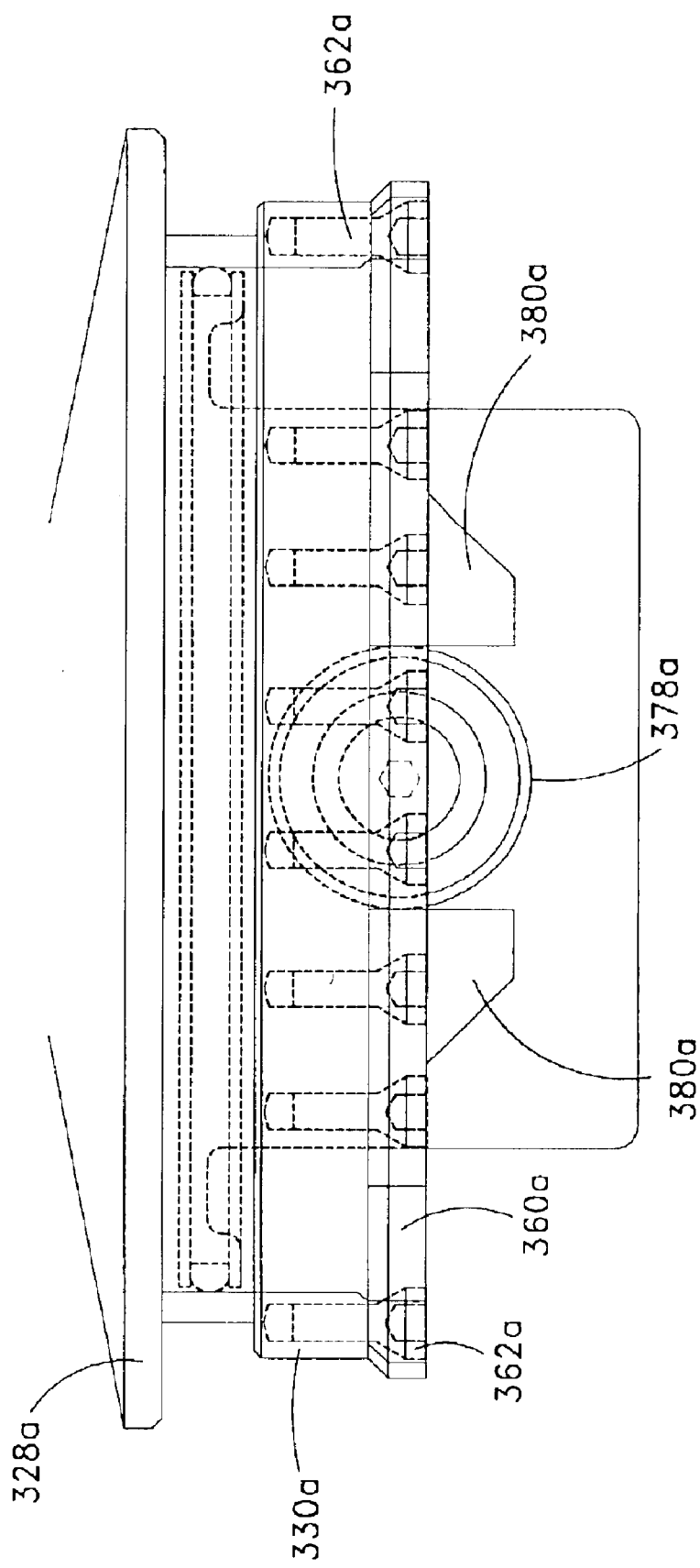
FIG. 21 is an external view of the mounting arrangement of FIG. 20 taken along the line 21—21.

With reference to FIG. 15A, the bosses 376a, roller bearings 378a and the channel races 380a of the drive 302a have been removed in the drive 302b. Instead, the drive 302b uses sets of balls 430b that are positioned within substantially longitudinally extending races 432b. The races 432b are generally formed by partial channels formed along an outer surface of the shaft 304 and within an inner surface of the moveable pulley sheave half 332b. Preferably, the partial channels mate together to form the illustrated races 432b. More preferably, as illustrated in FIG. 18, a set of three channels are equally spaced about the circumference of the shaft 304. In the presently preferred transmission using this torque transfer mechanism, three sets are used. One, two or more than three sets may also be used. Preferably, the balls 430b are retained in the races 432b with a pair of circumferential wire rings 434b or other suitable stopping structures.

As the moveable sheave half 332b moves relative to the shaft 304, the balls 430b roll along within the races 432b. The balls 430b are stopped at two extremes of travel by the wire rings 434b. The wire rings 434b ensure that the balls remain captured within the races 432b at the extremes of movement. Desirably, the rolling distance of the balls substantially equates with 50% of the axial movement between the sheave halves.

With reference now to FIGS. 13 and 14, an articulating mechanism 500 will be described in detail. The articulating mechanism 500 slaves the moveable sheave halves 302a, 302b of the illustrated arrangement together such that the effective belt operating diameters of the drive pulleys are substantially the same. By controlling the effective diameters of the two drives 302a, 302b, the belts will cause the driven pulleys to run at approximately the same speed. In general, the articulating mechanism 500 comprises a pair of beams 502 that extend between the moveable sheave halves 332a, 332b of two adjacent drives 302a, 302b. The beams 502 are pivotably secured by links 516 to the sheave halves 332a, 332b using mounting bosses 504, which are secured to the back face of the sheave halves 332a, 332b. Specifically, pins 505 are used to pivotably connect the beams 502 to the bosses 504 through the links 516.

The beams 502 rotate about a central axis, which is defined by a threaded fastener 506 in the illustrated mechanism 500. A bushing or set of needle bearings 508 is inserted into a central aperture in the beams 502. The bushing is thereby interposed between the beams 502 and a central plug 510. The plug 510 is pinned to the shaft 304 with pins 511 in two locations to accept side loads imparted by the beam 502. The plug 510 also includes a hole 512. The hole preferably accommodates an end of a locking tab 514. The locking tab 514 secures the threaded fastener 506 in position such that the threaded fastener 506 cannot work free from the shaft 304. As illustrated, two beams 502 are used in the presently preferred mechanism; however, one or more than two beams may also be used where desired.

Figure 16:
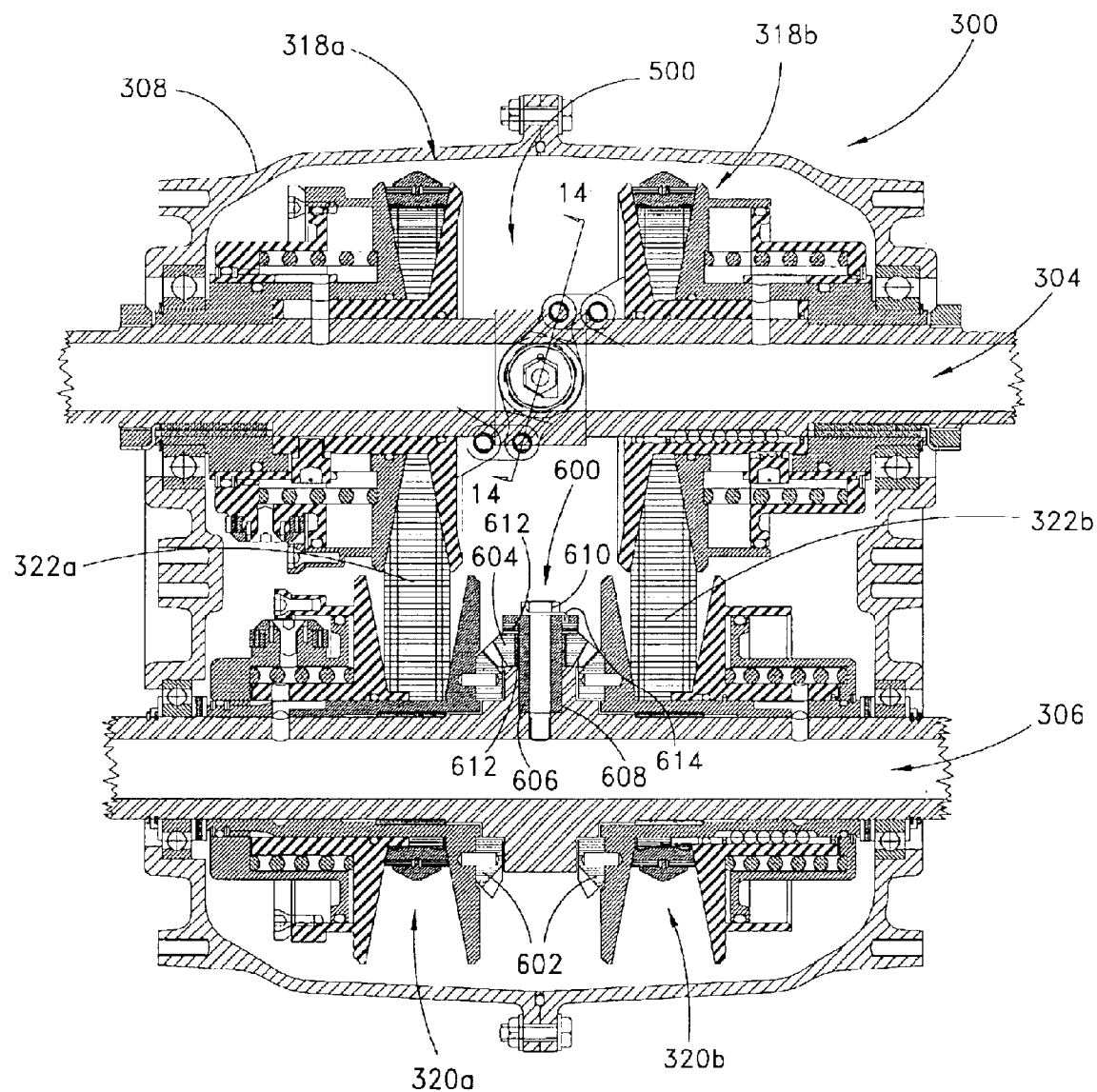
FIG. 16 is a sectioned side elevation view of the continuously variable transmission of FIG. 15 shown in a high gear ratio.

With reference again to the arrangement of FIG. 16, the driven shaft 306 also includes a moveable pulley system similar to that described above. The two pulleys positioned on the driven shaft, however, do not include the articulating mechanism described above. Rather, the two pulleys on the driven shaft are connected together by a differential 600 that spans an opening between the back faces of the stationary sheave halves. The differential 600 generally includes a pair of bevel gears 602, which are pinned or otherwise secured to the back faces of the stationary sheave halves. The bevel gears 602 mesh with spider or pinion gears 604. In the illustrated arrangement, three spider gears are positioned about the periphery of the bevel gears 602. In some arrangements, two or more than four spider gears can be used to transfer power.

The spider gears 604 preferably are attached to the driven shaft 306. In the illustrated transmission 300, the spider gears 604 are each carried by a stub shaft 606. The stub shaft 606, in turn, is attached to a mounting boss portion 608 of the shaft 306 with a threaded fastener 610. Preferably, two sets of needle bearings 612 are positioned between the spider gears 604 and the stub shafts 606 to reduce friction losses. Also, in the illustrated transmission 300, a locking tab 614 secures the threaded fastener 610 in position and reduces the likelihood that the threaded fastener 610 will work free from the boss 608.

During operation of the illustrated arrangement, the differential compensates for slight differences in rotational speed between both driven pulleys 320a, 320b. For instance, if there is a difference in the speeds of the two driven pulleys, the spider gears 604 will rotate on the stub shafts 606 to accept the speed differential while transferring the output torque of each pulley 226 to the output shaft 220. If the driven pulleys are turning at the same speed, the spider gear is stationary and the torque is transferred through the stub shafts 606 to the shaft 306.

Figure 24:
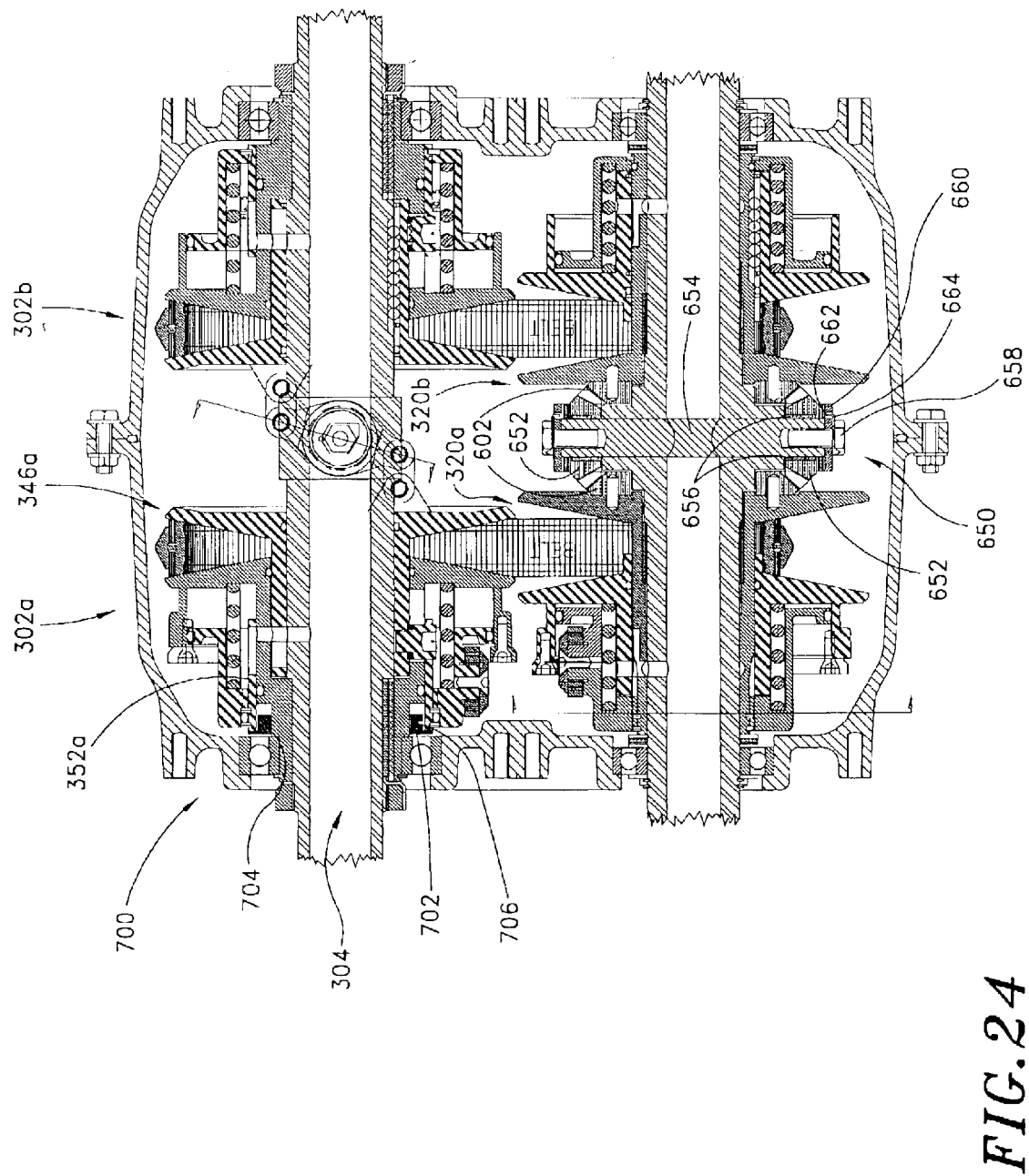
FIG. 24 is a sectional view of a further transmission illustrating a floating differential and adjustable hub configuration.

With reference to FIG. 24, a differential indicated generally by the reference numeral 650 is illustrated therein. As discussed above, the differential preferably compensates for slight differences in rotational speed between the driven pulleys 320a, 320b. In the illustrated differential 650, the bevel gears 602, which are carried by the two pulleys, mesh with spider gears carried at either end of a floating differential shaft. The spider gears, indicated generally by the reference numeral 652, are designed to mesh with the bevel gear 602 and rotate substantially freely relative to the shaft, indicated generally by the reference numeral 654. As illustrated, bearings, indicated generally by the reference numeral 656, may be positioned between the shaft 654 and the gears 652. The use of radial and thrust needle bearings in the illustrated differential spider gear and pulley assemblies limit the differential efficiency losses to less than 5%. In other arrangements, the differential efficiency losses may amount to less than 10% or less than 15%.

With continued reference to the arrangement of FIG. 24, the shaft 654 extends through the shaft 306 and is held in position using two threaded fasteners 658. The fasteners 658 are threaded into the shaft 654 at opposite ends of the shaft 654. A thrust washer 660 may be positioned between the threaded fastener 658 and the shaft 654. Preferably, the washer 660 includes an aperture 662 that receives a portion of a locking tab 664. As discussed above, the locking tab 664 secures the threaded fastener 658 from rotation relative to the shaft 654 once the threaded fastener is tightened and the locking tab is locked into position. Preferably, adequate clearance is provided at either end of the differential shaft 654 to allow the shaft to float freely relative to the bevel gears 602. Accordingly, dimensional variations between the bevel gears 602 may be accommodated through a floating differential shaft 654 illustrated in FIG. 24.

With continued reference to FIG. 24, an adjustable stop assembly 700 is also illustrated therein. The adjustable stop assembly 700 allows the moveable sheave half 346a to be tuned to allow adjustments capable of placing the two drives 302a, 302b in synchronous operation when at least at one extreme of travel. Additionally, because the drive belts will seldom be formed with absolute accuracy, the adjustable stop assembly allows the drives to absorb the differences in belt loop length from belt to belt in serial production. In the illustrated arrangement, the drive pulley includes a threaded collar stop 702 that can be moved along the shaft 304 to control the extremes of outward movement of the sleeve connected to moveable drive sheave half.

As illustrated, the collar stop 702 includes a step configuration capable of extending within at least a portion of the sliding sleeve 352a and is held in position through the use of threads 704 and a set screw 706 combination. The threads 704 allow the collar stop 702 to be adjusted along the shaft 304 while the set screw 706 fixes the collar stop 702 in the desired stopping location. It also is anticipated, however, that a wave washer can be positioned between the collar stop 702 and an adjacent surface of the fixed sheave half or shaft 304 to secure the collar stop 702 in a preferred location. Additionally, a port can be formed within the transmission case to allow the collar stop to be adjusted with the transmission case closed around the transmission. For instance, a tool that would engage a structure formed on the collar stop can be extended through the port to the collar stops. With the tool engaged, the shaft 304 can be manually turned to adjust the position of the collar stop.

A portion of the moveable pulley combination (i.e., the sleeve) will contact the collar stop 702 at an extreme of travel. In the illustrated embodiment the moveable drive sheave half and sleeve combination will contact the collar stop 702 at its extreme outward position such that the high gear position can be tuned for synchronization between the two driven halves under dynamic conditions.

By controlling the positioning of the moveable drive pulley halves at one extreme of movement, the use of the differential at that extreme of movement is reduced or eliminated. Thus, the stops increase the efficiency of the present transmission when operating at the tuned end of the range. In some arrangements, shims can be used as necessary to control the groove width or effective diameter of a pulley such that the output pulleys rotate within 2% of each other at both the low and high gear extremes. In some arrangements, it is acceptable for the output pulleys to rotate within about 4% or about 6% of each other. Of course, depending upon the application, higher relative rotation rates might be acceptable.

Figure 25:
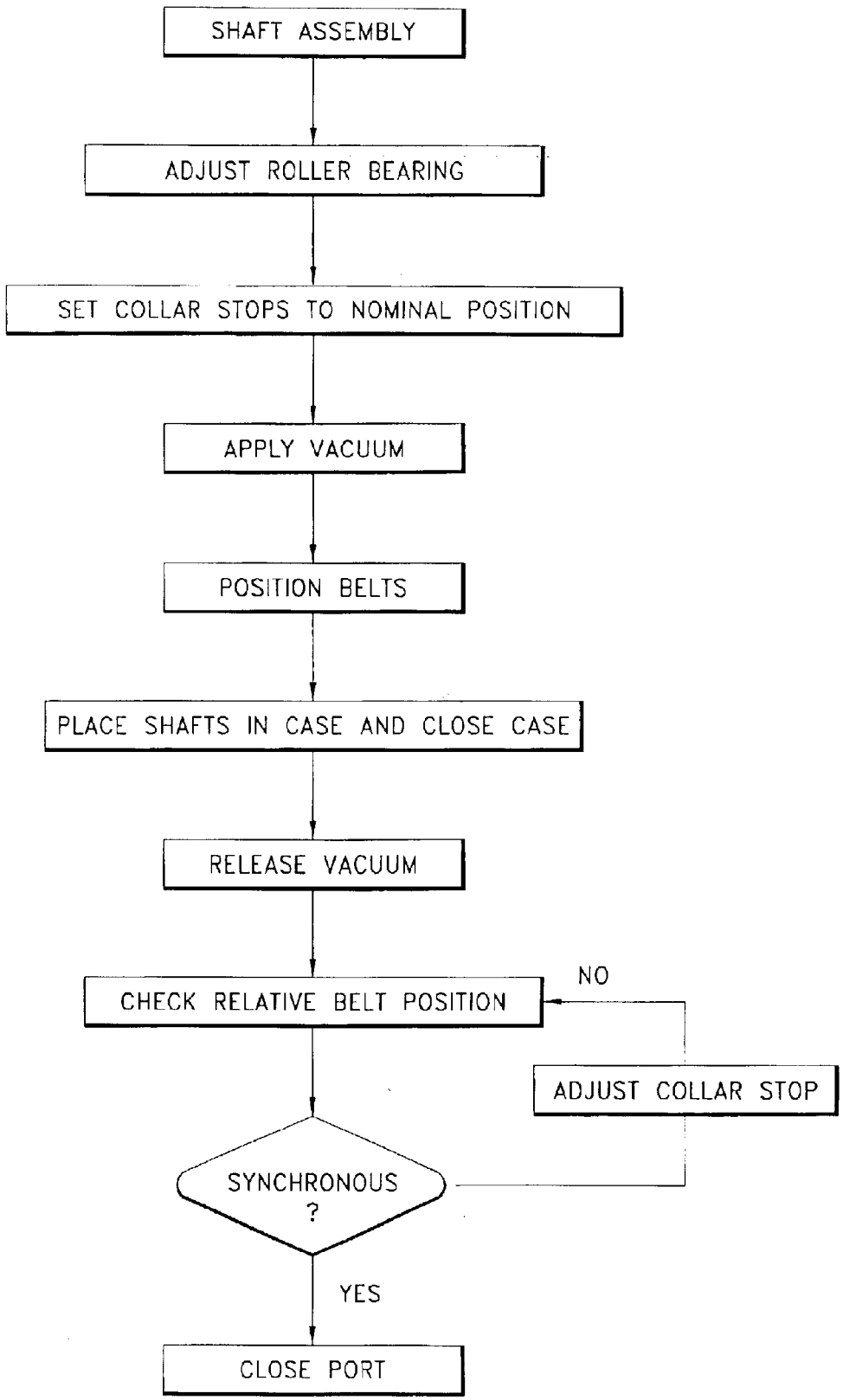
FIG. 25 is an assembly method flowchart for an exemplary transmission assembly.

With reference now to FIG. 25, a method of assembling the present transmission is depicted therein in a flow chart. While some of the steps can be reorganized and reordered, the following is one method of assembling the transmission of FIG. 10, for instance. As illustrated, the two shafts and the pulley systems are assembled together to form two complete shaft assemblies. The roller bearing arrangement can then be adjusted for precise positioning between the roller bearings and the channel races. Once the roller bearings have been rotated into position they are secured in the position using the pins and roller bearing caps as described above.

The two shafts are then positioned side by side. A vacuum is then applied internal to the shafts to spread the sheave halves apart such that the belt(s) may be looped over the pulleys and the belt(s) is allowed to hang loosely within the pulleys between the two shafts. The use of a vacuum to collapse the cylinders against the spring forces and spread the pulley halves to maximum width eases assembly. This allows the belts to be installed between the pulley grooves before installation within the housing. Once installed in the housing, the vacuum may be removed and the springs will force the pulley halves into proper position. Of course, some rotation of the shafts may be necessary to completely accomplish the movement of the sheave halves into their respective positions.

The shafts may be then driven to verify that the driven pulleys are moving in acceptable synchronized operation. In embodiments having an adjustable stop, the drive may be positioned in a high gear drive arrangement and checked for synchronous operation of the driven pulleys. The threaded adjustable collar stops on the stationary drive pulley hub halves limit the travel of the sleeves, which connect to the moveable pulley halve hubs by means of the lugs threaded into the hubs. The stop may then be adjusted in or out to arrive at substantially synchronous operation between the driven pulleys in high gear. Of course, moving the stop requires that the pulley halves be returned to the mid or the low gear arrangement to allow access to the stop screw. The use of this adjustment while pressurizing the drive shaft cylinders after the unit is assembled allows precise control of the drive pulley widths to position both belts at like radii in the high gear position. In fact, the pulley widths can be turned during the adjustment process such that the output shaft pulleys are near synchronous in the rotation, which can be monitored electronically, and thus, essentially stalling the differential rotation resulting in near zero efficiency losses compared to a single belt design. For instance, contact points and pickups can be used to determine relative rotational speeds of the pulleys. Once the belt speeds are dialed in, the transmission casing or maintenance ports can be finally closed.

With reference now to the transmission illustrated in FIGS. 26–31, which is generally indicated by the reference numeral 800, the transmission 800 generally has many components that are similar to those described above. Accordingly, the following description will focus upon some of the alterations reflected in the transmission 800 relative to the transmissions described above. Where components are not described that are specifically described above, the above-descriptions can apply equally to the illustrated arrangement. In addition, for clarity of the description of certain features, aspects and advantages of the illustrated arrangement of the present invention, certain components will be described in greater detail relative to other components, which may be solely reflected by the figures or only briefly described.

As with the transmissions described above, the transmission 800 features a pair of shafts that are connected together by a pair of belts. In particular, in the illustrated arrangement, the transmission comprises an input shaft 802 and an output shaft 804 that are disposed within a housing 806. The input shaft 802 carries a pair of input pulleys 810 while the output shaft carries a pair of output pulleys 812. The input pulleys 810 and the output pulleys 812 are connected together in driving relationship using a corresponding pair of drive belts 814. As mentioned above, the use of "drive" and "driven" is solely as a matter of convenience and either shaft/pulley combination can receive the input torque and the opposing shaft/pulley combination would thereby be rendered the output combination. Nevertheless, in the illustrated arrangement, the input shaft 802 now carries a differential 816 while the output shaft 804 carries an articulating member 820, which is opposite of the constructions described above.

While not described in any specific detail above, the drive belts 814 can have any suitable construction. In one arrangement, the belts 814 have a width of between about 20-mm and about 36 mm. In another arrangement, the belts 814 have a width of between about 24-mm and about 30-mm. In the arrangement illustrated in FIG. 10, the belts 814 preferably have a width of about 24-mm while, in the arrangement illustrated in FIG. 26, the belts 814 preferably have a width of about 30-mm. Other suitably sized belts also can be used.

The increase in belt size in the arrangement of FIG. 26 has been advantageously accomplished without substantially spreading any of the shaft-supporting structure in manners described below. Thus, shaft rigidity can be maintained while belt size can be increased. The increased belt size is believed to prolong the operating life of the transmission and allows the transmission 800 to be adapted to standardized belts from single pulley applications.

Figure 26:
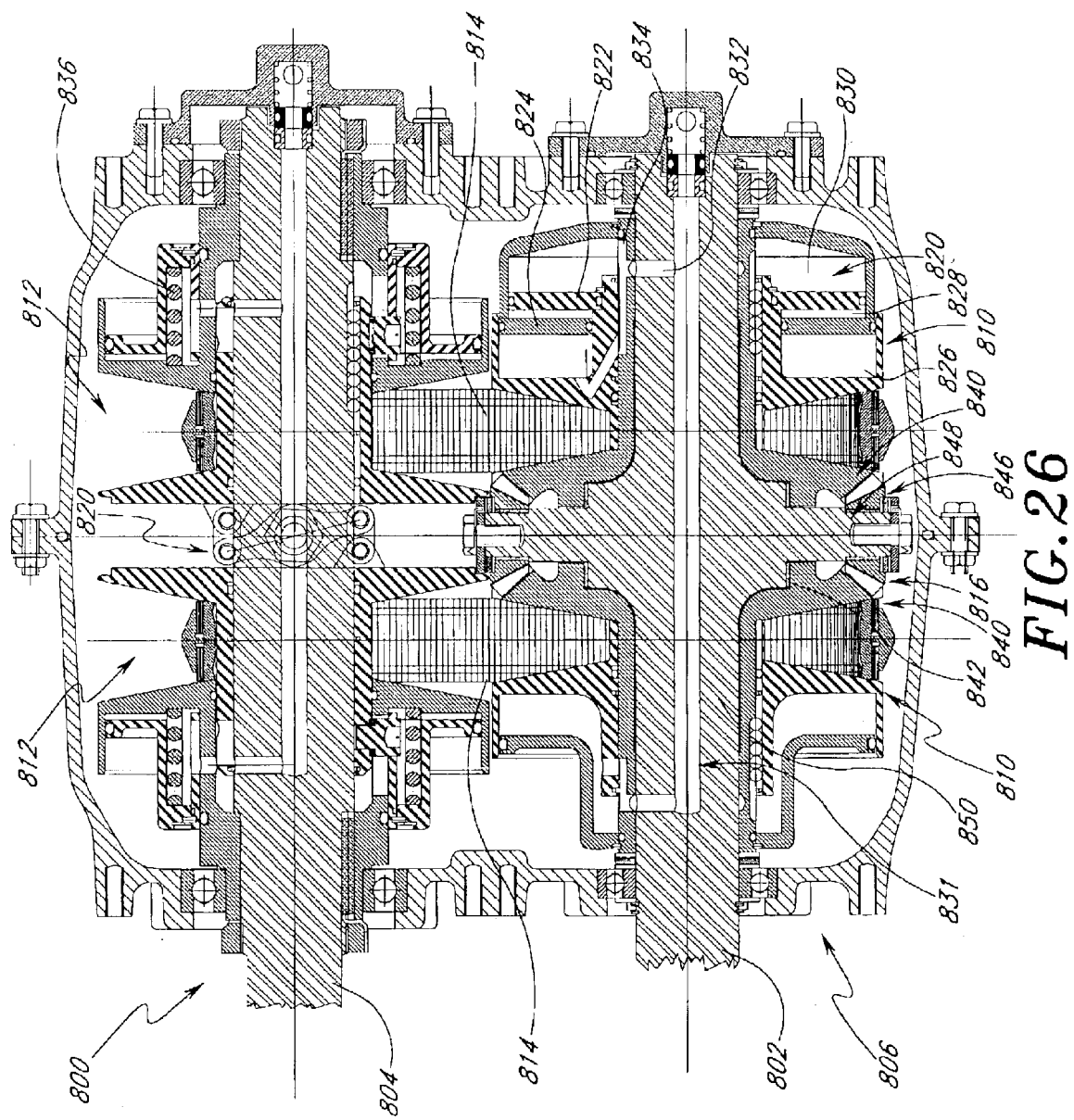
FIG. 26 is a sectioned side elevation view of a continuously variable transmission arranged and configured in accordance with certain features, aspects and advantages of the present invention. The transmission is in a high gear position.

With continued reference to FIG. 26, the right half of the illustrated arrangement features a double acting cylinder assembly 820. The double acting cylinder assembly 820 can be used as an alternative to the piston arrangements described above. In the illustrated arrangement, a pair of moveable walls 822, 824 are provided that define three separate chambers 826, 828 and 830. The working fluid passes from a pressurized supply, through a lumen 831 defined within the respective shaft 802, 804 and into the chambers 826, 828, 830 through suitable passages. In one arrangement, a feed passage 832 is fluidly connected to the lumen and to an elongated channel 834. Depending upon the position of the moveable walls 822, 824, fluid is supplied to the desired chamber 826, 828, 830 to effect movement of the moveable walls. This arrangement greatly increases the operating or effective area of the cylinder assembly 820.

Moreover, in the arrangement illustrated in FIG. 26, a biasing member 836 is disposed in each of the pulleys 812 while the cylinder assembly 820 provides an opposing force to the biasing member 836. The opposing force is generated in the pulley 810 and transferred through the belt 814, which has a fixed circumferential length, to the pulley 812. Thus, the construction of FIG. 26 is simplified in comparison to the arrangement of FIG. 10, for instance.

Figure 27:
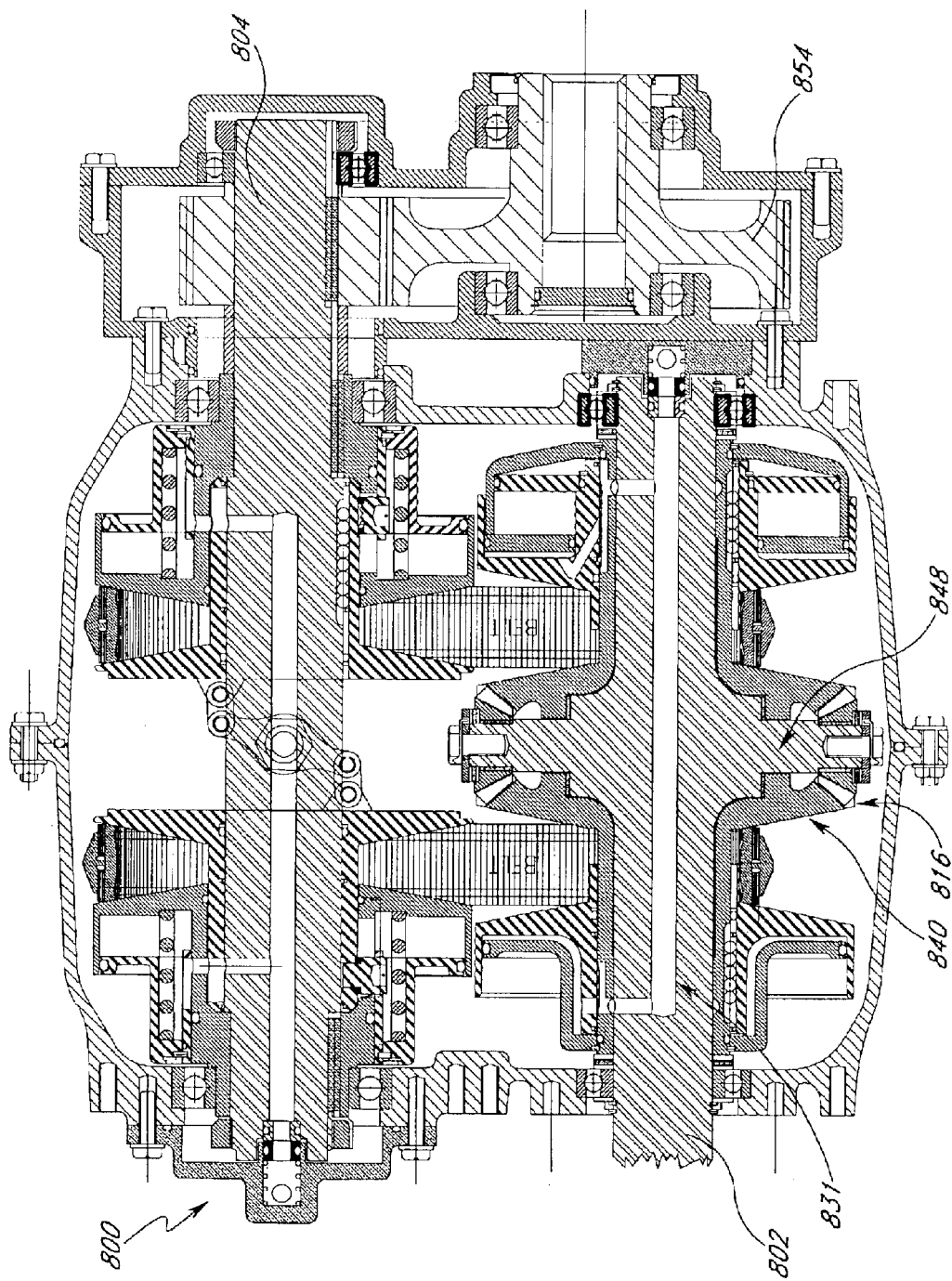
FIG. 27 is another sectioned side elevation view of the transmission of FIG. 26 with the transmission shown in a low gear position.

With continued reference to FIGS. 26 and 27, the differential gear assembly 816 desirably is connected to the shaft 802 to provide a connection between the pulleys 810 and the shaft 802. The differential gear assembly 816 can comprise a pair of bevel gears 840 that are connected to the pulleys 810. In one presently preferred construction, the bevel gears 840 are integrally formed with the fixed sheave half of the pulleys 810. While not apparent from the figures, which are not necessarily to scale, the bevel gears 840 also are enlarged in the arrangement of FIG. 26 as compared to the arrangement of FIG. 10, for instance. The larger diameter advantageously reduces gear loading and thereby increases reliability and durability. Furthermore, by enlarging the diameter, caged sheave bearings 842 can be used within the differential 816 in a manner similar to the use of needle bearings within the arrangements of FIGS. 1 and 10.

The differential 816 also desirably features a set of spider gears 846 that are mounted on shafts 848 that are integrally formed with the drive shaft 802 about a hub region 850. Preferably, the spider gears 846 comprise a spiral tooth to increase efficiency of operation and decrease noise. The hub region features an enlarged cross-section in the illustrated arrangement to contribute increased rigidity to the drive arrangement such that the illustrated arrangement is less likely to flex under increased loading during high belt tensions. By reducing flexion within the shaft 802, tooth loading at the interface between the bevel gears 840 and the spider gears 846 can be reduced and the transmission 800 can operate quieter and more efficiently.

With reference now to FIG. 27, an output takeoff gear 852 can be coupled to the output or driven shaft 804. In the illustrated arrangement, the output takeoff gear 852 is positioned in a location that allows a driven gear 854 to be positioned such that the axis of the drive shaft 802 extends through at least a portion of the driven gear 854. Such an arrangement reduces the size of the transmission while also allowing the torque available at the drive wheels to be increased. In the illustrated arrangement, the gear 852 is splined to the shaft 804. Other arrangements also can be used. In addition, the power takeoff can be connected to either end of the shaft 804 or at an intermediate location, if desired.

Figure 23:
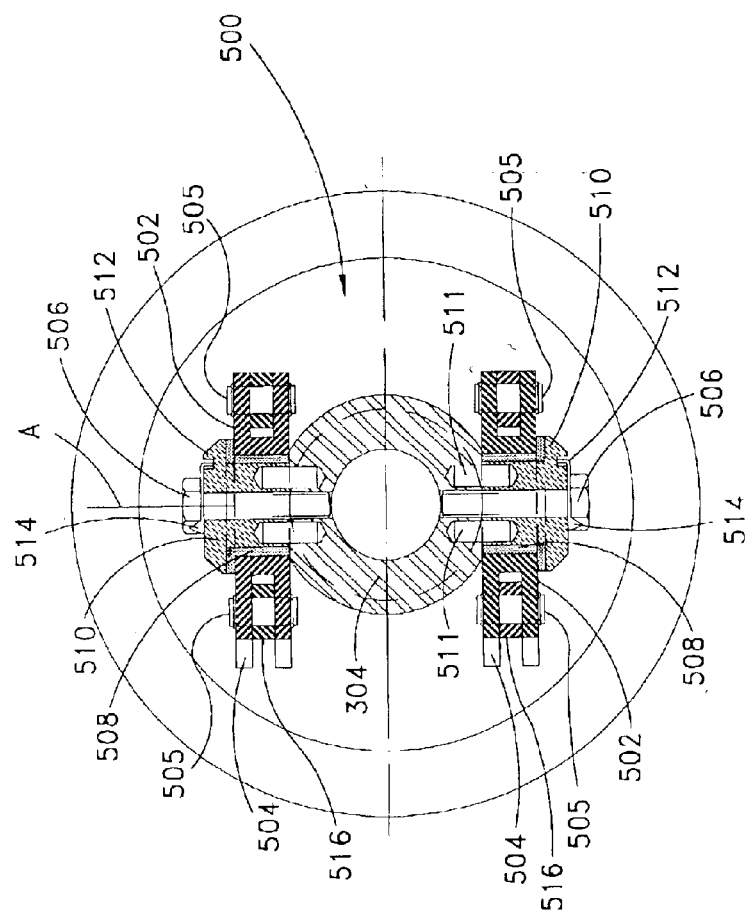
FIG. 23 is a sectioned view of the articulating member taken along the line 23—23 in FIG. 22.
Figure 22:
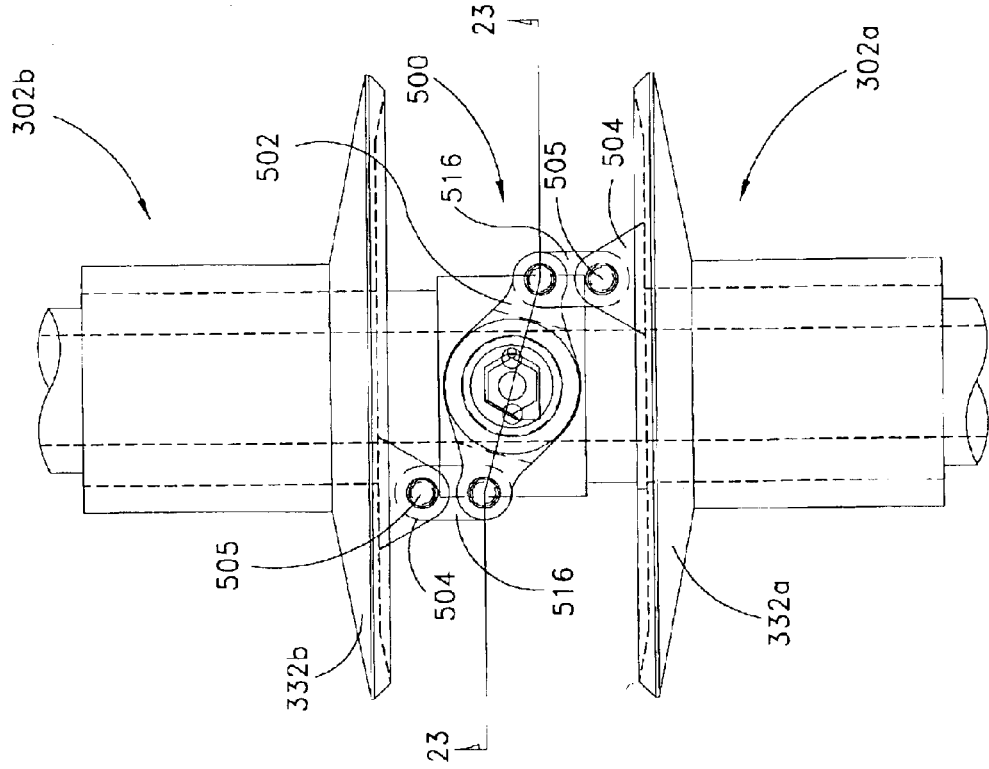
FIG. 22 is an enlarged view of an articulating member positioned between the two drives of FIG. 15.
Figure 28A:
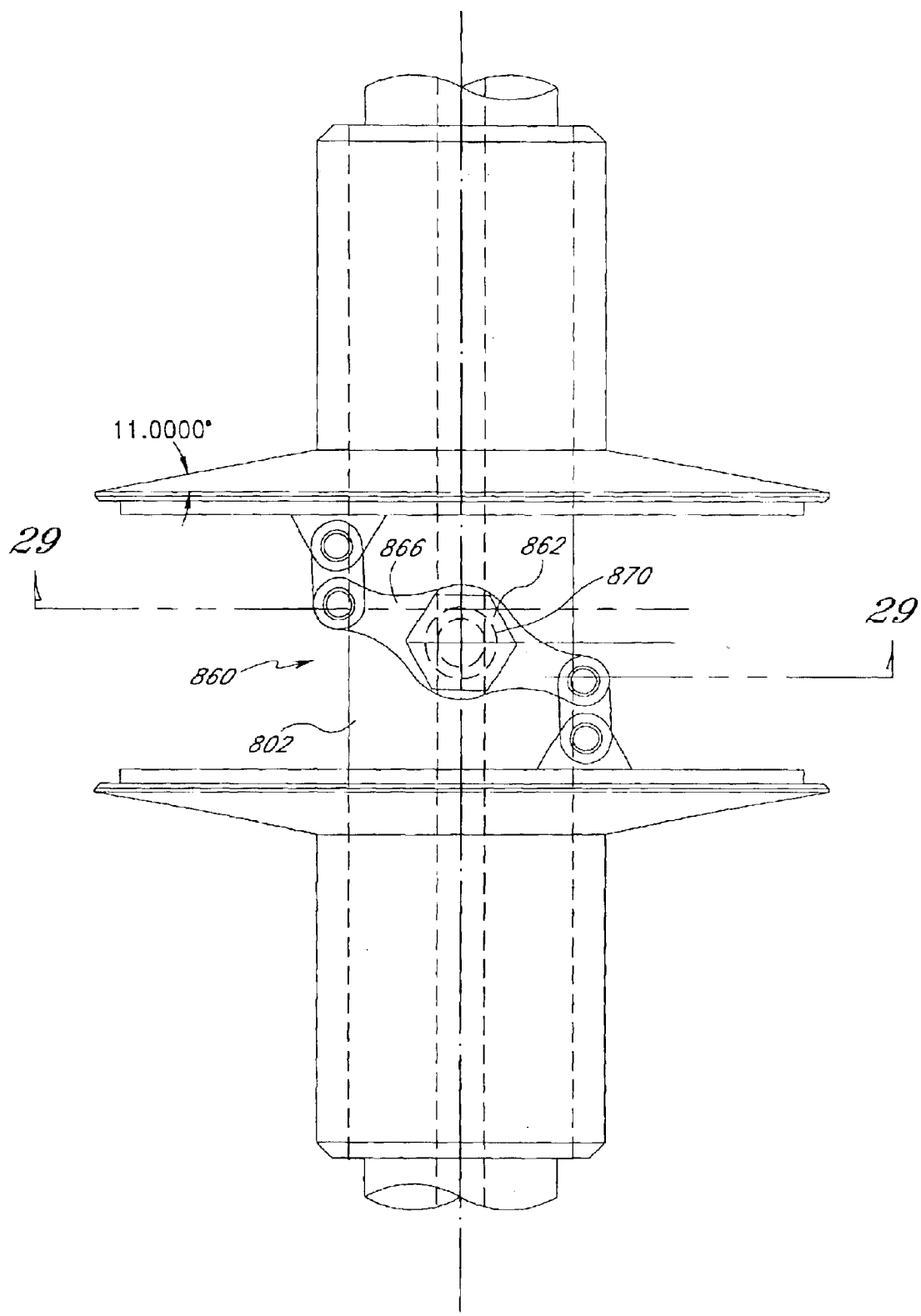
FIGS. 28A and 28B are enlarged views of an articulating member positioned between the two drives in FIG. 26 with the articulating member shown in a low gear position in FIG. 28A and the articulating member shown in a high gear position in FIG. 28B.
Figure 28B:
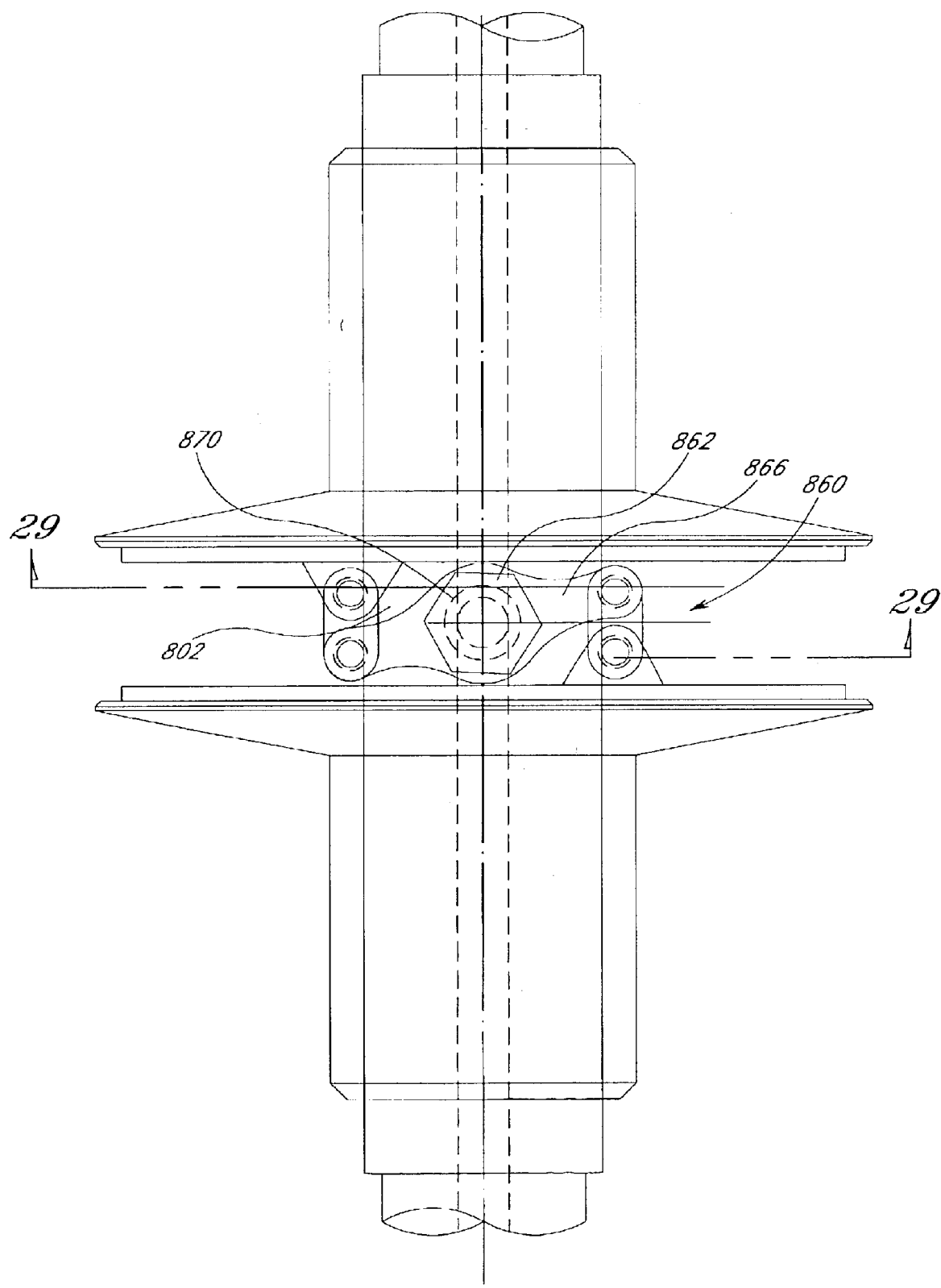
Figure 29:
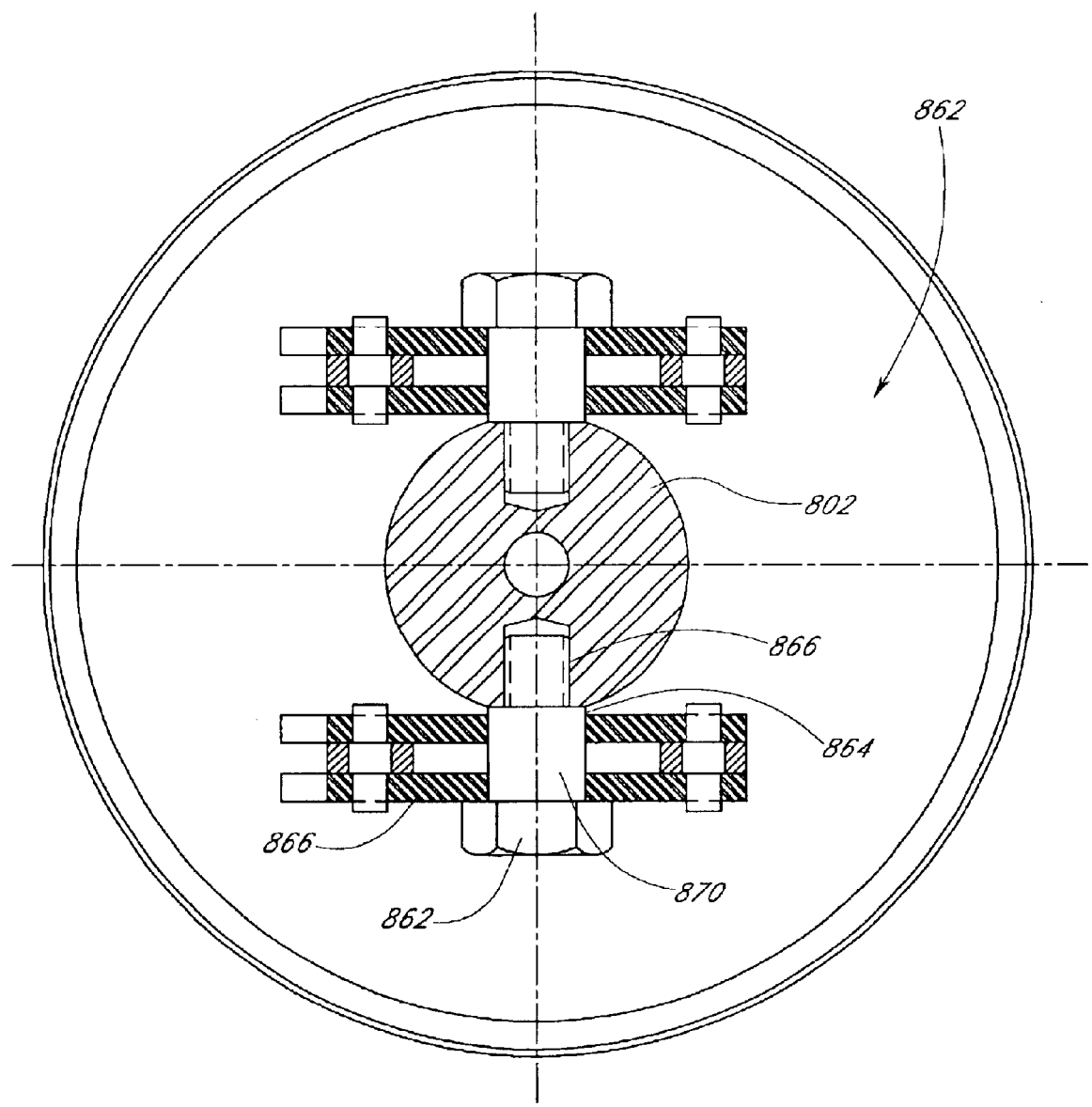
FIG. 29 is a section view taken through a shaft and articulating member as indicated by the line 29—29 in FIGS. 28A and 28B.
Figure 31:
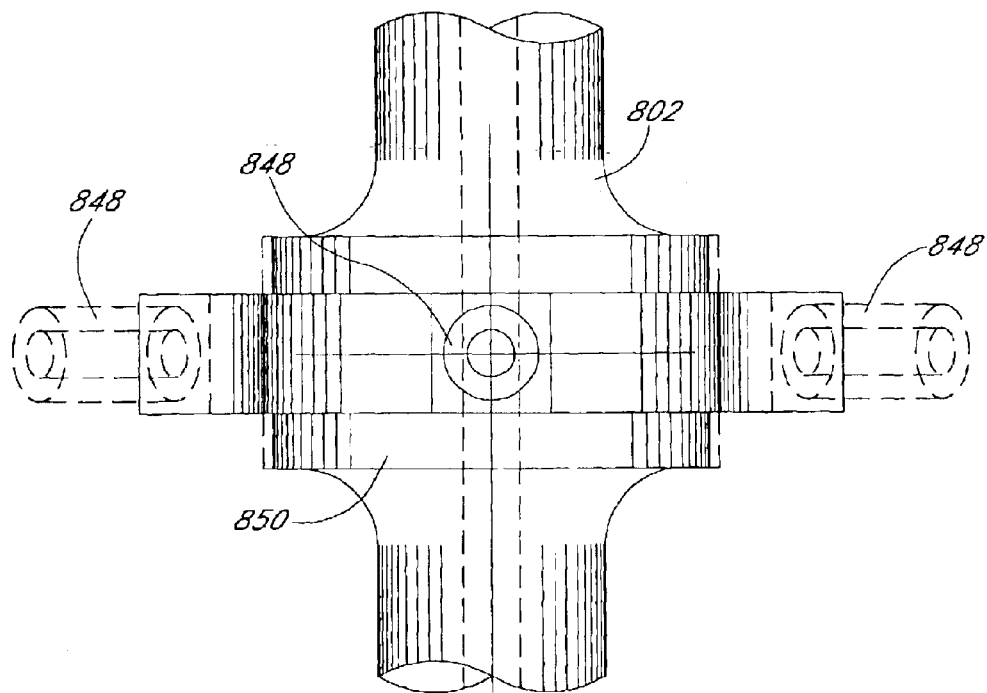
FIG. 31 is a plan view of a drive shaft taken in the direction indicated by the line 33—33 in FIG. 32.
Figure 30:
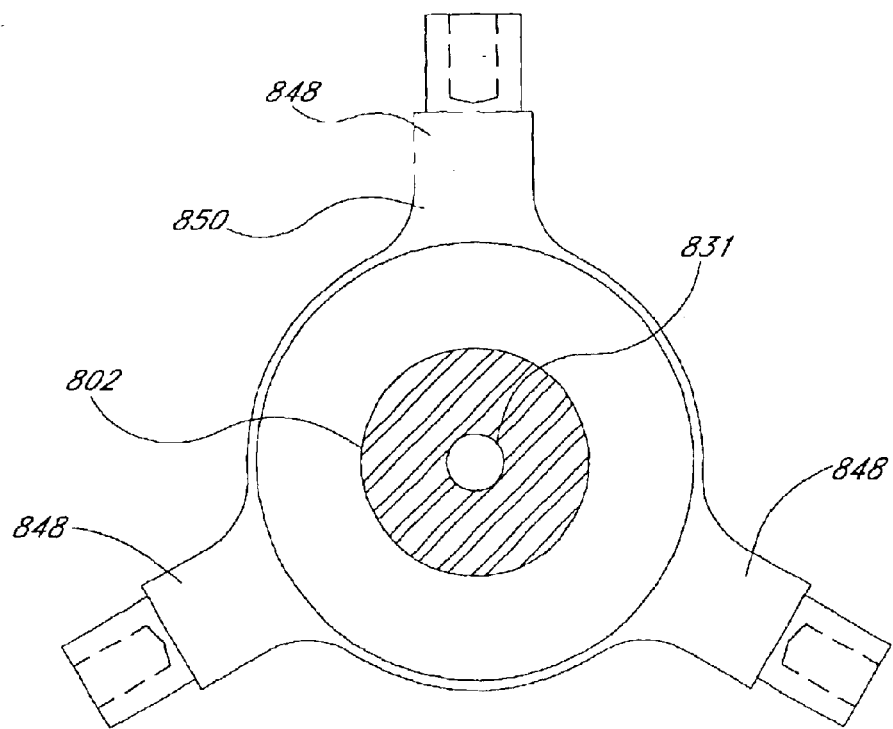
FIG. 30 is an enlarged partial view of the drive shaft featuring a set of integral mounting shafts for spider gears of a differential.

With reference now to FIGS. 28A, 28B and 29, and with comparative reference to FIGS. 22 and 23, a simplified mounting of an articulating mechanism 860 is illustrated. The articulating mechanism 860 is generally the same are the articulating mechanism 500 described above. Accordingly, where apparent, the description of the articulating mechanism 500 applies to the articulating mechanism 860 of FIGS. 28A, 28B and 29.

As illustrated in FIG. 29, a fastener 862, such as a screw, bolt, threaded rod or the like, extends through an aperture 864 formed in the beams 866 and is secured to the shaft 802 within a threaded aperture 866. Other mounting arrangements also can be used, such as an integrally formed post, a post that is interference fit, adhered, cohered or welded into position, or the like. In addition, the fastener 862 preferably comprises an enlarged shank 870 that serves as a bushing and that replaces the use of a bearing in the illustrated arrangement. It has been found that the forces and associated friction generated in this portion of the transmission can be adequately tolerated by such a construction. Accordingly, the illustrated arrangement greatly simplifies the assembly and construction of the articulating mechanism 860.

Figure 32:
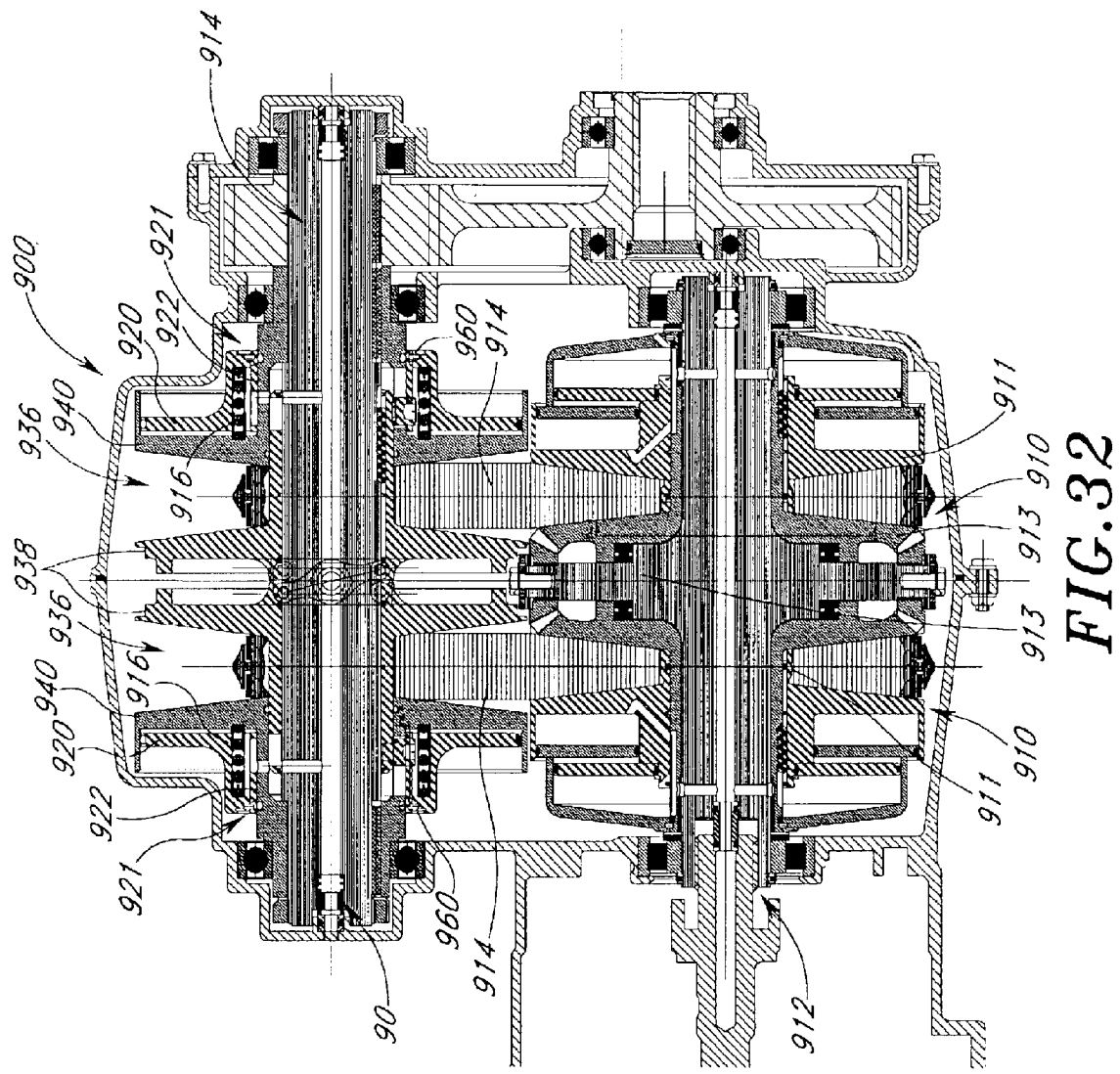
FIG. 32 is a sectioned side elevation view of another transmission arranged and configured in accordance with certain features, aspects and advantages of the present invention. The transmission is shown in a high gear position.
Figure 33:
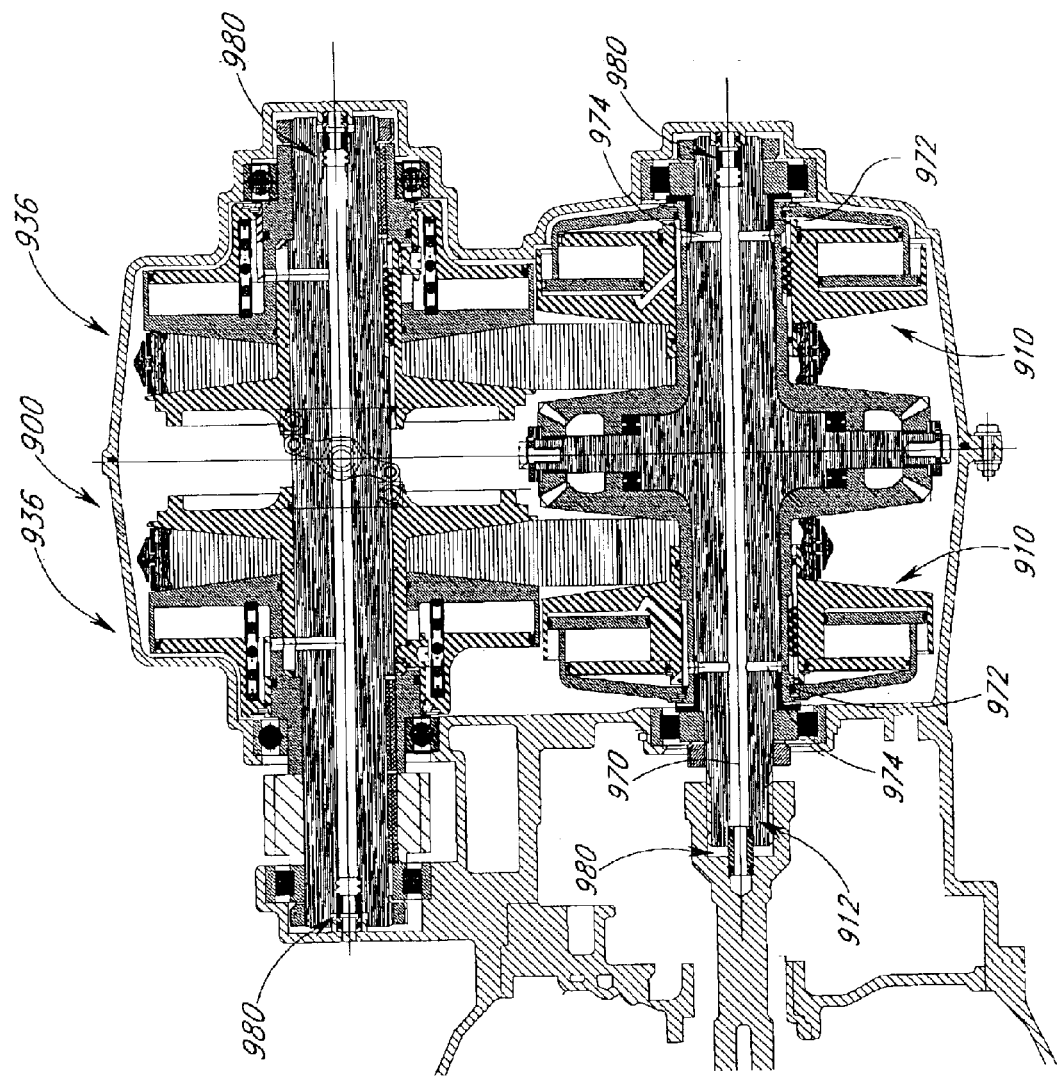
FIG. 33 is another view of the transmission of FIG. 32 with the transmission shown in a low gear position.

With reference now to FIGS. 32 and 33, yet another transmission 900 arranged and configured in accordance with certain features, aspects and advantages of the present invention is illustrated. Among the improvements to the arrangement of FIG. 1 are the use of a spiral retaining ring locking arrangement, labyrinth seals, hydraulically balanced shafts, a floating drive shaft and an integrated bearing construction on the shaft featuring the differential. Each of these components will be described in greater detail below. As stated above, many elements of the transmission 900 have been described above and will not be described again for brevity and clarity.

With continued reference to FIG. 32, the illustrated transmission 900 generally comprises a pair of drive pulleys 910.

The drive pulleys 910 are mounted to a drive shaft 12 and are configured with a stationary portion 911 and a moveable portion 913. Each of the drive pulleys 910 drives a belt 914. Each belt 914, in turn, drives a corresponding driven pulley 936. Thus, the torque from the drive pulleys 910 is transferred to an output shaft or drive shaft 944 by the driven pulleys 936 through the belts 914. The driven pulleys 936 also comprise a stationary portion 938 and a moveable portion 940. Both the drive shaft 912 and the driven shaft 944 are illustrated as containing a lumen that can be used to supply fluid for hydraulically powering movement of the pulleys 910, 936, if desired. The belts 914 preferably are any suitable type.

With continued reference to FIG. 32, a piston 920 and a sleeve 922 is slidably connected to each illustrated stationary pulley half 940. While the pistons 920 and sleeves 922 are formed independently of one another in the illustrated transmission 900, it is anticipated that the two components may be formed of a single member. The illustrated pistons 920 and sleeves 922 are preferably connected to the moveable pulley halves 938 for axial movement relative to the shaft 944.

As mentioned above, the pistons 920 and sleeves 922 preferably are fixed to the moveable pulley halves 938. The illustrated pistons 920, in turn, are connected to the sleeves 922 with snap rings 921. In the illustrated arrangement, the snap rings 921 are secured in position using a spiral retaining ring locking arrangement 960. A spring 916, which is in contact with an inner face of the piston 920, in cooperation with the snap rings 921, can fix a preset relative positioning of the pistons 20 and sleeves 22. The locking arrangement 960 desirably is positioned to the outside of the snap rings 921. The locking arrangement 960 advantageously secures the snap rings 921 in position against centrifugal forces.

With reference now to FIG. 33, the shaft 912 of the illustrated transmission 900 is provided with a controlled lubrication arrangement. In the illustrated arrangement, the transmission 900 is operated by hydraulic pressure created by fluid or lubricant that passes through a central lumen 970. A portion of the fluid can be used to lubricate the shaft 912. In the illustrated arrangement, a pair of labyrinth seals 972 is disposed at the ends of the shaft 912. The labyrinth seals 972 communicate with the lumen 970 in any suitable manner. In the illustrated arrangement, at least one feed channel 974 extends between the two. As fluid passes to the labyrinth seals 972, a controlled leakage of fluid is provided along the shaft 912 at its interface with the pulleys 910. As such, frictional losses at this interface can be decreased. In addition, although leakage is used to supply fluid to the interface, the labyrinth seals adequately stop fluid flow to allow the hydraulic system to maintain appropriate pressure for operation of the transmission 900.

With continued reference to FIG. 33, the drive shaft 912 also can be mounted to provide some degree of axial translation. For instance, the portion of the drive shaft 912 that carries the pulleys 910 preferably is axially moveable from the portion of the drive shaft 912 extending outward of the transmission 900. In one arrangement, the two portions are spline together. Additionally, adequate tolerance clearances can be provided to allow the shaft to slightly shift. The slight shifting allows for improved alignment between the drive pulleys 910 and the driven pulleys 936. Such a construction reduces alignment difficulties during manufacturing, which, in turn, reduces wear on the components that can be caused by misalignment.

With continued reference to FIG. 33, the shafts 912, 944 preferably are hydraulically balanced. As can be appreciated, closing one end of the lumen 970 while the other end is connected to a high-pressure fluid source causes an axial force on the respective shafts 912, 944. Accordingly, one aspect of the present invention involves positioning a hydraulic pressure control port 980 at each end of the lumen 970. By positioning one port 980 at each end of the lumen 970, the forces in each axial direction that are set up within the shafts 912, 944 substantially cancel each other.

With reference now to FIGS. 34—41, a further transmission 1000 arranged and configured in accordance with certain features, aspects and advantages of the present invention is illustrated. As stated above, many elements of the transmission 1000 have been described above and will not be described again for brevity and clarity. Additionally, the transmission 1000 will be described in the context of a drive side and a driven side; however, the two sides can interchanged depending upon the application.

The illustrated transmission 1000 generally comprises a drive shaft 1002 and a driven shaft 1004. The drive shaft 1002 carries a pair of drive pulleys 1006 and the driven shaft 1004 carries a pair of driven pulleys 1008. The drive pulleys 1006 and the driven pulleys 1008 preferably are connected with belts 1010 in the manners described above. The drive pulleys are connected together for rotation by a differential assembly 1009 while the driven pulleys are connected together with an articulating mechanism 1011 that slaves the driven pulleys together such that the effective diameter between the two pulleys is generally the same.

The shafts 1002, 1004 and the pulleys 1006, 1008 preferably are journaled within a transmission housing 1012. To counter axial loads along the driven shaft 1004, which may be set up through the articulating mechanism 1011 and through an output gear train 1013, the illustrated driven shaft 1004 can be journaled relative to the housing 1012 with a pair of thrust bearings 1014. The thrust bearings oppose any substantial axial loading and allow generally free rotation of the driven shaft 1004.

As described above, at least one of each of the paired drive pulleys 1006 and driven pulleys 1008 preferably comprises a biasing member that will return the pair to a resting position when pressurizing fluid is released from the transmission 1000. In the illustrated arrangement, the driven pulleys 1008 comprise a cylinder 1020 that defines a piston chamber 1022 and a piston 1024 that is capable of axial movement along the driven shaft 1014 within the piston chamber 1022. While some of the arrangements discussed above used rather lengthy springs (see, for example, element 16 in FIG. 1), the illustrated arrangement advantageously uses another form of biasing member. In the illustrated arrangement, the biasing member preferably comprises a crest-to-crest spring 1026, a stack of wave springs or the like. More preferably, a groove is formed within a portion of the pulley 1008 and the spring 1026 has one end disposed within that groove. The other end of the spring 1026 preferably is positioned within a groove formed within a surface of the piston 1024. Thus, the piston 1024, which is connected to a moveable portion of the pulley 1008, is biased with the force of the spring to a closed position in the illustrated arrangement (e.g., low gear see FIG. 35).

As described above, fluid pressure is used to control the opening and closing of the drive pulleys 1006. In the illustrated arrangement, a lumen 1030 is defined within the drive shaft 1002. The lumen communicates with a chamber formed within each drive pulley 1006 through at least one communication passage 1032. Between a hub 1034 of the pulley 1006 and the drive shaft 1002, two pairs of seals 1036 are positioned with one pair on each side of the passage 1032. The seals 1036 preferably are positioned between the moveable portion of the pulley 1006 and the drive shaft 1002. The seals 1036 advantageously minimize leakage along the shaft 1002 of the fluid used to power movement of the pulley between an opened position and a closed position. Additional passages are provided that provide a controlled amount of fluid to desired regions of the pulleys 1006 such that the pulleys 1006 and any associated moving components are adequately lubricated.

Figure 34:
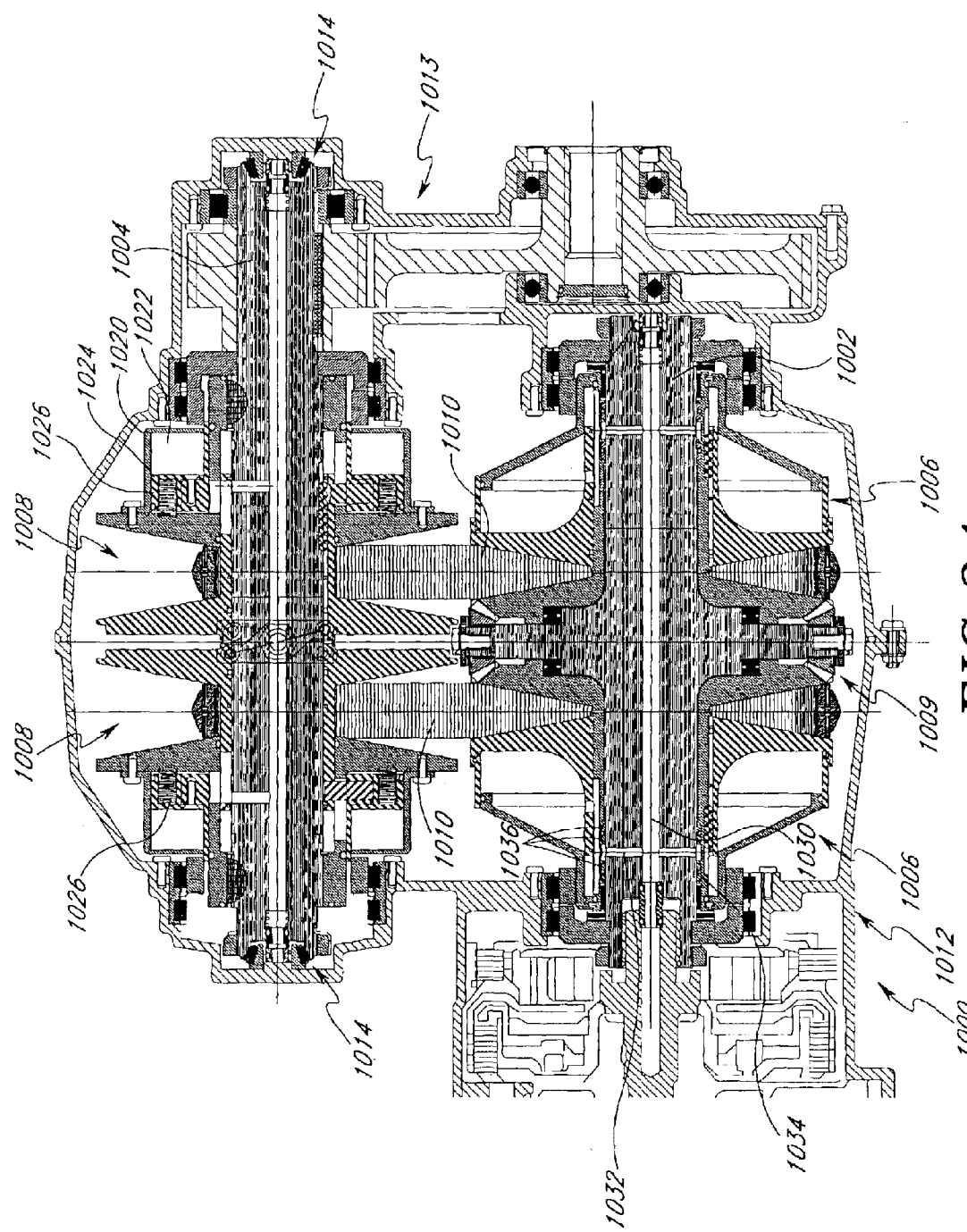
FIG. 34 is a sectioned side elevation view of a transmission arranged and configured in accordance with certain features, aspects and advantages of the present invention with the transmission being shown in a high gear position.
Figure 35:
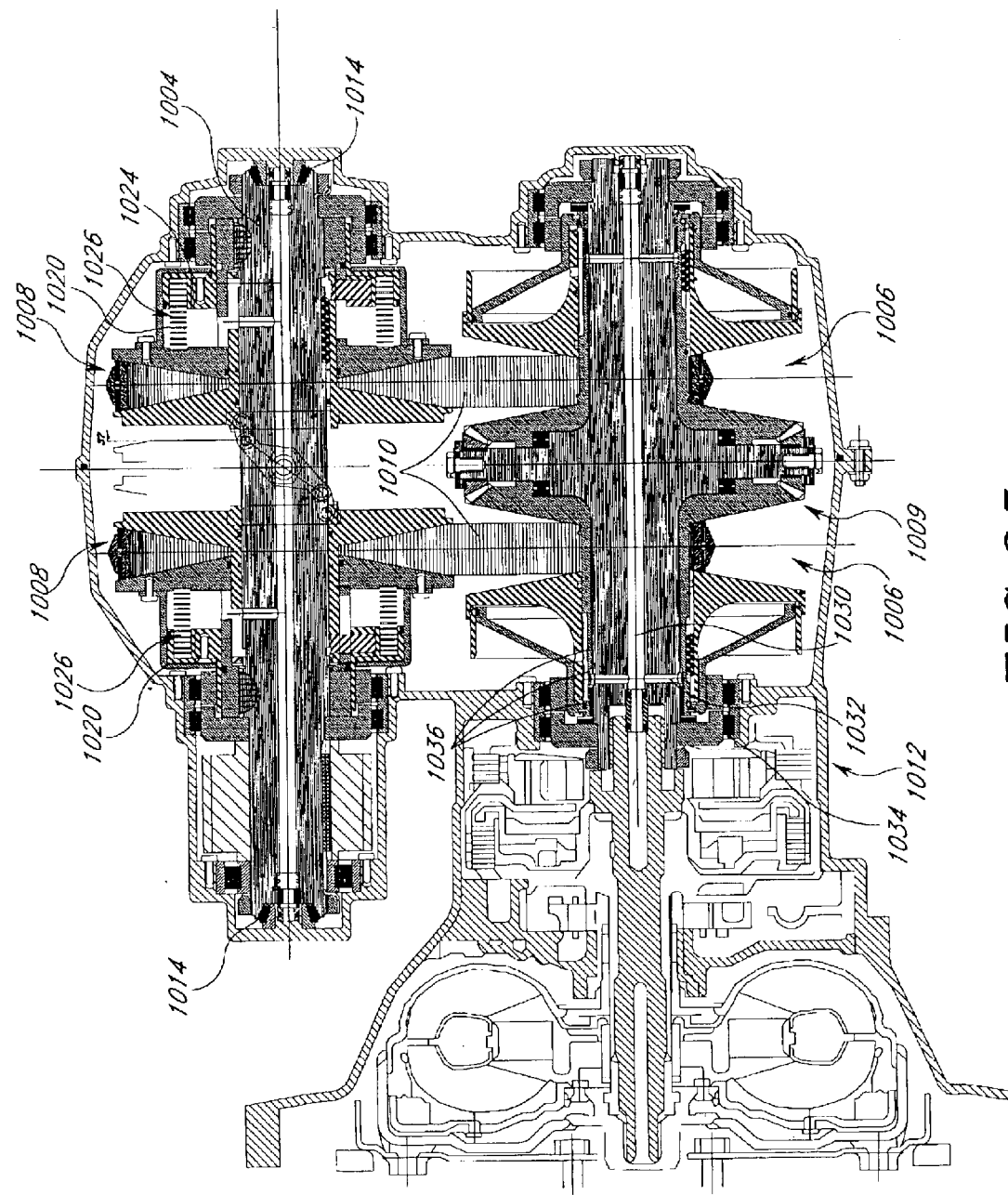
FIG. 35 is another view of the transmission of FIG. 34 with the transmission being shown in a low gear position.
Figure 38:
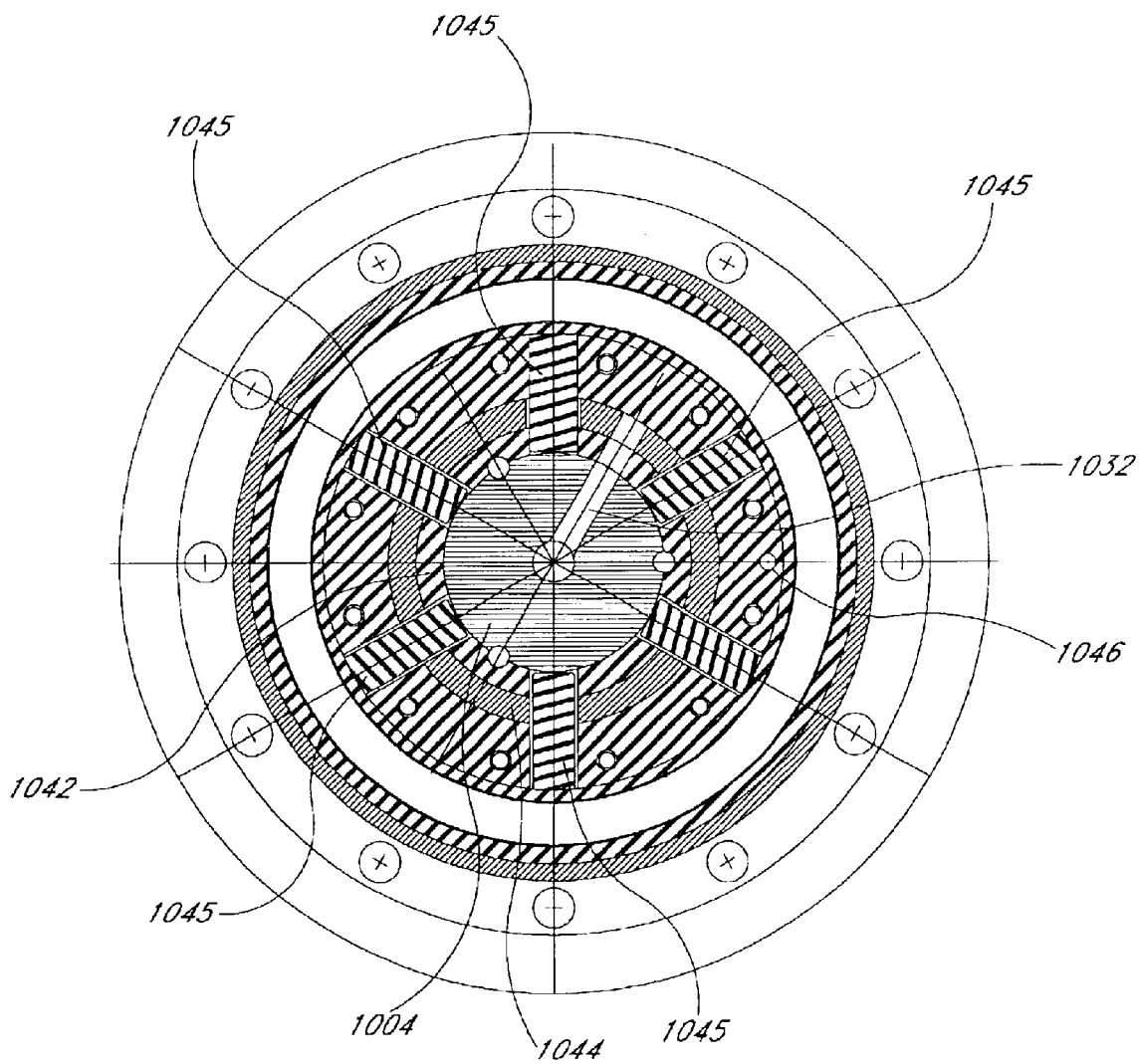
FIG. 38 is a sectioned end view of the transmission of FIG. 34 showing an adjustable hub connected to an actuating sleeve with lugs. The view is taken along the line 38—38 in FIG. 34.

With reference now to FIG. 38, which is a section taken through the drive pulley 1008 and the drive shaft 1004 along the line 38—38 in FIG. 34, a balance dam 1040 is illustrated. The balance dam 1040 helps to control fluid movement even during high rates of rotational movement of the shaft 1004. As illustrated, a hub 1042 of a moveable portion of the pulley 1008 extends over an axial portion of the shaft 1008 such that it is positioned between a hub 1044 of the fixed portion of the pulley 1008 and the shaft 1008. The hub 1042 of the moveable portion is coupled to the balance of the moveable portion with lugs 1045 that translate within a slot 1047 (see FIG. 41). The balance dam 1040 is capable of sliding over an axial portion of the fixed hub 1044. As illustrated in FIG. 38, the passage 1032 extends to the balance dam 1040 and the balance dam comprises an orifice 1046. In operation, the piston 1024 is displaced under the influence of the drive pulleys 910. During the displacement, the piston 1026 must return to its low gear position. Due to the centrifugal force acting on the rotating fluid in the chamber 1022 and the effect on the piston 1024, an unbalanced pressure will exist and cause the piston 1024 to be biased and resist movement into the low-gear position. The orifice 1046 allows fluid to pass through the piston 1024 due to this differential pressure and allows the piston 1024 to return to the low-gear position under the influence of the spring 1026 since any centrifugal fluid pressure in the chamber 1022 is balanced by a comparable centrifugal fluid pressure on the opposite side.

Figure 36:
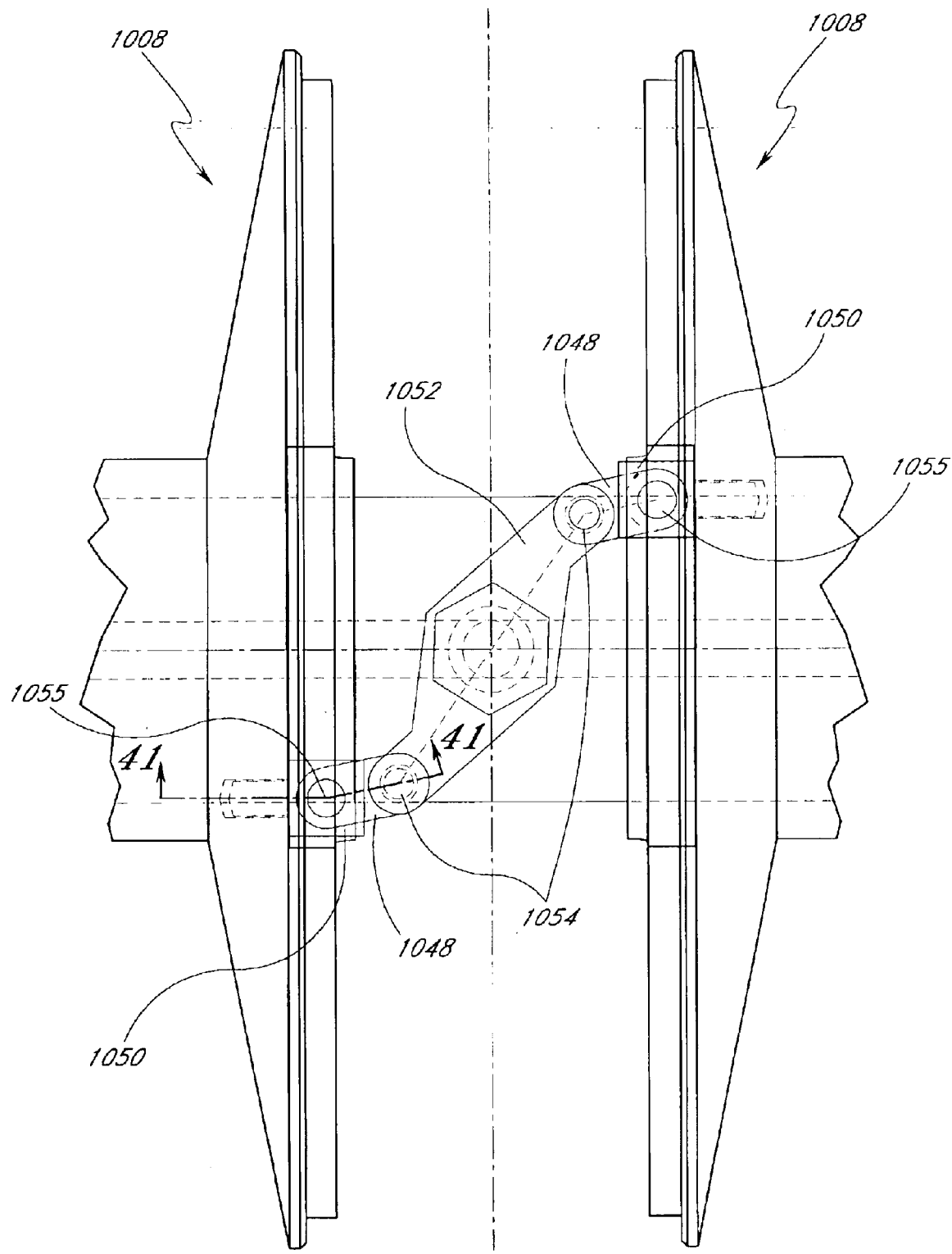
FIG. 36 is an enlarged view of an articulating mechanism of the transmission of FIG. 34.
Figure 37:
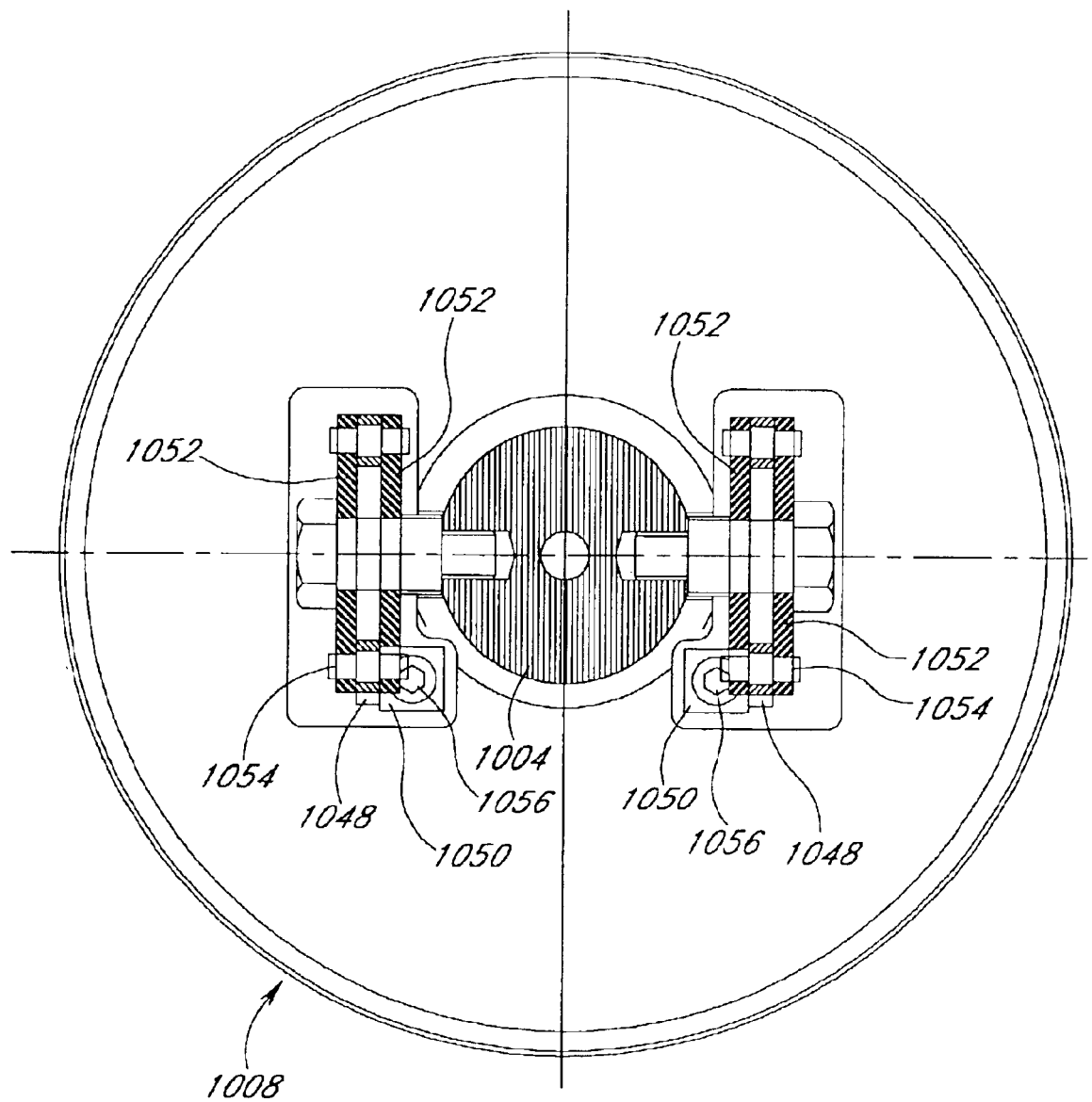
FIG. 37 is a section taken through the articulating mechanism as indicated by the line 37—37 in FIG. 36.
Figure 39:
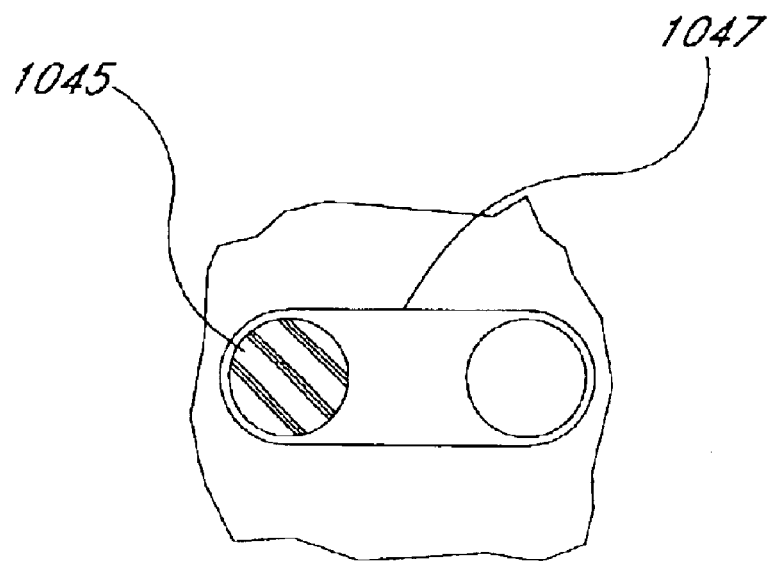
FIG. 39 is an enlarged partial external view of a lug in a slotted mounting arrangement used to secure an adjustable pulley to the actuating sleeve.
Figure 41:
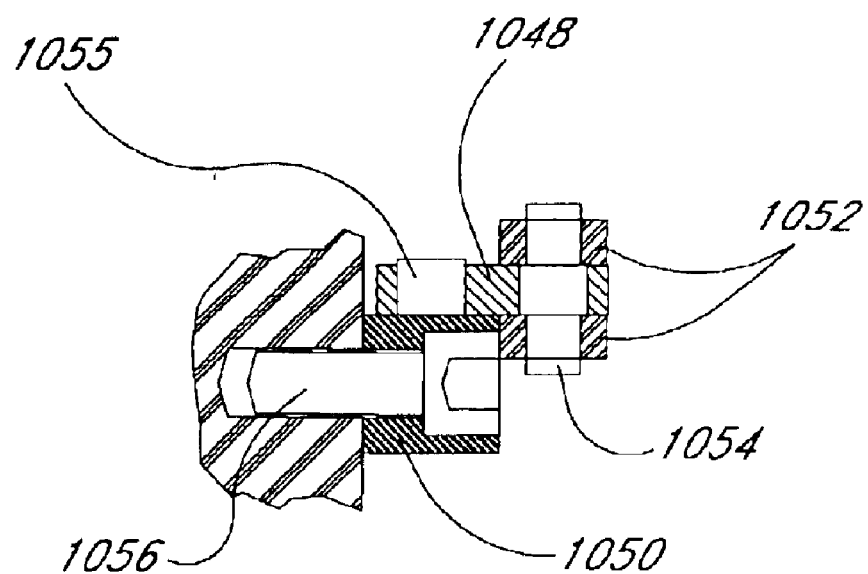
FIG. 41 is a partially sectioned enlarged view of an articulating mechanism taken along the line 41—41 in FIG. 36.

With reference now to FIGS. 36, 37 and 39, the articulating mechanism 1011 is secured to the pulleys 1008 through the use of a pair of toggle members 1048 that are connected to respective mounting blocks 1050.

In the illustrated arrangement, the toggle members 1048 are mounted between a pair of parallel beams 1052 that form a body of the articulating mechanism 1011. The toggle member 1048 is secured between the beams 1052 using a pin 1054 in the illustrated arrangement. In addition, the toggle member 1048 can be secured to the respective block 1050 using a pin 1055, as well. Other mounting arrangements also can be used.

The blocks 1050, in turn, are secured in position using any suitable manner. In one arrangement, the blocks 1050 are secured using a threaded fastener 1056. Such a mounting arrangement eases manufacturing and assembly over the arrangement of FIGS. 1 and 15, for instance.

The geometry of the beams 1052 also has been varied over the arrangements discussed above. Together with the toggle members 1048, the revised geometry allows the two pulleys to close more closely together. In addition, the beams 1052 also serve to stop movement of the pulleys in one arrangement. By allowing the body of the articulating mechanism 1011 to serve as the stop rather than the toggle members 1048, the stronger component can bear the forces applied when travel of the pulleys is stopped.

Figure 40:
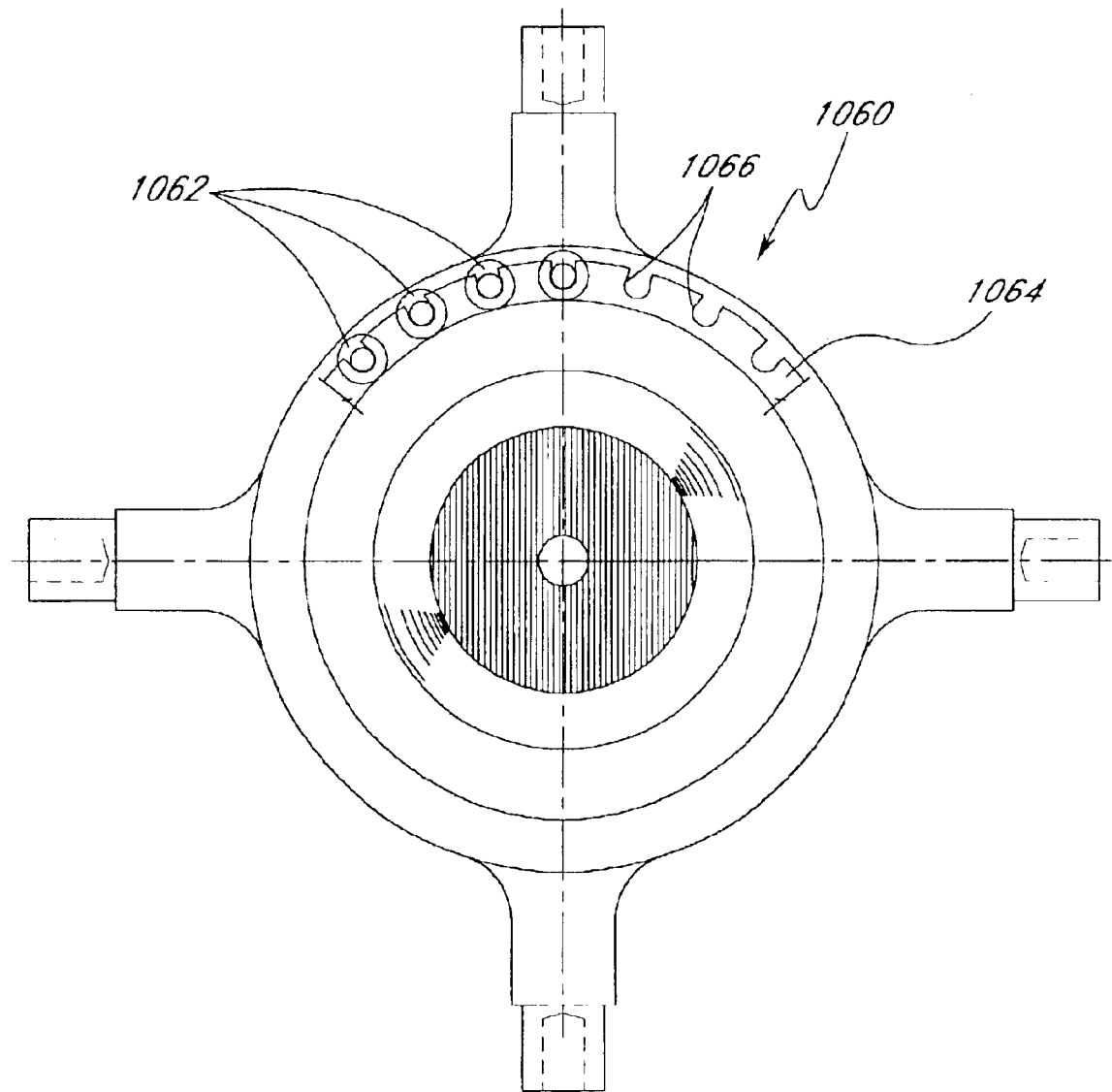
FIG. 40 is an enlarged simplified view of an integrally formed roller bearing cage having certain features, aspects and advantages of the present invention. At least a portion of the associated pulleys ride on the roller bearings secure in the cage in the illustrated arrangement.

With reference to FIG. 40, an improved bearing arrangement 1060 is illustrated. As illustrated in FIG. 34, the axially fixed portions of the drive pulleys 1006 rotates about the shaft 1002. Preferably, a number of bearings 1062 are provided about a portion of the shaft such that the axially fixed portion of the drive pulley 1006 can rotate about the shaft 1002 on the bearings 1062. In the illustrated arrangement, the shaft 1002 comprises an enlarged portion 1064 with multiple holders 1066 formed therein to receive the bearings 1062. In this manner, the shaft 1002 comprises an integrated roller bearing cage. In this manner, the bearings can be easily installed and maintained. In addition, the overall construction is simplified through decreasing the number of components, which intrinsically will increase reliability.

Figure 42:
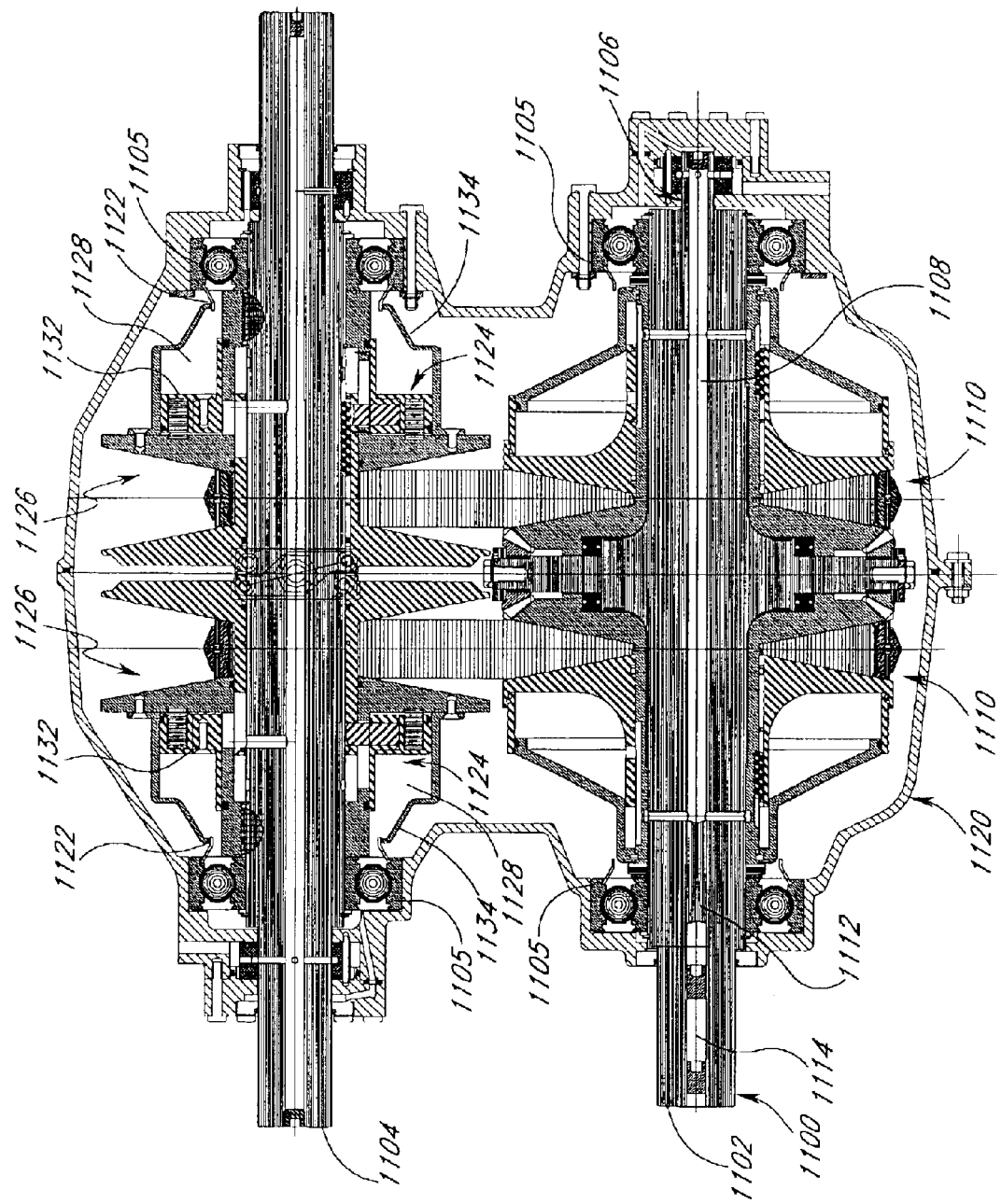
FIG. 42 is a sectioned side elevation view of a transmission arranged and configured in accordance with certain features, aspects and advantages of the present invention. The transmission is adapted for use in a four-wheel drive application and is shown in a high gear position.
Figure 43:
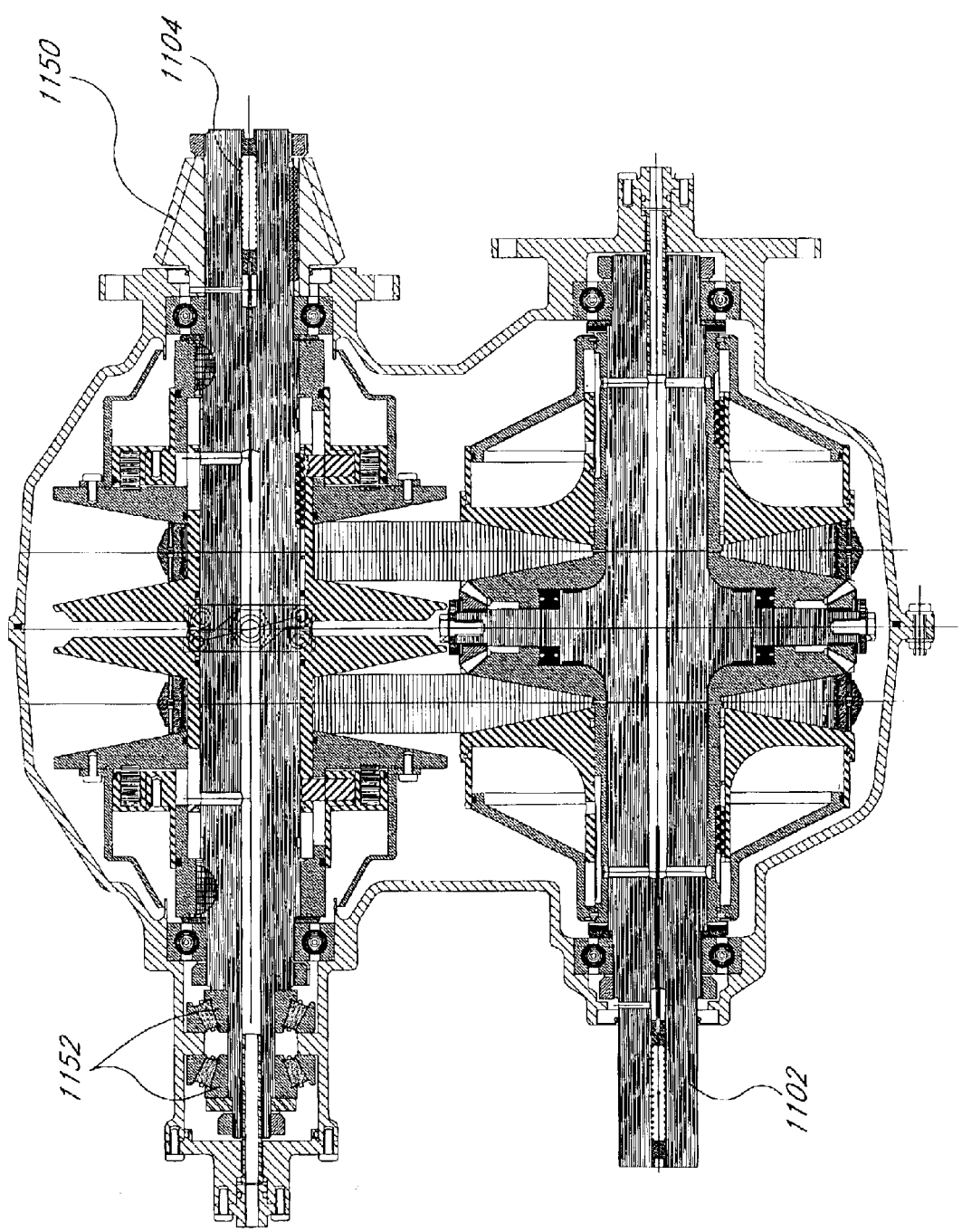
FIG. 43 is a sectioned side elevation view of a transmission that is similar to the transmission shown in FIG. 42 and that is arranged and configured in accordance with certain features, aspects and advantages of the present invention. The transmission is adapted for use in a rear drive differential housing and is shown in a high gear position.
Figure 44:
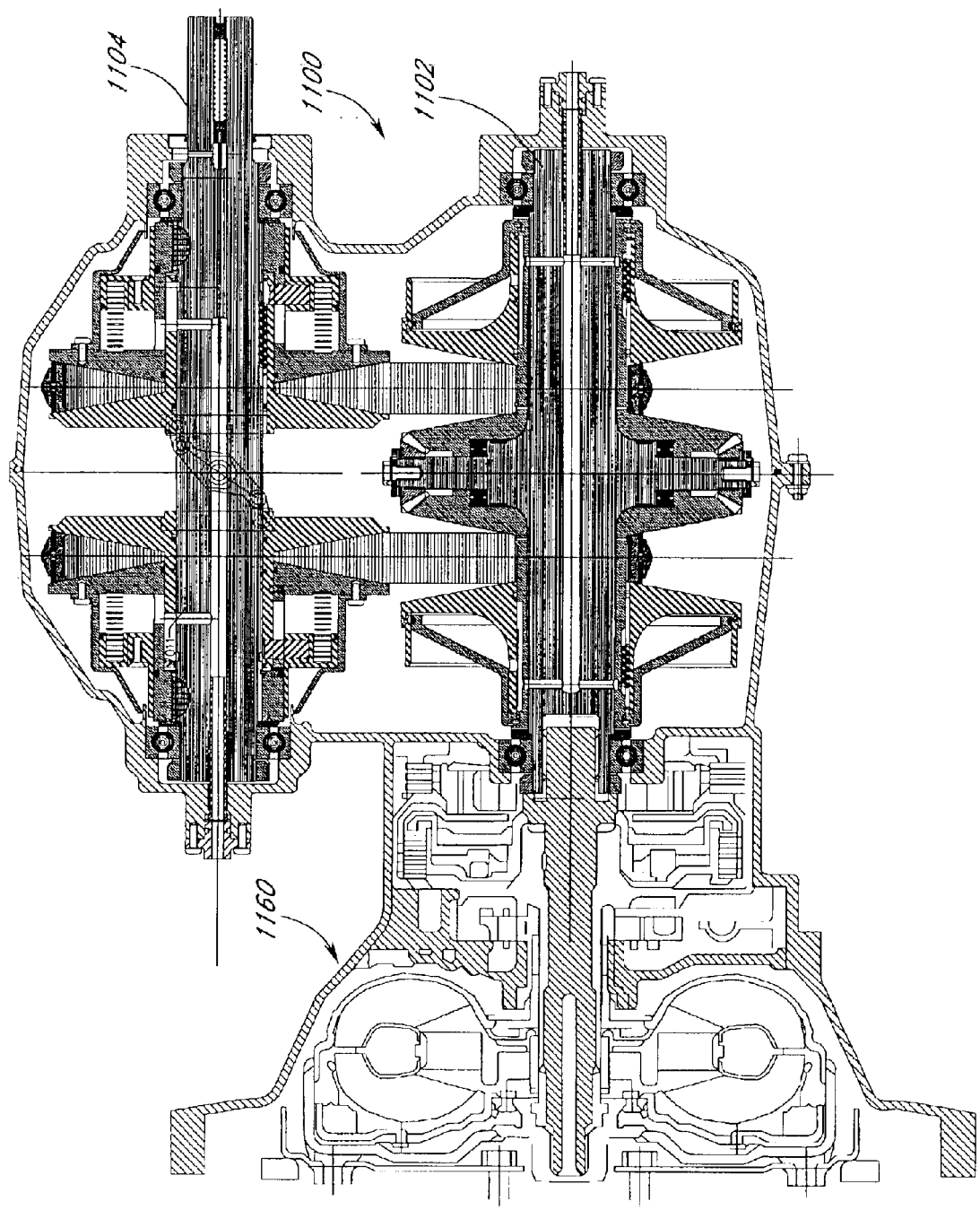
FIG. 44 is a sectioned side elevation view of a transmission that is similar to the transmission shown in FIG. 42 and that is arranged and configured in accordance with certain features, aspects and advantages of the present invention. The transmission is adapted for coupling to a torque converter/engine combination and features an output shaft that is offset from a longitudinal centerline of a vehicle. The transmission is shown in a high gear position.

With reference now to FIGS. 42–44, several adaptations of a transmission 1100 are illustrated therein. The transmission 1100 is similar to those described above in many regards. Accordingly, some like elements among the embodiments may not be described again for brevity and clarity. Some variations have been made as compared to the arrangements above, most of which will be described below. In general, the variations have been made to simplify and generally strengthen the transmission.

With reference now to FIG. 42, lubricant is supplied through a simplified delivery system. The transmission 1100 comprises a drive shaft 1102 and a driven shaft 1104. The shafts preferably are supported by ball bearings 1105 that can be cooled and lubricated through a fluid supply system. At one end of the drive shaft 1102, a labyrinth seal 1106 has been installed within a portion of a lumen 1108 that extends in an axial direction within the drive shaft 1102 and that forms a portion of the fluid supply system. The seal 1106 controls leakage from the lumen 1108 of fluid or lubricant that is supplied through the lumen to a pair of drive pulleys 1110. It should be noted that proper tolerancing can also be used to help control the amount of leakage to a desired level.

At the opposite end of the drive shaft 1100, a small rod 1112 is positioned within a portion of the lumen 1108 and is biased by a spring 1114 or other suitable biasing arrangement. The rod moves axially within the lumen 1108 as limited by the spring 1114 to dampen pressure changes within the fluid supply system. In addition, movement of the rod 1112 also helps to dislodge small deposits of material that may occur within the fluid supply system.

As with the arrangements described above, the transmission 1100 can be contained within a housing 1120. The illustrated housing advantageously comprises a pair of inwardly extending lips 1122. The lips 1122 extend inward toward a set of pistons 1124 that form a portion of the driven pulleys 1126. Preferably, each pulley 1126 comprises a chamber 1128 into which the lips 1122 desirably extend. The lips 1122 direct fluid or lubricant toward a balance dam 1132 positioned within each pulley 1126. Thus, the same lubricant can be used to cool the bearings 1105 and can be directed toward the dams 1132.

Furthermore, the shape of the cylinder 1134 that defines the chamber 1128 has been configured as a cone that tapers outwardly. Thus, the cylinder 1134 also helps to move lubricant toward the dam 1132 during rotation of the shaft 1104. This configuration is believed to improve the operation of the dam 1132, which controls movement of fluid during even high rates of shaft rotational speed.

While each of the features described with respect to FIG. 42 can be found in FIGS. 43 and 44, FIGS. 42–44 generally illustrate another aspect of the present invention. The transmission 1100, as with each of the arrangements described above, can be used in varied applications.

For instance, the arrangement of FIG. 42 features a driven shaft 1104 that extends outward from the housing 1120 in two directions. In addition, the illustrated arrangement of FIG. 42 preferably is positioned at a location in a vehicle between an engine and a rear axle with the drive shaft 1102 and the driven shaft 1104 being positioned generally side-by-side with the axes of rotation arranged in a generally horizontal plane. As such, the arrangement of FIG. 42 is ideally suited for a four wheel drive application.

The arrangement of FIG. 43 features the transmission 1100 arranged for use in a rear drive differential housing. In such an arrangement, the shafts 1102, 1104 preferably are aligned along a generally horizontal plane. A bevel drive gear 1150 is provided on the driven shaft 1104. The gear 1150 can mesh with the balance of a differential in any suitable manner. Also illustrated, the driven shaft 1104 is supported at the end opposite the gear 1150 by a pair of opposing thrust bearings 1152. The bearings 1152 oppose axial forces that would be transmitted to the shaft 1104 by the gear 1150.

With reference to the arrangement of FIG. 44, the transmission 1100 is shown in a form adapted for use with a torque converter/engine combination 1160. In the illustrated arrangement, the shafts 1102, 1104 are shown generally aligned along a generally horizontal plane. In addition, assuming that the drive shaft 1102 is generally centrally located due to the engine output, the driven shaft 1104 is offset from a longitudinally extending generally vertical plane that substantially bisects the vehicle in which the transmission is installed.

Figure 45:
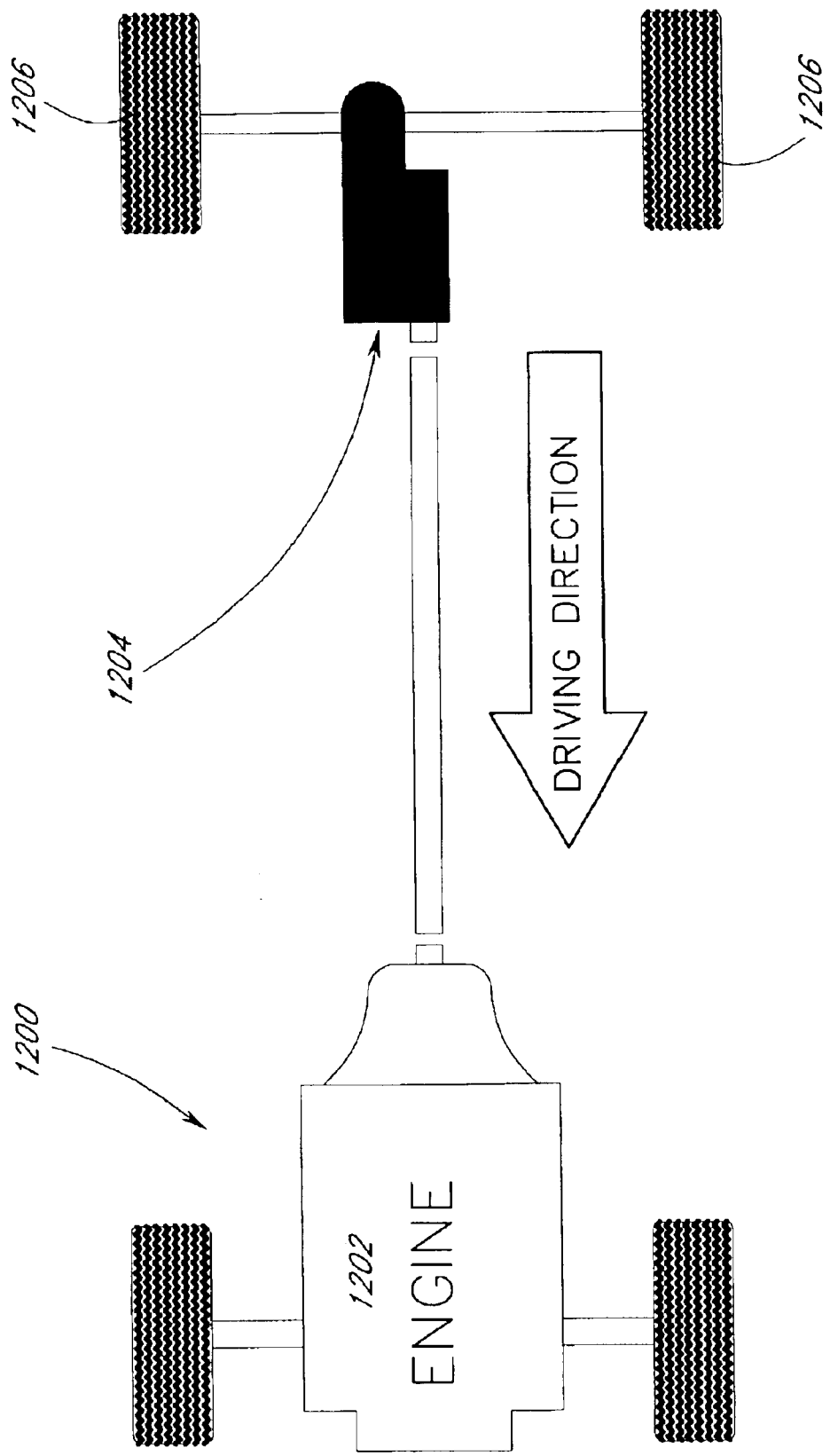
FIG. 45 is a schematic illustration of a vehicle with a transmission arranged and configured in accordance with certain features, aspects and advantages of the present invention.

With reference now to FIG. 45, a schematic illustration of a vehicle 1200 is shown. The vehicle 1200 generally comprises an engine 1202 that is coupled to the rear wheels 1206 through a transmission 1204. The transmission 1204 preferably is either a dual push belt or a dual chain driven continuously variable transmission, both of which are capable of construction in any of the manners disclosed herein. The transmission 1204 also is shown to be driving the rear wheels 1206 through an optional planetary gear reduction with automatic and/or manual shifting or through a differential 1208. In some arrangements, the engine 1202 is coupled to the transmission 1204 through a torque converter, a reverse gear or the like. The engine 1202 preferably also powers a pump that can be used to supply fluid to the transmission 1204 for operation. Furthermore, suitable controls can be positioned on the vehicle 1200 to control operation of the transmission 1204 in any suitable manner.

Although the present invention has been described in terms of certain embodiments, other embodiments apparent to those of ordinary skill in the art also are within the scope of this invention. Thus, various changes and modifications may be made without departing from the spirit and scope of the invention. For instance, various components may be repositioned as desired. Moreover, not all of the features, aspects and advantages are necessarily required to practice the present invention. Furthermore, while various arrangements have been illustrated having a variety of features, it should be appreciated that the features can be combined in many additional manners. In fact, the number of iterations available are not capable of efficient depiction in the figures. Any number of features from one arrangement can be combined with features of another arrangement while not straying from the spirit of the present invention. Accordingly, the scope of the present invention is intended to be defined only by the claims that follow.

What is claimed is:

1. A continuously variable transmission comprising:
    a first shaft supporting two first pulleys, said two first pulleys each comprising a fixed disk portion and a moveable disk portion whereby axial movement of said moveable disk portions along said first shaft relative to said fixed disk portions changes an effective diameter of said two first pulleys, said moveable disk portions of said two first pulleys being interposed along said first shaft between said fixed disk portions of said two first pulleys, an articulating mechanism connecting said moveable disk portions, said articulating mechanism comprising a body that is connected to said moveable disk portions;
    a second shaft extending generally parallel to said first shaft, two second pulleys being journaled on said second shaft, said two second pulleys each comprising a fixed disk portion and a moveable disk portion, said two fixed disk portions being rotationally connected to said second shaft through a differential; and
    a pair of belts connecting said two second pulleys to said two first pulleys.

2. The transmission of claim 1, wherein said belts have a width of about 24 mm.

3. The transmission of claim 1, wherein said belts have a width of about 30 mm.

4. The transmission of claim 1, wherein said first shaft is a drive shaft and said second shaft is a driven shaft.

5. The transmission of claim 1, wherein said first shaft is a driven shaft and said second shaft is a drive shaft.

6. The transmission of claim 5, wherein said drive shaft is adapted for slight axial displacement.

7. The transmission of claim 1, wherein said differential comprises a pair of bevel gears, said bevel gears being integrally formed with said fixed disk portions of said second pulleys.

8. The transmission of claim 1, wherein said differential comprises at least one spider gear that is mounted on a shaft that extends generally normal to said second shaft and that is integrally formed with said second shaft.

9. The transmission of claim 8, wherein said differential comprises three spider gears and three respective shafts.

10. The transmission of claim 8, wherein said differential comprises four spider gears and four respective shafts.

11. The transmission of claim 1, wherein at least one of said second pulleys comprises a double acting cylinder assembly.

12. The transmission of claim 11, wherein said double acting cylinder assembly comprises two disc shaped pistons that are axially spaced from each other.

13. The transmission of claim 1, wherein an output of said transmission powers a power takeoff and reduction gear.

14. The transmission of claim 1, wherein each of said first pulleys further comprise a cylinder that defines a chamber and a piston that is disposed within said chamber and that is secured to movable disk portion with at least one snap ring, said at least one snap ring being secured with a spiral retaining ring.

15. The transmission of claim 1, wherein said body of said articulating mechanism is secured to each of said movable disk portions with a toggle member.

16. The transmission of claim 15, wherein said toggle member is secured to said moveable disk portion with a threaded fastener.

17. The transmission of claim 1, wherein said first shaft and said second shaft each form a flow lumen for hydraulic fluids.

18. The transmission of claim 17, wherein each of said lumens contains a labyrinth seal.

19. The transmission of claim 17, wherein each of said lumens contains a pair of seals that are spaced apart, said seals being configured to hydraulically balance each of said first shaft and said second shaft.

20. The transmission of claim 17, wherein at least one of said lumens contains a biased rod.

21. The transmission of claim 1, wherein said two second pulleys are supported by bearings that are mounted in a cage integrally formed on said second shaft.

22. The transmission of claim 1, wherein said first shaft is journaled by at least one thrust bearing.

23. The transmission of claim 22, wherein said first shaft is coupled to an output gearing arrangement, said thrust bearing being arranged to oppose axial forces created by said output gearing arrangement.

24. The transmission of claim 23, wherein said first shaft is journaled by at least one ball bearing.

25. The transmission of claim 24, wherein said ball bearing is cooled by lubricant used to control movement of said first pulleys.

26. The transmission of claim 1, wherein each of said first pulleys further comprise a cylinder that defines a chamber and a piston that is disposed within said chamber, said piston being biased by a crest-to-crest biasing member.

27. The transmission of claim 26, said second shaft forms a flow lumen for hydraulic fluids, said lumen communicating with each of said second pulleys through a communication passage, a pair of seals being disposed to each side of said communication passage at a radial location between second pulleys and said second shaft.

28. The transmission of claim 1, wherein a balance dam is positioned within each of said first pulleys.

29. The transmission of claim 1, wherein each of said first pulleys further comprise a cylinder that defines a chamber and a piston that is disposed within said chamber, said cylinder having a conical portion that tapers in a direction away from said belts.

30. The transmission of claim 1 further comprising a housing that encases said first pulleys, said second pulleys and said belts, each of said first pulleys further comprising a cylinder that defines a chamber and a piston that is disposed within said chamber, said housing comprising a pair of lips that extend inward toward said belts and one of said pair of lips extending inside each of said chambers defined by said cylinder.

* * * * *

UNITED STATES PATENT AND TRADEMARK OFFICE
CERTIFICATE OF CORRECTION

| | | |
|---|---|---|
| PATENT NO. | : 6,926,632 B2 | Page 1 of 1 |
| APPLICATION NO. | : 10/281895 | |
| DATED | : August 9, 2005 | |
| INVENTOR(S) | : Albert W. Brown | |

It is certified that error appears in the above-identified patent and that said Letters Patent is hereby corrected as shown below:

At column 4, line 30, please delete "FIGS 15A and 15B.....transmission case.", please insert this same line at line 29 after "ratio."

At column 14, line 37, after "half", please delete "114," and insert therefore --114--.

At column 30, line 60 after "low gear" please insert -- - --.

Signed and Sealed this

First Day of August, 2006

JON W. DUDAS
*Director of the United States Patent and Trademark Office*